US012594147B2

(12) United States Patent
Liska et al.

(10) Patent No.: US 12,594,147 B2
(45) **Date of Patent: *Apr. 7, 2026**

(54) CURABLE COMPOSITION FOR USE IN A HIGH TEMPERATURE LITHOGRAPHY-BASED PHOTOPOLYMERIZATION PROCESS AND METHOD OF PRODUCING CROSSLINKED POLYMERS THEREFROM

(71) Applicant: Align Technology, Inc., San Jose, CA (US)

(72) Inventors: Robert Liska, Schleinbach (AT); Christian Gorsche, Vienna (AT); Gyorgy Harakaly, Vienna (AT); Markus Kury, Vienna (AT); Jurgen Stampfl, Vienna (AT); Peter Dorfinger, Los Altos Hills, CA (US); Yan Chen, Cupertino, CA (US); Chunhua Li, Cupertino, CA (US); Srinivas Kaza, Mountain View, CA (US)

(73) Assignee: Align Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/735,815

(22) Filed: Jun. 6, 2024

(65) Prior Publication Data

US 2024/0325117 A1 Oct. 3, 2024

Related U.S. Application Data

(63) Continuation of application No. 17/883,390, filed on Aug. 8, 2022, now Pat. No. 12,042,353, which is a (Continued)

(51) Int. Cl.
*A61C 7/08* (2006.01)
*A61C 7/10* (2006.01)
(Continued)

(52) U.S. Cl.
CPC .................. *A61C 7/08* (2013.01); *A61C 7/10* (2013.01); *B22F 10/12* (2021.01); *C08G 18/10* (2013.01);
(Continued)

(58) Field of Classification Search
CPC .... C08G 18/815; C08G 18/755; C08G 18/73; C08G 18/3212; C08G 18/3206;
(Continued)

(56) References Cited

U.S. PATENT DOCUMENTS 6,833,425 B1 * 12/2004 Hecht .................. C08L 51/003 522/135
2013/0331528 A1 12/2013 Carlborg et al.
(Continued)

FOREIGN PATENT DOCUMENTS

EP 3705077 A1 9/2020

*Primary Examiner* — Jessica M Roswell
(74) *Attorney, Agent, or Firm* — Seed Intellectual Property Law Group LLP

(57) ABSTRACT

Provided herein are curable compositions for use in a high temperature lithography-based photopolymerization process, a method of producing crosslinked polymers using said curable compositions, crosslinked polymers thus produced, and orthodontic appliances comprising the crosslinked polymers.

20 Claims, 12 Drawing Sheets

Related U.S. Application Data continuation of application No. 16/653,018, filed on Oct. 15, 2019, now Pat. No. 11,542,362, which is a continuation of application No. 16/403,429, filed on May 3, 2019, now Pat. No. 11,174,338.

(60) Provisional application No. 62/775,756, filed on Dec. 5, 2018, provisional application No. 62/667,354, filed on May 4, 2018.

(51) Int. Cl.

| | |
|---|---|
| ***B22F 10/12*** | (2021.01) |
| ***B22F 10/20*** | (2021.01) |
| ***B22F 10/38*** | (2021.01) |
| ***B22F 10/60*** | (2021.01) |
| ***C08G 18/10*** | (2006.01) |
| ***C08G 18/32*** | (2006.01) |
| ***C08G 18/34*** | (2006.01) |
| ***C08G 18/44*** | (2006.01) |
| ***C08G 18/73*** | (2006.01) |
| ***C08G 18/75*** | (2006.01) |
| ***C08G 18/81*** | (2006.01) |
| ***C08J 5/00*** | (2006.01) |

(52) U.S. Cl.

CPC ..... *C08G 18/3206* (2013.01); *C08G 18/3212* (2013.01); *C08G 18/348* (2013.01); *C08G 18/44* (2013.01); *C08G 18/73* (2013.01); *C08G 18/755* (2013.01); *C08G 18/815* (2013.01); *C08J 5/00* (2013.01); *B22F 10/20* (2021.01); *B22F 10/38* (2021.01); *B22F 10/60* (2021.01); *C08J 2375/04* (2013.01)

(58) Field of Classification Search

CPC ...... C08G 18/348; C08G 18/20; C08G 18/44; C08G 18/246; C08G 18/672; C08G 18/8016; A61C 7/08; A61C 7/10; A61C 19/003; C08J 2375/04; B22F 3/1055; B22F 3/008

See application file for complete search history.

(56) References Cited

U.S. PATENT DOCUMENTS

| | | | | |
|---|---|---|---|---|
| 2015/0252202 | A1 | 9/2015 | Nerad | |
| 2017/0007362 | A1* | 1/2017 | Chen | B33Y 80/00 |

* cited by examiner

CURABLE COMPOSITION FOR USE IN A HIGH TEMPERATURE LITHOGRAPHY-BASED PHOTOPOLYMERIZATION PROCESS AND METHOD OF PRODUCING CROSSLINKED POLYMERS THEREFROM

CROSS REFERENCE

This application is a continuation of U.S. patent application Ser. No. 17/883,390, filed on Aug. 8, 2022, which is a continuation of U.S. patent application Ser. No. 16/653,018, filed on Oct. 15, 2019 (now U.S. patent Ser. No. 11/542,362, issued on Jan. 3, 2023), which is a continuation application of U.S. patent application Ser. No. 16/403,429, filed May 3, 2019 (now U.S. patent Ser. No. 11/174,338, issued on Nov. 16, 2021), which claims the benefit of U.S. Provisional Application No. 62/667,354, filed May 4, 2018, and U.S. Provisional Application No. 62/775,756, filed Dec. 5, 2018, each of which are incorporated herein by reference in their entireties.

BACKGROUND OF THE INVENTION

Additive manufacturing (e.g., lithography-based additive manufacturing (L-AM)) techniques include a variety of techniques to fabricate objects, such as three-dimensional objects, out of photopolymerizable materials. Due to cost, ease, and other various factors, additive manufacturing techniques have long been used to produce prototypes and functional items (e.g., through "rapid prototyping") and to mass produce items. Many additive manufacturing techniques involve successively adding layers of photopolymerizable material and curing these layers by controlled light exposure. The photopolymerizable materials often include reactive components that are cured with light. Examples of photopolymerizable materials compatible with additive manufacturing include acrylates compatible with, e.g., radical polymerization and epoxides compatible with, e.g., cationic polymerization. Example viscosities of existing materials used for additive manufacturing include viscosities of between 20-40 millipascals (mPas) (see I. Gibson, D. W. Rosen, B. Stucker et al., "Additive Manufacturing Technologies", Vol. 238, Springer Verlag (2010)).

It has conventionally proven difficult to form many medical appliances through additive manufacturing techniques. One issue is that existing materials used for additive manufacturing are not biocompatible, much less appropriate for use in an intraoral environment or other part of the human body. Another issue is that existing materials used for additive manufacturing are often not viscous enough to form the precise and/or customizable features required of many appliances. Further, many current additive manufacturing techniques have relatively low curing or reaction temperatures, both for safety and cost concerns, which, for many medical appliances (including dental appliances), undermines the ability to produce a product that is stable at and/or above human body temperature.

Yet another issue is that existing materials used for additive manufacturing do not provide the physical, chemical, and/or thermomechanical properties (elongation, time stress-relaxation, modulus, durability, toughness, etc.) desired of aligners, other dental appliances, hearing aids, and/or many medical devices (see, for example, T. Swetly, J. Stampfl, G. Kempf, and R.-M. Hucke, "Capabilities of Additive Manufacturing Technologies (AMT) in the validation of the automotive cockpit", RTejournal— Forum for Rapid Technology 2014 (1)). Existing materials used for additive manufacturing lack many of the properties desired in medical devices, such as the ability to impart forces, torques, moments, and/or other movements that are accurate and consistent with a treatment plan.

Increasing the viscosity of materials may provide better thermomechanical properties for many applications by reducing crosslinking, increasing the physical interactions between chains, increasing the average weight of monomers, etc. As a result, it may be possible to additively manufacture materials with desirable thermomechanical properties and/or viscosities into dental and/or medical appliances by adding heating operations to the processes. For example, WO 2015/075094, WO 2016/078838 and WO 2018/032022 each disclose stereolithography systems that heat layers of photopolymerizable material that are to be cured in order to lower the viscosity of the materials. Those techniques can make it possible to process materials with resins with viscosities greater than otherwise possible. Many of those techniques may also expand the spectrum of monomers and/or oligomers used for additive manufacturing, and may allow the use of a greater range of resin formulations. Those techniques may also expand the range of products obtained by curing the formulations referenced therein.

Additive manufacturing is also an area of intense interest for intraoral appliance manufacturing, as it may provide cost effective production of precise intraoral devices, including aligners, palate expanders and similar appliances. Additionally, the precise and customizable nature of additive manufacturing may allow for increased personalization of treatment, where unique devices are quickly and facilely created via additive manufacturing. However, some additive manufacturing techniques represent a variety of issues for use in intraoral appliances. First, in order to be safely used as an intraoral device, non-toxicity and biocompatibility should be considered in designing additive manufacturing techniques and chemistries. Second, intraoral appliance manufacturing should be dimensionally precise. Accordingly, viscosity plays an important role in the ability to accurately manufacture precise intraoral appliance dimensions. Third, many current additive manufacturing techniques have relatively low curing or reaction temperatures, both for safety and cost concerns. However, for intraoral appliances, it is important to have a stable product at and above human body temperature. Finally, the final product should have rigorous physical, mechanical and chemical properties to provide adequate treatment to patents. These properties include strength, elongation or flexibility, modulus and other important properties for oral applications.

SUMMARY OF THE INVENTION

Against the issues referenced herein, the present disclosure aims to provide curable compositions for use in a high temperature lithography-based photopolymerization processes. These curable compositions may be used in a variety of applications, including for the formation of medical devices and/or those items used in an intraoral environment, e.g., intraoral devices, such as aligners, expanders, or spacers. Additionally, the present disclosure aims to provide a method of producing crosslinked polymers using said curable compositions, as well as crosslinked polymers thus produced, and orthodontic appliances comprising the crosslinked polymers. Accordingly, this disclosure aims to provide compositions, methods, and systems for use in a high temperature lithography-based photopolymerization, as well as devices made from said high temperature lithography-based photopolymerization.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In various aspects, the present disclosure provides a curable composition for use in a photopolymerization process, the composition comprising: a toughness modifier, wherein the toughness modifier is a polymerizable oligomer having a number average molecular weight of greater than 5 kDa; and a reactive diluent, wherein the reactive diluent is a polymerizable compound having a molecular weight of 0.1 to 1.0 kDa and wherein the content of the reactive diluent is such that the viscosity of the composition is 1 to 70 Pa·s at 110° C. In certain aspects, the glass transition temperature ($T_g$) of the toughness modifier is less than 0° C. In some aspects, the content of the toughness modifier is such that a crosslinked polymer prepared from the curable composition has an elongation at break greater than or equal to 5% when measured according to ISO 527-2 5B, optionally at a cross-head speed of 5 mm/min.

In some aspects, the composition comprises 20 to 50 wt %, based on the total weight of the composition, of the toughness modifier. In certain aspects, the composition comprises 5 to 50 wt %, based on the total weight of the composition, of the reactive diluent. In some aspects, the composition further comprises 0.1 to 5 wt %, based on the total weight of the composition, of a photoinitiator. In certain aspects, the composition further comprises a glass transition temperature ($T_g$) modifier that has a higher glass transition temperature than the toughness modifier and that is a polymerizable oligomer having a number average molecular weight of 0.4 to 5 kDa. In certain aspects, the composition comprises 5 to 50 wt %, based on the total weight of the composition, of the glass transition temperature ($T_g$) modifier.

In some aspects, the toughness modifier is selected from a polyolefin, a polyester, or a polyurethane. In certain aspects, the toughness modifier comprises a urethane group. In some aspects, the toughness modifier further comprises a carbonate group. In certain aspects, the toughness modifier comprises at least one methacrylate group. In some aspects, the toughness modifier is a compound of formula (II), (III), (IV) or (V).

In certain aspects, the reactive diluent is monofunctional. In some aspects, the reactive diluent comprises a methacrylate. In certain aspects, the reactive diluent is selected from the group consisting of dimethacrylates of polyglycols, hydroxybenzoic acid ester (meth)acrylates, and mixtures thereof. In some aspects, the reactive diluent is a cycloalkyl 2-, 3- or 4-((meth)acryloxy)benzoate. In certain aspects, the reactive diluent is a compound of formula (VII):

(VII)

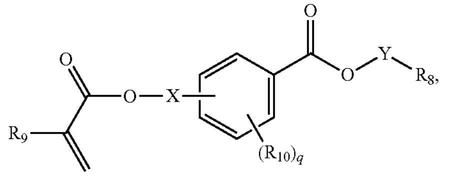

wherein:

$R_8$ represents optionally substituted $C_3$-$C_{10}$ cycloalkyl, optionally substituted 3- to 10-membered heterocycloalkyl, or optionally substituted $C_6$-$C_{10}$ aryl;

$R_9$ represents H or $C_1$-$C_6$ alkyl;

each $R_{10}$ independently represents halo, $C_1$-$C_3$ alkyl, $C_1$-$C_3$ alkoxy, $Si(R_{11})_3$, $P(O)(OR_{12})_2$, or $N(R_{13})_2$;

each $R_{11}$ independently represents $C_1$-$C_6$ alkyl or $C_1$-$C_6$ alkoxy;

each $R_{12}$ independently represents $C_1$-$C_6$ alkyl or $C_6$-$C_{10}$ aryl;

each $R_{13}$ independently represents H or $C_1$-$C_6$ alkyl;

X is absent, $C_1$-$C_3$ alkylene, 1- to 3-membered heteroalkylene, or $(CH_2CH_2O)_r$;

Y is absent or $C_1$-$C_6$ alkylene;

q is an integer from 0 to 4; and r is an integer from 1 to 4.

In some aspects, $R_8$ is unsubstituted or substituted with one or more substituents selected from the group consisting of $C_1$-$C_6$ alkyl, $C_1$-$C_6$ alkoxy, $C_3$-$C_7$ cycloalkyl, $C_6$-$C_{10}$ aryl, $C_1$-$C_6$-alkoxy-$C_6$-$C_{10}$-aryl, —O(CO)—($C_1$-$C_6$)alkyl, —COO—($C_1$-$C_6$)alkyl, =O, —F, —Cl, and —Br.

In certain aspects, the composition comprises a glass transition temperature ($T_g$) modifier that has a higher glass transition temperature than the toughness modifier and that is a polymerizable oligomer having a number average molecular weight of 0.4 to 5 kDa, wherein the $T_g$ modifier comprises a urethane group. In certain aspects, the composition comprises a glass transition temperature ($T_g$) modifier that has a higher glass transition temperature than the toughness modifier and that is a polymerizable oligomer having a number average molecular weight of 0.4 to 5 kDa, wherein the $T_g$ modifier comprises at least one methacrylate group. In some aspects, the composition comprises a glass transition temperature ($T_g$) modifier that has a higher glass transition temperature than the toughness modifier and that is a polymerizable oligomer having a number average molecular weight of 0.4 to 5 kDa, wherein the $T_g$ modifier is a compound of formula (I).

In some aspects, the composition further comprises 0.1 to 10 wt %, based on the total weight of the composition, of an additive. In some aspects, the additive is selected from a resin, a defoamer and a surfactant, or a combination thereof. In some aspects, the composition comprises 0.3 to 3.5 wt %, based on the total weight of the composition, of the additive. In some aspects, the composition further comprises 0.05 to 1 wt %, based on the total weight of the composition, of a photoblocker.

In various aspects, the present disclosure provides a crosslinked polymer prepared from any one of the composition disclosed above. In some aspects, the crosslinked polymer is characterized by one or more of: a stress relaxation of greater than or equal to 5% of the initial load; and a glass transition temperature of greater than or equal to 90° C. In certain aspects, the crosslinked polymer is further characterized by one or more of: a tensile modulus greater than or equal to 100 MPa; a tensile strength at yield greater than or equal to 5 MPa; an elongation at yield greater than or equal to 4%; an elongation at break greater than or equal to 5%; a storage modulus greater than or equal to 300 MPa; and a stress relaxation greater than or equal to 0.01 MPa.

In some aspects, the crosslinked polymer is characterized by a stress relaxation of 5% to 45% of the initial load. In certain aspects, the crosslinked polymer is characterized by a stress relaxation of 20% to 45% of the initial load. In some aspects, the crosslinked polymer is characterized by a glass transition temperature of 90° C. to 150° C. In certain aspects, the crosslinked polymer is characterized by a tensile modulus from 100 MPa to 2000 MPa. In some aspects, the crosslinked polymer is characterized by a tensile modulus from 800 MPa to 2000 MPa. In certain aspects, the crosslinked polymer is characterized by a tensile strength at yield of 5 MPa to 85 MPa. In some aspects, the crosslinked polymer is characterized by a tensile strength at yield of 20 MPa to 55 MPa. In certain aspects, the crosslinked polymer is characterized by a tensile strength at yield of 25 MPa to 55 MPa.

In certain aspects, the crosslinked polymer is characterized by an elongation at yield of 4% to 10%. In some aspects, the crosslinked polymer is characterized by an elongation at yield of 5% to 10%. In certain aspects the crosslinked polymer is characterized by an elongation at break of 5% to 250%. In some aspects, the crosslinked polymer is characterized by an elongation at break of 20% to 250%. In certain aspects, the crosslinked polymer is characterized by a storage modulus of 300 MPa to 3000 MPa. In some aspects, the crosslinked polymer is characterized by a storage modulus of 750 MPa to 3000 MPa.

In some aspects, the crosslinked polymer is characterized by a stress relaxation of 0.01 MPa to 15 MPa. In certain aspects, the crosslinked polymer is characterized by a stress relaxation of 2 MPa to 15 MPa.

In certain aspects, the crosslinked polymer is characterized by: a stress relaxation of greater than or equal to 20% of the initial load; a glass transition temperature of greater than or equal to 90° C.; a tensile modulus from 800 MPa to 2000 MPa; and an elongation at break greater than or equal to 20%.

In various aspects, the present disclosure provides a method of producing crosslinked polymers comprising: providing the composition disclosed above; and polymerizing said composition; thereby producing said crosslinked polymers. In some aspects, said step of polymerizing said composition is carried out using a high temperature lithography-based photopolymerization process.

In certain aspects, a solid or highly viscous resin formulation comprising said composition is heated to a predefined elevated process temperature and is subsequently irradiated with light of a suitable wavelength to be absorbed by the photoinitiator, thereby polymerizing and crosslinking the composition to obtain said crosslinked polymer. In some aspects, said elevated process temperature ranges from 50° C. to 120° C.

In some aspects, said photopolymerization process is a direct or additive manufacturing process. In certain aspects, said photopolymerization process is a 3D printing process.

In various aspects, the present disclosure provides a method of making an orthodontic appliance comprising a crosslinked polymer, the method comprising: providing the composition disclosed above; and fabricating the crosslinked polymer by a direct or additive fabrication process. In some aspects, the composition is exposed to light in said direct or additive fabrication process. In certain aspects, the method further comprises an additional curing step following fabrication of the crosslinked polymer.

In various aspects, the present disclosure provides a crosslinked polymer for use in an orthodontic appliance, wherein the crosslinked polymer is characterized by one or more of: a stress relaxation of greater than or equal to 5% of the initial load; and a glass transition temperature of greater than or equal to 90° C. In certain aspects, the crosslinked polymer is further characterized by one or more of: a tensile modulus greater than or equal to 100 MPa; a tensile strength at yield greater than or equal to 5 MPa; an elongation at yield greater than or equal to 4%; an elongation at break greater than or equal to 5%; a storage modulus greater than or equal to 300 MPa; and a stress relaxation greater than or equal to 0.01 MPa.

In some aspects, the crosslinked polymer is characterized by a stress relaxation of 5% to 45% of the initial load. In certain aspects, the crosslinked polymer is characterized by a stress relaxation of 20% to 45% of the initial load. In some aspects, the crosslinked polymer is characterized by a glass transition temperature of 90° C. to 150° C. In certain aspects, the crosslinked polymer is characterized by a tensile modulus from 100 MPa to 2000 MPa. In some aspects, the crosslinked polymer is characterized by a tensile modulus from 800 MPa to 2000 MPa.

In certain aspects, the crosslinked polymer is characterized by a tensile strength at yield of 5 MPa to 85 MPa. In some aspects, the crosslinked polymer is characterized by a tensile strength at yield of 20 MPa to 55 MPa. In certain aspects, the crosslinked polymer is characterized by a tensile strength at yield of 25 MPa to 55 MPa.

In certain aspects, the crosslinked polymer is characterized by an elongation at yield of 4% to 10%. In some aspects, the crosslinked polymer is characterized by an elongation at yield of 5% to 10%. In some aspects, the crosslinked polymer is characterized by an elongation at break of 5% to 250%. In certain aspects, the crosslinked polymer is characterized by an elongation at break of 20% to 250%.

In some aspects, the crosslinked polymer is characterized by a storage modulus of 300 MPa to 3000 MPa. In certain aspects, the crosslinked polymer is characterized by a storage modulus of 750 MPa to 3000 MPa. In some aspects, the crosslinked polymer is characterized by a stress relaxation of 0.01 MPa to 15 MPa. In certain aspects, the crosslinked polymer is characterized by a stress relaxation of 2 MPa to 15 MPa.

In some aspects, the crosslinked polymer is characterized by: a stress relaxation of greater than or equal to 20% of the initial load; a glass transition temperature of greater than or equal to 90° C.; a tensile modulus from 800 MPa to 2000 MPa; and an elongation at break greater than or equal to 20%.

In some aspects, the crosslinked polymer comprises a first repeating unit having a number average molecular weight of greater than 5 kDa, wherein the first repeating unit comprises carbonate and urethane groups. In certain aspects, the first repeating unit is derived from a (poly)carbonate-(poly)urethane dimethacrylate oligomer. In some aspects, the number average molecular weight of the (poly)carbonate-(poly)urethane dimethacrylate oligomer is between 5 kDa to 20 kDa. In some aspects, the number average molecular weight of the (poly)carbonate-(poly)urethane dimethacrylate oligomer is between 10 kDa to 20 kDa.

In some aspects, the crosslinked polymer comprises a second repeating unit having a number average molecular weight of 0.4 to 5 kDa, wherein the second repeating unit comprises a urethane group. In certain aspects, the second repeating unit is derived from a (poly)urethane dimethacrylate oligomer. In some aspects, the crosslinked polymer comprises a monomer of the formula:

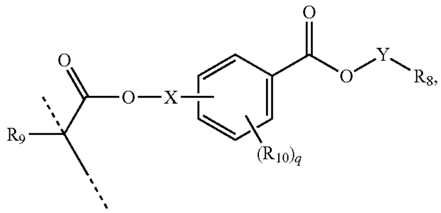

wherein:

$R_8$ represents optionally substituted $C_3$-$C_{10}$ cycloalkyl, optionally substituted 3- to 10-membered heterocycloalkyl, or optionally substituted $C_6$-$C_{10}$ aryl;

$R_9$ represents H or $C_1$-$C_6$ alkyl;

each $R_{10}$ independently represents halo, $C_1$-$C_3$ alkyl, $C_1$-$C_3$ alkoxy, $Si(R_{11})_3$, $P(O)(OR_{12})_2$, or $N(R_{13})_2$;

each $R_{11}$ independently represents $C_1$-$C_6$ alkyl or $C_1$-$C_6$ alkoxy;

each $R_{12}$ independently represents $C_1$-$C_6$ alkyl or $C_6$-$C_{10}$ aryl;

each $R_{13}$ independently represents H or $C_1$-$C_6$ alkyl;

X is absent, $C_1$-$C_3$ alkylene, 1- to 3-membered heteroalkylene, or $(CH_2CH_2O)_r$;

Y is absent or $C_1$-$C_6$ alkylene;

q is an integer from 0 to 4; and r is an integer from 1 to 4 wherein each dashed line represents a bond to a carbon atom.

In some aspects, $R_8$ is unsubstituted or substituted with one or more substituents selected from the group consisting of $C_1$-$C_6$ alkyl, $C_1$-$C_6$ alkoxy, $C_3$-$C_7$ cycloalkyl, $C_6$-$C_{10}$ aryl, $C_1$-$C_6$-alkoxy-$C_6$-$C_{10}$-aryl, —O(CO)—($C_1$-$C_6$)alkyl, —COO—($C_1$-$C_6$)alkyl, =O, —F, —Cl, and —Br.

In some aspects, the crosslinked polymer comprises 20 to 50 wt % of the first repeating unit based on the total weight of the crosslinked polymer. In certain aspects, the crosslinked polymer comprises 25 to 50% of the first repeating unit based on the total weight of the crosslinked polymer. In some aspects, the crosslinked polymer comprises 1 to 50 wt % of the second repeating unit based on the total weight of the crosslinked polymer. In certain aspects, the crosslinked polymer comprises 20 to 50 wt % of the second repeating unit based on the total weight of the crosslinked polymer. In some aspects, the crosslinked polymer comprises 1 to 80 wt % of the monomer based on the total weight of the crosslinked polymer. In certain aspects, the crosslinked polymer comprises 10 to 40 wt % of the monomer based on the total weight of the crosslinked polymer.

In various aspects, the present disclosure provides an orthodontic appliance comprising the crosslinked polymer described above. In some aspects, the orthodontic appliance is an aligner, expander or spacer. In certain aspects, the orthodontic appliance comprises a plurality of tooth receiving cavities configured to reposition teeth from a first configuration toward a second configuration. In some aspects, the orthodontic appliance is one of a plurality of orthodontic appliances configured to reposition the teeth from an initial configuration toward a target configuration. In certain aspects, the orthodontic appliance is one of a plurality of orthodontic appliances configured to reposition the teeth from an initial configuration toward a target configuration according to a treatment plan.

In various aspects, the present disclosure provides a curable composition for use in a high temperature lithography-based photopolymerization process, said composition comprising the following polymerizable Components A to C:

Component A being at least one oligomeric dimethacrylate according to the following chemical formula (I), serving as a glass transition temperature modifier:

(I)

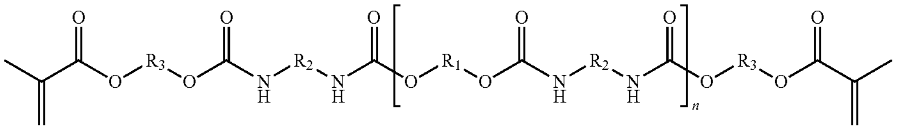

, wherein:

each $R_1$ and each $R_2$ independently represent a divalent, linear, branched or cyclic $C_5$-$C_{15}$ aliphatic radical, with the proviso that at least one of $R_1$ and $R_2$ is or comprises a $C_5$-$C_6$ cycloaliphatic structure, each $R_3$ independently represents a divalent, linear or branched $C_2$-$C_4$ alkyl radical, and n is an integer from 1 to 5, with the proviso that $R_1$, $R_2$, $R_3$ and n are selected so as to result in a number average molecular weight of the oligomeric dimethacrylate from 0.4 to 5 kDa;

Component B being at least one, optionally polyether-modified, (poly)carbonate-(poly)urethane dimethacrylate according to any one of the following chemical formulas (II), (III), (IV) or (V), serving as a toughness modifier:

(II)
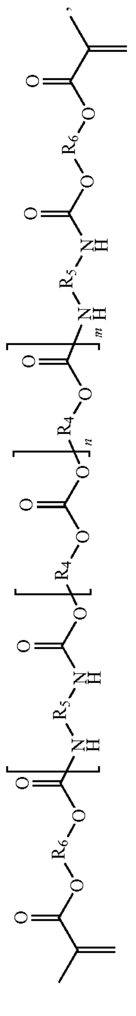
(III)
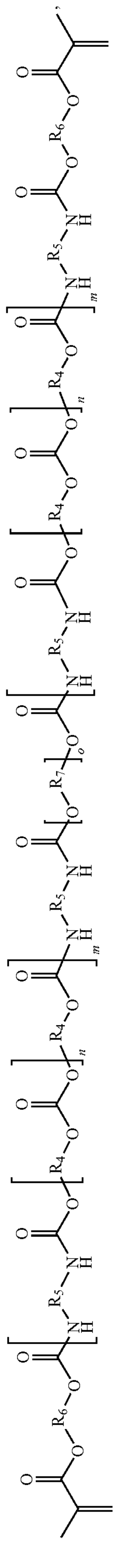
(IV)
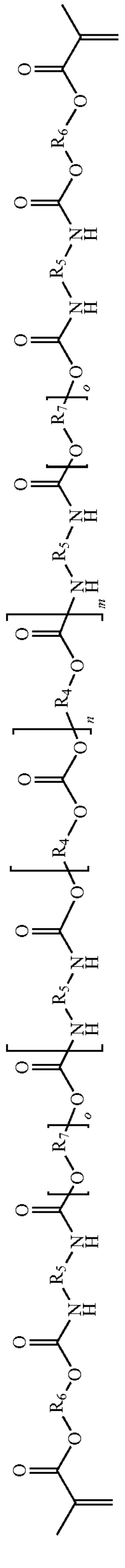
or
(V)
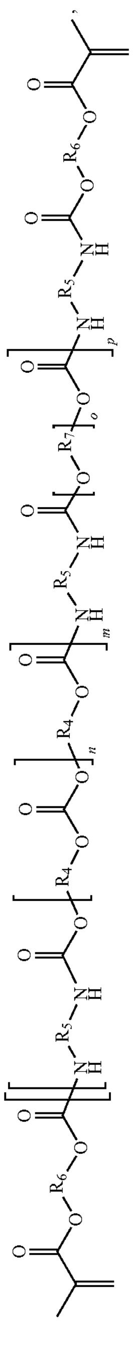

each $R_4$ and each $R_8$ independently represent a divalent, linear, branched or cyclic $C_5$-$C_{15}$ aliphatic radical, each $R_6$ independently represents a divalent, linear or branched $C_2$-$C_4$ alkyl radical, each $R_7$ independently represents a divalent, linear or branched $C_2$-$C_6$ alkyl radical, each n is independently an integer from 1 to 10, each m is independently an integer from 1 to 20, each o is independently an integer from 5 to 50, and p is an integer from 1 to 40, with the proviso that $R_4$, $R_5$, $R_6$, $R_7$, n, m, o and p are selected so as to result in a number average molecular weight of the (poly)carbonate-(poly)urethane dimethacrylate greater than 5 kDa; and Component C being at least one mono- or multifunctional methacrylate-based reactive diluent.

In some aspects, the amount of Component A ranges from 20 to 50 wt %, the amount of Component B ranges from 25 to 50 wt %, and the amount of Component C ranges from 10 to 40 wt %, based on the total weight of the curable composition. In certain aspects, $R_1$ is a divalent radical originating from a diol selected from the group consisting of 1,4-cyclohexanedimethanol (CHDM), 4,4'-isopropylidenedicyclohexanol (HBPA), 4,8-bis(hydroxymethyl)tricyclo[5.2.1.$0^{2,6}$]decane (HTCD), 3,9-bis(1,1-dimethyl-2-hydroxyethyl)-2,4,8,10-tetraoxaspiro[5.5]undecane, 1,3-bis(hydroxymethyl)adamantane, 1,4-, 1,3- or 1,2-dihydroxycyclohexane, 1,3-adamantanediol, 4-hydroxy-α,α,4-trimethylcyclohexanemethanol, 2,3-pinanediol, 1,6-hexanediol, and mixtures thereof. In some aspects, $R_1$ is a divalent radical originating from 1,4-cyclohexanedimethanol (CHDM).

In certain aspects, $R_2$ and $R_5$ are divalent radicals originating from a diisocyanate independently selected from the group consisting of isophorone diisocyanate (IPDI), hexamethylene diisocyanate (HDI), trimethylhexamethylene diisocyanate (2,2,4- and 2,4,4-mixture, TMDI), dicyclohexylmethane 4,4'-diisocyanate (HMDI), 1,3-bis(isocyanatomethyl)cyclohexane, and mixtures thereof. In some aspects, $R_2$ is a divalent radical originating from isophorone diisocyanate (IPDI) or hexamethylene diisocyanate (HDI).

In some aspects, $R_3$ and $R_6$ are divalent radicals originating from a diol independently selected from the group consisting of 1,2-ethanediol, 1,3-propanediol, 1,2-propanediol, 1,4-butanediol, and mixtures thereof. In certain aspects, $R_3$ and $R_6$ are divalent radicals originating from 1,2-ethanediol.

In certain aspects, $R_4$ is a divalent radical originating from a diol selected from the group consisting of 2,2-dimethyl-1,3-propanediol (DMP), 1,6-hexanediol, 1,4-cyclohexanedimethanol (CHDM), and mixtures thereof. In some aspects, $R_4$ is the alcoholic moiety of a polycarbonate.

In some aspects, $R_7$ is a divalent radical originating from a diol selected from the group consisting of $C_2$-$C_6$ alkanediols and mixtures thereof. In certain aspects, $R_7$ is a divalent radical originating from 1,4-butanediol.

In certain aspects, n in formula (I) is 1 or 2. In some aspects, n in the formulas (II) to (V) ranges from 5 to 8. In certain aspects, m in the formulas (II) to (V) ranges from 5 to 10. In certain aspects, o in the formulas (II) to (V) ranges from 35 to 45. In some aspects, p in the formulas (II) to (V) ranges from 2 to 5.

In some aspects, the methacrylate-based reactive diluent of Component C is selected from the group consisting of dimethacrylates of polyglycols, hydroxybenzoic acid ester (meth)acrylates, and mixtures thereof. In certain aspects, the reactive diluent is a cycloalkyl 2-, 3- or 4-((meth)acryloxy) benzoate. In some aspects, the reactive diluent is a compound of formula (VII):

(VII)

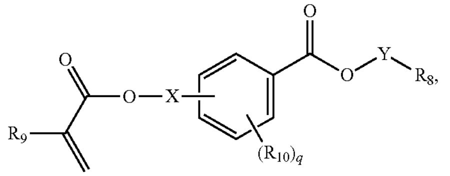

wherein:

$R_8$ represents optionally substituted $C_3$-$C_{10}$ cycloalkyl, optionally substituted 3- to 10-membered heterocycloalkyl, or optionally substituted $C_6$-$C_{10}$ aryl;

$R_9$ represents H or $C_1$-$C_6$ alkyl;

each $R_{10}$ independently represents halo, $C_1$-$C_3$ alkyl, $C_1$-$C_3$ alkoxy, $Si(R_{11})_3$, $P(O)(OR_{12})_2$, or $N(R_{13})_2$;

each $R_{11}$ independently represents $C_1$-$C_6$ alkyl or $C_1$-$C_6$ alkoxy;

each $R_{12}$ independently represents $C_1$-$C_6$ alkyl or $C_6$-$C_{10}$ aryl;

each $R_{13}$ independently represents H or $C_1$-$C_6$ alkyl;

X is absent, $C_1$-$C_3$ alkylene, 1- to 3-membered heteroalkylene, or $(CH_2CH_2O)_r$;

Y is absent or $C_1$-$C_6$ alkylene;

q is an integer from 0 to 4; and r is an integer from 1 to 4.

In certain aspects, $R_8$ is unsubstituted or substituted with one or more substituents selected from the group consisting of $C_1$-$C_6$ alkyl, $C_1$-$C_6$ alkoxy, $C_3$-$C_7$ cycloalkyl, $C_6$-$C_{10}$ aryl, $C_1$-$C_6$-alkoxy-$C_6$-$C_{10}$-aryl, —O(CO)—($C_1$-$C_6$)alkyl, —COO—($C_1$-$C_6$)alkyl, =O, —F, —Cl, and —Br.

In some aspects, Component A has a number average molecular weight of 1 to 2 kDa. In certain aspects, Component B has a number average molecular weight of 5 to 20 kDa.

In certain aspects, the composition additionally comprises, in admixture with said Components A, B and C, one or more further components selected from the group consisting of polymerization initiators, polymerization inhibitors, solvents, fillers, antioxidants, pigments, colorants, surface modifiers, core-shell particles, and mixtures thereof. In some aspects, the composition additionally comprises one or more photoinitiators.

In various aspects, the present disclosure provides a method of producing crosslinked polymers comprising: providing a curable composition comprising a composition as described above; and polymerizing said curable composition; thereby producing said crosslinked polymers. In some aspects, said step of polymerizing said curable composition is carried out using a high temperature lithography-based photopolymerization process.

In certain aspects, a solid or highly viscous resin formulation comprising said curable composition and at least one photoinitiator is heated to a predefined elevated process temperature and is subsequently irradiated with light of a suitable wavelength to be absorbed by the photoinitiator, thereby polymerizing and crosslinking the curable composition to obtain said crosslinked polymer. In some aspects, said elevated process temperature ranges from 50° C. to 120° C. In certain aspects, said elevated process temperature ranges from 90° C. to 120° C. In some aspects, said photopolymerization process is a direct or additive manufacturing process. In certain aspects, said photopolymerization process is a 3D printing process.

In various aspects, the present disclosure provides a crosslinked polymer, obtained by the method described above. In some aspects, the crosslinked polymer has one or more, or all, of the following properties: a tensile modulus greater than or equal to 100 MPa; an elongation at break greater than or equal to 5%; a stress relaxation of greater than or equal to 5% of the initial load; and a glass transition temperature of greater than or equal to 90° C. In certain aspects, the crosslinked polymer has one or more, or all, of the following properties: a tensile modulus greater than or equal to 800 MPa; an elongation at break greater than or equal to 20%; a stress relaxation of greater than or equal to 20% of the initial load; and a glass transition temperature of greater than or equal to 90° C. In some aspects, the crosslinked polymer has one or more, or all, of the following properties: a tensile modulus greater than or equal to 1,000 MPa; an elongation at break greater than or equal to 30%; a stress relaxation of greater than or equal to 35%; and a glass transition temperature of greater than or equal to 100° C. In certain aspects, said crosslinked polymer is biocompatible.

In various aspects, the present disclosure provides an orthodontic appliance comprising the crosslinked polymer described above. In certain aspects, the orthodontic appliance is an aligner, expander or spacer.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present disclosure will be obtained by reference to the following detailed description that sets forth illustrative embodiments, in which the principles of the invention are utilized, and the accompanying drawings of which:

DETAILED DESCRIPTION OF THE INVENTION

Figure 1A:
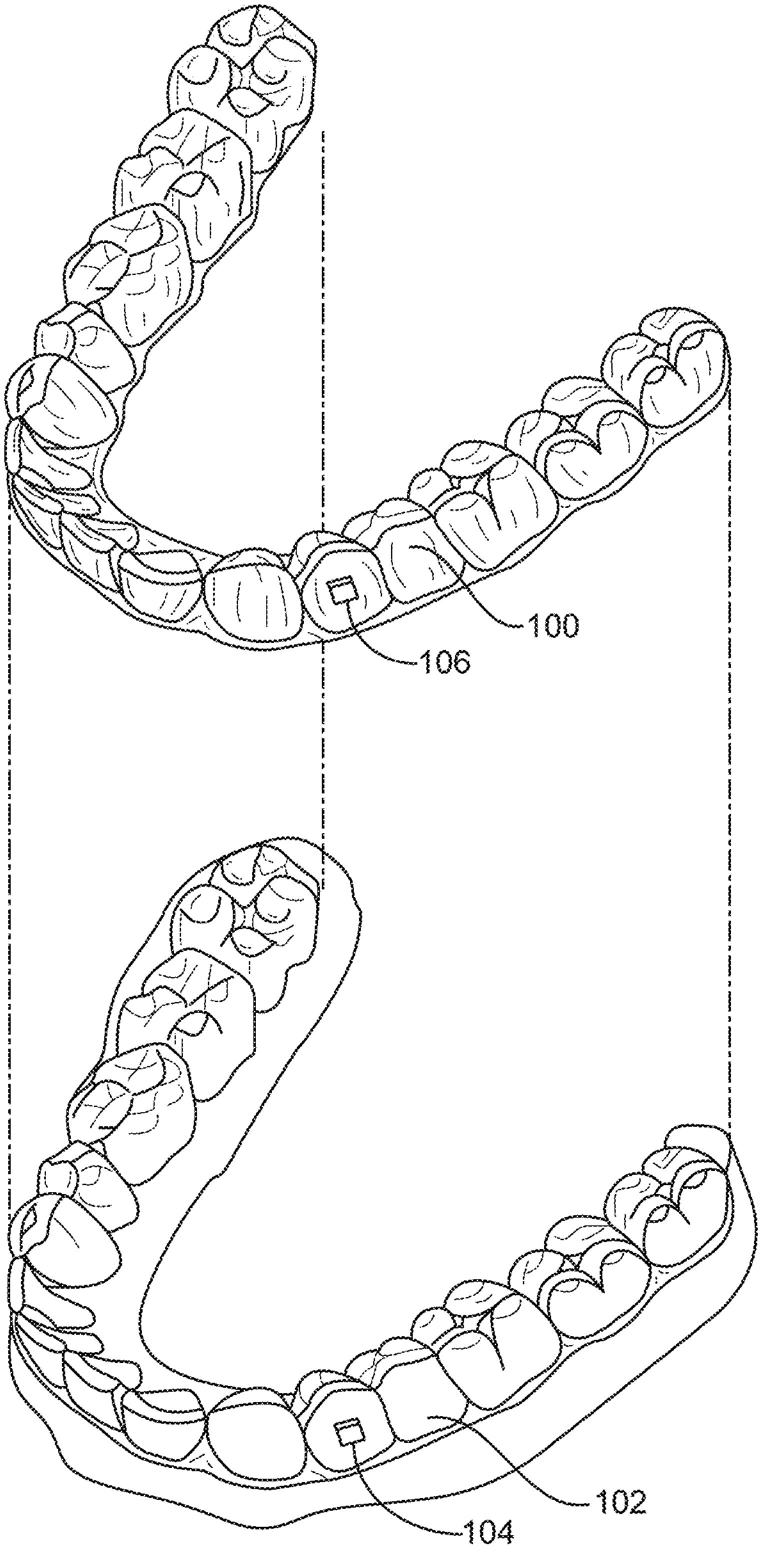
FIG. 1A illustrates a tooth repositioning appliance, in accordance with embodiments.

All terms, chemical names, expressions and designations have their usual meanings which are well-known to those skilled in the art. As used herein, the terms "to comprise" and "comprising" are to be understood as non-limiting, i.e. other components than those explicitly named may be included. Number ranges are to be understood as inclusive, i.e. including the indicated lower and upper limits.

As used herein, the term "polymer" refers to a molecule composed of repeating structural units connected by covalent chemical bonds and characterized by a substantial number of repeating units (e.g., equal to or greater than 10 repeating units and often equal to or greater than 50 repeating units and often equal to or greater than 100 repeating units) and a high molecular weight (e.g. greater than 5,000 Da, 10,000 Da or 20,000 Da). Polymers are commonly the polymerization product of one or more monomer precursors. The term polymer includes homopolymers, or polymers consisting essentially of a single repeating monomer subunit. The term polymer also includes copolymers which are formed when two or more different types of monomers are linked in the same polymer. Copolymers may comprise two or more monomer subunits, and include random, block, alternating, segmented, grafted, tapered and other copolymers. "Crosslinked polymers" refer to polymers having one or multiple links between at least two polymer chains, which preferably result from multivalent monomers forming crosslinking sites upon polymerization.

Herein, an "oligomer" refers to a molecule composed of repeating structural units connected by covalent chemical bonds and characterized by a number of repeating units less than that of a polymer (e.g., equal to or less than 10 repeating units) and a lower molecular weight than polymers (e.g. less than 5,000 Da or 2,000 Da). Oligomers may be the polymerization product of one or more monomer precursors. In an embodiment, an oligomer or a monomer cannot be considered a polymer in its own right.

A "prepolymer" refers to a polymer or oligomer the molecules of which are capable of entering, through reactive groups, into further polymerization.

Oligomers and polymer mixtures can be characterized and differentiated from other mixtures of oligomers and polymers by measurements of molecular weight and molecular weight distributions.

The average molecular weight (M) is the average number of repeating units n×the molecular weight or molar mass (Mi) of the repeating unit. The number-average molecular weight (Mn) is the arithmetic mean, representing the total weight of the molecules present divided by the total number of molecules. Number average molecular weights are typically measured by gel permeation chromatography.

Photoinitiators that are useful in the disclosure include those that can be activated with light and initiate polymerization of the polymerizable components of the formulation.

Photopolymerization occurs when suitable formulations are exposed to light of sufficient power and of a wavelength capable of initiating polymerization. The wavelengths and power of light useful to initiate polymerization depends on the initiator used. Light as used herein includes any wavelength and power capable of initiating polymerization. Preferred wavelengths of light include ultraviolet (UV) or visible. UV light sources include UVA (wavelength about 400 nm to about 320 nm), UVB (about 320 nm to about 290 nm) or UVC (about 290 nm to about 100 nm). Any suitable source may be used, including laser sources. The source may be broadband or narrowband, or a combination thereof. The light source may provide continuous or pulsed light during the process. Both the length of time the system is exposed to UV light and the intensity of the UV light can be varied to determine the ideal reaction conditions.

Additive manufacturing includes a variety of technologies which fabricate three-dimensional objects directly from digital models through an additive process. In some aspects, successive layers of material are deposited and "cured in place". A variety of techniques are known to the art for additive manufacturing, including selective laser sintering (SLS), fused deposition modeling (FDM) and jetting or extrusion. In many embodiments, selective laser sintering involves using a laser beam to selectively melt and fuse a layer of powdered material according to a desired cross-sectional shape in order to build up the object geometry. In many embodiments, fused deposition modeling involves melting and selectively depositing a thin filament of thermoplastic polymer in a layer-by-layer manner in order to form an object. In yet another example, 3D printing can be used to fabricate the appliances herein. In many embodiments, 3D printing involves jetting or extruding one or more materials onto a build surface in order to form successive layers of the object geometry.

Photopolymers may be fabricated by "vat" processes in which light is used to selectively cure a vat or reservoir of the photopolymer. Each layer of photopolymer may be selectively exposed to light in a single exposure or by scanning a beam of light across the layer. Specific techniques include stereolithography (SLA), Digital Light Processing (DLP) and two photon-induced photopolymerization (TPIP).

Continuous direct fabrication methods for photopolymers have also been reported. For example, a direct fabrication process can achieve continuous build-up of an object geometry by continuous movement of the build platform (e.g., along the vertical or Z-direction) during the irradiation phase, such that the hardening depth of the irradiated photopolymer is controlled by the movement speed. Accordingly, continuous polymerization of material on the build surface can be achieved. Such methods are described in U.S. Pat. No. 7,892,474, the disclosure of which is incorporated herein by reference in its entirety. In yet another example, a continuous direct fabrication method utilizes a "heliolithography" approach in which the liquid photopolymer is cured with focused radiation while the build platform is continuously rotated and raised. Accordingly, the object geometry can be continuously built up along a spiral build path. Such methods are described in U.S. Patent Publication No. 2014/0265034, the disclosure of which is incorporated herein by reference in its entirety. Continuous liquid interface production of 3D objects has also been reported (J. Tumbleston et al., Science, 2015, 347 (6228), pp 1349-1352) hereby incorporated by reference in its entirety for description of the process. Another example of continuous direct fabrication method can involve extruding a composite material composed of a curable liquid material surrounding a solid strand. The composite material can be extruded along a continuous three-dimensional path in order to form the object. Such methods are described in U.S. Patent Publication No. 2014/0061974, the disclosure of which is incorporated herein by reference in its entirety.

"Biocompatible" refers to a material that does not elicit an immunological rejection or detrimental effect, referred herein as an adverse immune response, when it is disposed within an in-vivo biological environment. For example, in embodiments a biological marker indicative of an immune response changes less than 10%, or less than 20%, or less than 25%, or less than 40%, or less than 50% from a baseline value when a human or animal is exposed to or in contact with the biocompatible material. Alternatively, immune response may be determined histologically, wherein localized immune response is assessed by visually assessing markers, including immune cells or markers that are involved in the immune response pathway, in and adjacent to the material. In an aspect, a biocompatible material or device does not observably change immune response as determined histologically. In some embodiments, the disclosure provides biocompatible devices configured for long-term use, such as on the order of weeks to months, without invoking an adverse immune response. Biological effects may be initially evaluated by measurement of cytotoxicity, sensitization, irritation and intracutaneous reactivity, acute systemic toxicity, pyrogenicity, subacute/subchronic toxicity and/or implantation. Biological tests for supplemental evaluation include testing for chronic toxicity.

"Bioinert" refers to a material that does not elicit an immune response from a human or animal when it is disposed within an in-vivo biological environment. For example, a biological marker indicative of an immune response remains substantially constant (plus or minus 5% of a baseline value) when a human or animal is exposed to or in contact with the bioinert material. In some embodiments, the disclosure provides bioinert devices.

In embodiments, the crosslinked polymers are characterized by a tensile stress-strain curve that displays a yield point after which the test specimen continues to elongate, but there is no increase in load. Such yield point behavior typically occurs "near" the glass transition temperature, where the material is between the glassy and rubbery regimes and may be characterized as having viscoelastic behavior. In embodiments, viscoelastic behavior is observed in the temperature range 20° C. to 40° C. The yield stress is determined at the yield point. In some embodiments, the yield point follows an elastic region in which the slope of the stress-strain curve is constant or nearly constant. In embodiments, the modulus is determined from the initial slope of the stress-strain curve or as the secant modulus at 1% strain (e.g. when there is no linear portion of the stress-strain curve). The elongation at yield is determined from the strain at the yield point. When the yield point occurs at a maximum in the stress, the ultimate tensile strength is less than the yield strength. For a tensile test specimen, the strain is defined by $\ln(l/l_0)$, which may be approximated by $(l-l_0)/l_0$ at small strains (e.g. less than approximately 10%) and the elongation is $l/l_0$, where $l$ is the gauge length after some deformation has occurred and $l_0$ is the initial gauge length. The mechanical properties can depend on the temperature at which they are measured. The test temperature may be below the expected use temperature for a dental appliance such as 35° C. to 40° C. In embodiments, the test temperature is 23±2° C.

In embodiments, the stress relaxation can be measured by monitoring the time-dependent stress resulting from a steady strain. The extent of stress relaxation can also depend on the temperature, relative humidity and other applicable conditions (e.g., presence of water). In embodiments, the test conditions for stress relaxation are a temperature is 37±2° C. at 100% relative humidity or a temperature of 37±2° C. in water.

The dynamic viscosity of a fluid indicates its resistance to shearing flows. The SI unit for dynamic viscosity is the Poiseuille (Pa·s). Dynamic viscosity is commonly given in units of centipoise, where 1 centipoise (cP) is equivalent to 1 mPa·s. Kinematic viscosity is the ratio of the dynamic viscosity to the density of the fluid; the SI unit is $m^2/s$. Devices for measuring viscosity include viscometers and rheometers. The viscosity of a composition described herein may be measured at 110° C. using a rheometer. For example, an MCR 301 rheometer from Anton Paar may be used for rheological measurement in rotation mode (PP-25, 50 s−1, 50-115° C., 3° C./min).

In certain aspects, the present disclosure provides a curable composition for use in a photopolymerization process, the composition comprising:

1 to 70 wt %, based on the total weight of the composition, of a toughness modifier, wherein the toughness modifier is a polymerizable oligomer having a number average molecular weight of greater than 5 kDa;

5 to 80 wt %, based on the total weight of the composition, of a reactive diluent, wherein the reactive diluent is a polymerizable compound having a molecular weight of 0.1 to 1.0 kDa; and 0.1 to 5 wt %, based on the total weight of the composition, of a photoinitiator;

wherein the viscosity of the composition is 1 to 70 Pa·s at 110° C.

In some embodiments, the composition comprises:

20 to 50 wt %, based on the total weight of the composition, of a toughness modifier, wherein the toughness modifier is a polymerizable oligomer having a number average molecular weight of greater than 10 kDa;

5 to 80 wt %, based on the total weight of the composition, of a reactive diluent, wherein the reactive diluent is a polymerizable compound having a molecular weight of 0.1 to 0.5 kDa; and 0.1 to 5 wt %, based on the total weight of the composition, of a photoinitiator;

wherein the viscosity of the composition is 1 to 70 Pa·s at 110° C.

Combining a toughness modifier and a reactive diluent to form a composition of the present disclosure results in a curable composition being well processible at the processing temperatures usually employed in high temperature lithography-based photopolymerization processes, i.e. temperatures between 90° C. and 120° C., as their viscosities at these temperatures are sufficiently low, despite the presence of the high molecular weight toughness modifier. Moreover, as such curable compositions typically comprise multiple divalent polymerizable components, they result in crosslinked polymers, more specifically in crosslinked polymers having excellent thermomechanical properties, as detailed below.

The toughness modifier and the reactive diluent are typically miscible and compatible in the methods described herein. When used in the subject compositions, the toughness modifier may provide for high elongation at break and toughness via strengthening effects, and the reactive diluent may improve the processability of the formulations, particularly of those comprising high amounts of toughness modifiers, while maintaining high values for strength and $T_g$.

A toughness modifier of the subject compositions may have a low glass transition temperature ($T_g$), such as a $T_g$ less than 0° C. In some examples, the $T_g$ of the toughness modifier may be less than 25° C., such as less than 15° C., less than 10° C., less than 5° C., less than 0° C., less than −5° C., or less than −10° C. The $T_g$ of a polymer or composition described herein may be assessed using dynamic mechanical analysis (DMA) and is provided herein as the tan δ peak.

The toughness modifier can be a component having a low glass transition temperature (e.g., below 0° C.), which can add to tough behavior if used above its glass transition temperature. The toughness modifier can have a molecular weight greater than 5 kDa, 6 kDa, 7 kDa, 8 kDa, 9 kDa, 10 kDa, 11 kDa, 12 kDa, 13 kDa, 14 kDa, 15 kDa, 16 kDa, 17 kDa, 18 kDa, 19 kDa, 20 kDa, 21 kDa, 22 kDa, 23 kDa, 24 kDa, or greater than 25 kDa. In certain embodiments, the toughness modifier can have a molecular weight greater than 5 kDa, such as a molecular weight greater than 10 kDa. The curable composition can comprise 10 to 70 wt %, 10 to 60 wt %, 10 to 50 wt %, 10 to 40 wt %, 10 to 30 wt %, 10 to 25 wt %, 20 to 60 wt %, 20 to 50 wt %, 20 to 40 wt %, 20 to 35 wt %, 20 to 30 wt %, 25 to 60 wt %, 25 to 50 wt %, 25 to 45 wt %, 25 to 40 wt %, or 25 to 35 wt %, based on the total weight of the composition, of the toughness modifier. In certain embodiments, the curable composition may comprise 25 to 35 wt %, based on the total weight of the composition, of the toughness modifier. In certain embodiments, the curable composition may comprise 20 to 40 wt %, based on the total weight of the composition, of the toughness modifier.

The toughness modifier may comprise a polyolefin, a polyester, a polyurethane, a polyvinyl, a polyamide, a polyether, a polyacrylic, a polycarbonate, a polysulfone, a polyarylate, a cellulose-based resin, a polyvinyl chloride resin, a polyvinylidene fluoride, a polyvinylidene chloride, a cycloolefin-based resin, a polybutadiene, a glycidyl methacrylate, or a methyl acrylic ester. For example, the toughness modifier may comprise a urethane group, a carbonate group, or both a urethane group and a carbonate group.

In some embodiments, the toughness modifier comprises at least one methacrylate group, such as at least two methacrylate groups. In some embodiments, the toughness modifier comprises at least one acrylate. The toughness modifier can be an acrylate selected from an epoxy acrylate (e.g., a Bisphenol A epoxy acrylate), an epoxy methacrylate (e.g., a Bisphenol A epoxy methacrylate), a novolac type epoxy acrylate (e.g., cresol novolac epoxy acrylate or phenol novolac epoxy acrylate), a modified epoxy acrylate (e.g., phenyl epoxy acrylate, aliphatic alkyl epoxy acrylate, soybean oil epoxy acrylate, Photocryl® DP296, Photocryl® E207/25TP, Photocryl® E207/25HD, or Photocryl® E207/30PE), a urethane acrylate, an aliphatic urethane acrylate (e.g., aliphatic difunctional acrylate, aliphatic trifunctional acrylate, aliphatic multifunctional acrylate), an aromatic urethane acrylate (e.g., aromatic difunctional acrylate, aromatic trifunctional acrylate, aromatic multifunctional acrylate), a polyester acrylate (e.g., trifunctional polyester acrylate, tetrafunctional polyester acrylate, difunctional polyester acrylate, hexafunctional polyester acrylate), a silicone acrylate (e.g., silicone urethane acrylate, silicone polyester acrylate), a melamine acrylate, a dendritic acrylate, an acrylic acrylate, a caprolactone monomer acrylate (e.g., caprolactone methacrylate, caprolactone acrylate), an oligo amine acrylate (e.g., amine acrylate, aminated polyester acrylate), a derivative thereof, or a combination thereof. Non-limiting examples of aliphatic urethane acrylates include difunctional aliphatic acrylates (e.g., Miramer PU210, Miramer PU2100, Miramer PU2560, Miramer SC2404, Miramer SC2565, Miramer UA5216, Miramer U307, Miramer U3195, or Photocryl DP102), trifunctional aliphatic acyrlates (e.g., Miramer PU320, Miramer PU340, Miramer PU3450, Miramer U375, or Photocryl DP225), tetrafunctional aliphatic acrylates (e.g., Miramer U3304), hexafunctional aliphatic acrylates (e.g., Miramer MU9800), and multifunctional aliphatic acrylates (e.g., Miramer MU9800 or Miramer SC2152).

In some embodiments, the toughness modifier comprises acrylic monomers selected from n-butyl acrylate, iso-decyl acrylate, n-decyl methacrylate, n-dodecyl acrylate, n-dodecyl methacrylate, 2-ethylhexyl acrylate, 2-(2-ethoxy-ethoxy)ethyl acrylate, n-hexyl acrylate, 2-methoxyethyl-acrylate, n-octyl methacrylate, 2-phenylethyl acrylate, n-propyl acrylate, and tetrahydrofurfuryl acrylate. In some embodiments, the toughness modifier is a poly(ether-sulfone), a poly(sulfone), a poly(etherimide), or a combination thereof. In certain embodiments, the toughness modifier is a polypropylene or a polypropylene derivative. In some embodiments, the toughness modifier is a rubber or a rubber derivative. In certain embodiments, the toughness modifier is a polyethylene or a derivative thereof. In some embodiments, the toughness modifier comprises fluorinated acrylic monomers, which can be selected from 1H,1H-heptafluorobutyl acrylate, 1H,1H,3H-hexafluorobutyl acrylate, 1H,1H,5H-octafluoropentyl acrylate, or 2,2,2-trifluoroethyl acrylate.

In some embodiments, the toughness modifier is acetaldehyde, allyl glycidyl ether, trans-butadiene, 1-butene, butyl acrylate, sec-butyl acrylate, benzyl acrylate, butyl glydicyl ether, butyl methacrylate, butyl vinyl ether, ε-caprolactone, cis-chlorobutadiene, trans-chlorobutadiene, 2-cyanoethyl acrylate, cyclohexyl acrylate, diethylaminoethyl methacrylate, isobutyl acrylate, isobutylene, isobutyl vinyl ether, cis-isoprene, trans-isoprene, isotatic isopropyl acrylate, 2-methoxyethyl acrylate, methyl acrylate, methyl glicidyl ether, methylphenylsiloxane, methyl vinyl ether, octadecyl methacrylate, 1-octene, octyl methacrylate, dimethylsiloxane, dodecyl acrylate, dodecyl methacrylate, dodecyl vinyl ether, epibromohydrin, epichlorohydrin, 1,2-epoxybutane, 1,2-epoxydecane, 1,2-epoxyoctane, 2-ethoxyethyl acrylate, ethyl acrylate, HDPE ethylene, ethylene adipate, ethylene-trans-1,4-cyclohexyldicarboxylate, ethylene malonate, ethylene oxide, 2-ethylhexyl acrylate, 2-ethylhexyl methacrylate, 2-ethylhexyl vinyl ether, ethyl vinyl ether, formaldehyde, hexyl acrylate, hexadecyl methacrylate, hexyl methacrylate, atactic propylene, isotactic propylene, sydiotatic propylene, propylene oxide, propyl vinyl ether, tetrahydrofuran, tetramethylene adipate, 2,2,2-trifluoroethyl acrylate, trimethylene oxide, vinylidene chloride, vinylidene fluoride, vinyl propionate, a derivative thereof, or a combination thereof.

In some embodiments, the toughness modifier (also referred to herein as the toughening modifier) comprises a chlorinated polyethylene, a methacrylate, a copolymer of a chlorinated polyethylene and methacrylate, a derivative thereof, or a combination thereof. In some embodiments, the toughening modifier is a rubber powder. In some embodiments, the toughening modifier is an anhydride-grafted polymer, an anhydride polymer, or a combination thereof containing epoxy groups. In certain embodiments, the anhydride-grafted polymer is a grafted anhydride-modified thermoplastic elastomer, and can comprise a styrene-based thermoplastic elastomer comprising styrene units and units of an olefin (e.g. ethylene, propylene or butene), such as a styrene-butadiene-styrene (SBS), styrene-isoprene-styrene (SIS), styrene ethylene-butadiene-styrene (SEBS), styrene-ethylene-propylene-styrene (SEPS) copolymers. Suitable anhydrides include unsaturated carboxylic acid anhydride, wherein the carboxylic acid is an acrylic acid, methacrylic acid, α-methyl acrylic acid, maleic acid, fumaric acid, itaconic acid, citraconic acid, tetrahydrophthalic acid, methyl-tetrahydrophthalic acid, or combinations thereof.

Specific toughness modifiers suitable for use in the subject compositions are described herein below, including compounds of formula (II), (III), (IV) or (V). In some embodiments, the toughness modifier is selected from UA5216 (Miwon), a compound of formula (II), a compound of formula (III), a compound of formula (IV), a compound of formula (V), TNM1, TNM2, TNM3, TNM4, TNM5, and TNM6.

A reactive diluent of the subject compositions typically has a low viscosity. One or more reactive diluents may be included in the composition to reduce the viscosity of the composition, e.g., to a viscosity less than the viscosity of the composition in the absence of the reactive diluent. The reactive diluent(s) may reduce the viscosity of the composition by at least 10%, such as by at least 20%, at least 30%, at least 40%, at least 50%, at least 60%, at least 70%, at least 80%, or at least 90%. The curable composition can comprise 5 to 80 wt %, 5 to 70 wt %, 5 to 60 wt %, 5 to 50 wt %, 5 to 40 wt %, 5 to 30 wt %, 5 to 25 wt %, 5 to 20 wt %, 10 to 70 wt %, 10 to 60 wt %, 10 to 50 wt %, 10 to 40 wt %, 10 to 30 wt %, 10 to 25 wt %, 20 to 70 wt %, 20 to 60 wt %, 20 to 50 wt %, 20 to 40 wt %, 20 to 35 wt %, or 20 to 30 wt %, based on the total weight of the composition, of the reactive diluent. In certain embodiments, the curable composition may comprise 5 to 80 wt %, based on the total weight of the composition, of the reactive diluent. In certain embodiments, the curable composition may comprise 5 to 50 wt %, based on the total weight of the composition, of the reactive diluent. The reactive diluent of the curable composition may be monofunctional. In some embodiments, the reactive diluent comprises a methacrylate. In some embodiments, the reactive diluent comprises a dimethacrylate. The reactive diluent may be selected from the group consisting of dimethacrylates of polyglycols, hydroxybenzoic acid ester (meth)acrylates, and mixtures thereof. Optionally, the reactive diluent is a cycloalkyl 2-, 3- or 4-((meth)acryloxy) benzoate. In some embodiments, the reactive diluent is a compound of formula (VII):

(VII)

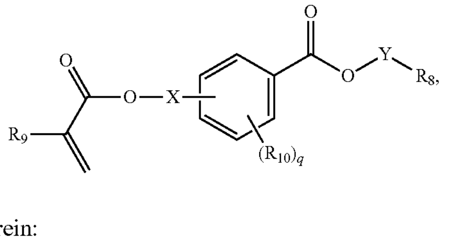

wherein:

$R_8$ represents optionally substituted $C_3$-$C_{10}$ cycloalkyl, optionally substituted 3- to 10-membered heterocycloalkyl, or optionally substituted $C_6$-$C_{10}$ aryl;

$R_9$ represents H or $C_1$-$C_6$ alkyl;

each $R_{10}$ independently represents halo, $C_1$-$C_3$ alkyl, $C_1$-$C_3$ alkoxy, $Si(R_{11})_3$, $P(O)(OR_{12})_2$, or $N(R_{13})_2$;

each $R_{11}$ independently represents $C_1$-$C_6$ alkyl or $C_1$-$C_6$ alkoxy;

each $R_{12}$ independently represents $C_1$-$C_6$ alkyl or $C_6$-$C_{10}$ aryl;

each $R_{13}$ independently represents H or $C_1$-$C_6$ alkyl;

X is absent, $C_1$-$C_3$ alkylene, 1- to 3-membered heteroalkylene, or $(CH_2CH_2O)_r$;

Y is absent or $C_1$-$C_6$ alkylene;

q is an integer from 0 to 4; and r is an integer from 1 to 4.

In some embodiments, for a compound of formula (VII), $R_8$ may be unsubstituted or substituted with one or more substituents selected from the group consisting of $C_1$-$C_6$ alkyl, $C_1$-$C_6$ alkoxy, $C_3$-$C_7$ cycloalkyl, $C_6$-$C_{10}$ aryl, $C_1$-$C_6$-alkoxy-$C_6$-$C_{10}$-aryl, —O(CO)—($C_1$-$C_6$)alkyl, —COO—($C_1$-$C_6$)alkyl, =O, —F, —Cl, and —Br. Specific reactive diluents suitable for use in the subject compositions are described herein below, including compounds of formula (VI) and (VII). In some embodiments, the reactive diluent is selected from TEGDMA (triethylene glycol dimethacrylate) (Aldrich), D4MA (1,12-dodecanediol dimethacrylate) (Aldrich), HSMA (3,3,5-trimethylcyclohexyl 2-(methacryloxy) benzoate) (EAG), BSMA (benzyl salicylate methacrylate) (EAG), a compound of formula (VI), and a compound of formula (VII).

A curable composition of the present disclosure may further comprise 0 to 50 wt %, based on the total weight of the composition, of a glass transition temperature ($T_g$) modifier (also referred to herein as a $T_g$ modifier, a glass transition modifier, a crosslinker, and a cross-linker). The $T_g$ modifier can have a high glass transition temperature, which leads to a high heat deflection temperature, which can be necessary to use a material at elevated temperatures. In some embodiments, the curable composition comprises 0 to 80 wt %, 0 to 75 wt %, 0 to 70 wt %, 0 to 65 wt %, 0 to 60 wt %, 0 to 55 wt %, 0 to 50 wt %, 1 to 50 wt %, 2 to 50 wt %, 3 to 50 wt %, 4 to 50 wt %, 5 to 50 wt %, 10 to 50 wt %, 15 to 50 wt %, 20 to 50 wt %, 25 to 50 wt %, 30 to 50 wt %, 35 to 50 wt %, 0 to 40 wt %, 1 to 40 wt %, 2 to 40 wt %, 3 to 40 wt %, 4 to 40 wt %, 5 to 40 wt %, 10 to 40 wt %, 15 to 40 wt %, or 20 to 40 wt % of a $T_g$ modifier. In certain embodiments, the curable composition comprises 0-50 wt % of a glass transition modifier. The $T_g$ modifier typically has a higher $T_g$ than the toughness modifier. Optionally, the number average molecular weight of the $T_g$ modifier is 0.4 to 5 kDa. In some embodiments, the number average molecular weight of the $T_g$ modifier is from 0.1 to 5 kDa, from 0.2 to 5 kDa, from 0.3 to 5 kDa, from 0.4 to 5 kDa, from 0.5 to 5 kDa, from 0.6 to 5 kDa, from 0.7 to 5 kDa, from 0.8 to 5 kDa, from 0.9 to 5 kDa, from 1.0 to 5 kDa, from 0.1 to 4 kDa, from 0.2 to 4 kDa, from 0.3 to 4 kDa, from 0.4 to 4 kDa, from 0.5 to 4 kDa, from 0.6 to 4 kDa, from 0.7 to 4 kDa, from 0.8 to 4 kDa, from 0.9 to 4 kDa, from 1 to 4 kDa, from 0.1 to 3 kDa, from 0.2 to 3 kDa, from 0.3 to 3 kDa, from 0.4 to 3 kDa, from 0.5 to 3 kDa, from 0.6 to 3 kDa, from 0.7 to 3 kDa, from 0.8 to 3 kDa, from 0.9 to 3 kDa, or from 1 to 3 kDa. The toughness modifier, the reactive diluent and the $T_g$ modifier are typically miscible and compatible in the methods described herein. When used in the subject compositions, the $T_g$ modifier may provide for high $T_g$ and strength values, sometimes at the expense of elongation at break. The toughness modifier may provide for high elongation at break and toughness via strengthening effects, and the reactive diluent may improve the processability of the formulations, particularly of those comprising high amounts of toughness modifiers, while maintaining high values for strength and $T_g$.

The $T_g$ modifier may comprise a urethane group. In some embodiments, the $T_g$ modifier comprises at least one methacrylate group. The curable composition may comprise 10 to 20 wt %, based on the total weight of the composition, of the $T_g$ modifier. The $T_g$ modifier may comprise a urethane group. In some embodiments, the $T_g$ modifier comprises at least one methacrylate group. The curable composition may comprise 20 to 40 wt %, based on the total weight of the composition, of the $T_g$ modifier. The $T_g$ modifier may comprise a urethane group. In some embodiments, the $T_g$ modifier comprises at least one methacrylate group. The curable composition may comprise 10 to 50 wt %, based on the total weight of the composition, of the $T_g$ modifier. Specific $T_g$ modifiers suitable for use in the subject compositions are described herein below, including compounds of formula (I). In some embodiments, the $T_g$ modifier is selected from H1188 (bis((2-((methacryloyloxy)methyl)octahydro-1H-4,7-methanoinden-5-yl)methyl)cyclohexane-1,4-dicarboxylate), TGM1, TGM2, TGM3, TGM4, and a compound of formula (I). In some embodiments, the $T_g$ modifier is a derivative of H1188 (DMI), TGM1, TGM2, TGM3, TGM4, or a derivative of the compound of formula (I). In some embodiments, the $T_g$ modifier is a blend of modifiers comprising H1188 (DMI), TGM1, TGM2, TGM3, TGM4, or a compound of formula (I). In some embodiments, the $T_g$ modifier is H1188:

H1188

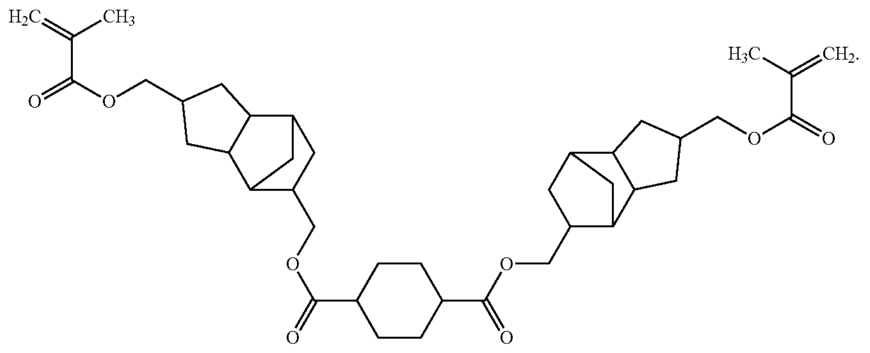

In some embodiments, the $T_g$ modifier is TGM1:
TGM1
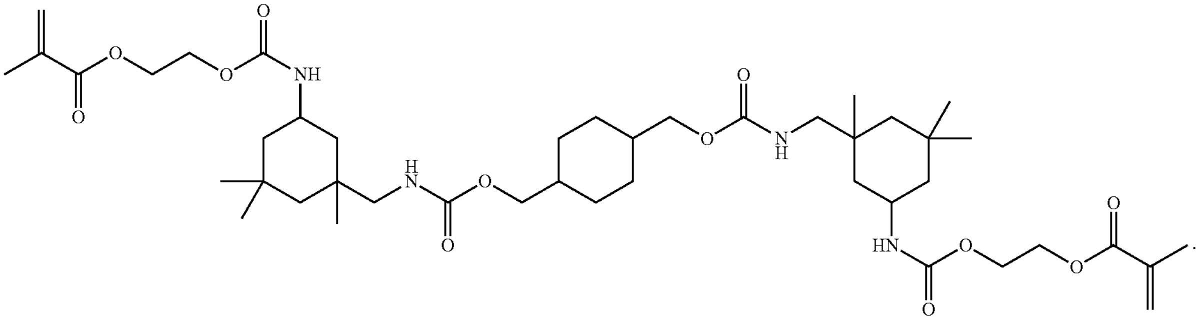
In some embodiments, the $T_g$ modifier is TGM2:
TGM2
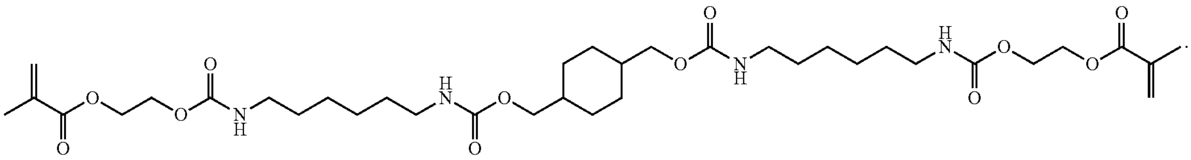
In some embodiments, the $T_g$ modifier is TGM3:
TGM3
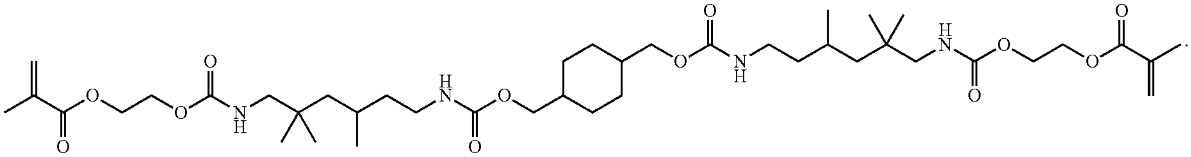
In some embodiments, the $T_g$ modifier is TGM4:
TGM4
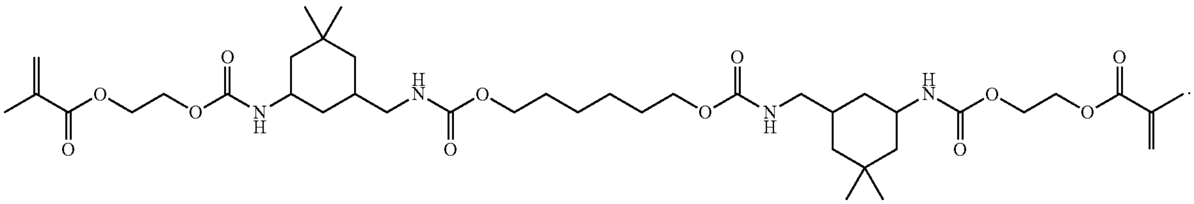

In some embodiments, the $T_g$ modifier is a compound of Formula (I):

(I)

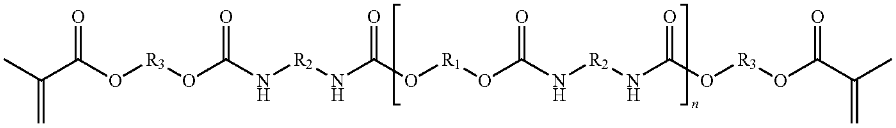

wherein:

each $R_1$ and each $R_2$ independently represent a divalent, linear, branched or cyclic $C_5$-$C_{15}$ aliphatic radical, with the proviso that at least one of $R_1$ and $R_2$ is or comprises a $C_5$-$C_6$ cycloaliphatic structure, each $R_3$ independently represents a divalent, linear or branched $C_2$-$C_4$ alkyl radical, and n is an integer from 1 to 5, with the proviso that $R_1$, $R_2$, $R_3$ and n are selected so as to result in a number average molecular weight of the oligomeric dimethacrylate from 0.4 to 5 kDa.

In some embodiments, the $T_g$ modifier comprises a plurality of aliphatic rings. In certain embodiments, the $T_g$ modifier comprises a plurality of aliphatic rings. In some embodiments, the aliphatic rings are hydrocarbon rings. In some embodiments, the aliphatic rings are saturated. In some embodiments, the plurality of aliphatic rings comprise cyclobutane, cyclopentane, cyclohexane, cycloheptane, cyclooctane, cyclononane, cyclodecane, or any combination thereof. In some embodiments, the plurality of aliphatic rings include bridged ring structures. In some embodiments, the plurality of aliphatic rings include fused ring structures. In certain embodiments, the middle portion of the $T_g$ modifier comprises a cyclohexane-1,4-dicarboxylic acid, a cyclohexanedimethanol, a cyclohexane-1,4-diylbis(methylene)dicarbamate, or a combination thereof. In certain embodiments, the center of the Tg modifier structure comprises a cyclohexane-1,4-diylbis(methylene)dicarbamate (e.g., TGM1, TGM2, and TGM3).

In some embodiments, the $T_g$ modifier comprises a methacrylate. In some embodiments, the $T_g$ modifier comprises at least two methacrylates. In certain embodiments, the $T_g$ modifier has terminal portions comprising methacrylates. In some embodiments, the $T_g$ modifier has a structure that terminates at each end with a methacrylate. In some embodiments, the $T_g$ modifier is a bis(2-methacrylate) (e.g., TGM1, TGM2, TGM3, TGM4, and H1188).

In some embodiments, the $T_g$ modifier comprises a blend of components, selected from TGM1, TGM2, TGM3, TGM4, H1188, a compound of formula (I), D3MA (1,10-decanediol dimethacrylate), D4MA (1,12-dodecanediol dimethacrylate), RDI, LPU624, a derivative thereof, or a combination thereof.

A curable composition of the present disclosure may further comprise 0.1 to 10 wt %, based on the total weight of the composition, of an additive. Additives may increase the performance or processability of the composition in direct or additive manufacturing processes. The additive may be selected from a resin, a defoamer and a surfactant, or a combination thereof. A resin included in the composition as an additive may be highly functional, which may reduce the time to gel. One or more defoamers may be added to the composition to reduce foam in the formulation, which may lead to fewer defects (e.g., air pockets) in a polymer prepared from the composition. A surfactant may be added to reduce surface tension of the composition, which may improve processing in an additive manufacturing process, such as 3D-printing. In some embodiments, the composition comprises from 0.01 to 20 wt %, from 0.01 to 15 wt %, from 0.01 to 10 wt %, from 0.01 to 9 wt %, from 0.01 to 8 wt %, from 0.01 to 7 wt %, from 0.01 to 6 wt %, from 0.01 to 5 wt %, from 0.1 to 10 wt %, from 0.1 to 9 wt %, from 0.1 to 8 wt %, from 0.1 to 7 wt %, from 0.1 to 6 wt %, from 0.1 to 5 wt %, from 0.5 to 10 wt %, from 0.5 to 9 wt %, from 0.5 to 8 wt %, from 0.5 to 7 wt %, from 0.5 to 6 wt %, from 0.5 to 5 wt %, from 1 to 10 wt %, from 1 to 9 wt %, from 1 to 8 wt %, from 1 to 7 wt %, from 1 to 6 wt %, or from 1 to 5 wt %, based on the total weight of the composition, of an additive. In some embodiments, the composition comprises 0.3 to 3.5 wt %, based on the total weight of the composition, of an additive. In some embodiments, the defoamer comprises a modified urea (e.g., BYK®-7411 ES, BYK®-7420 ES, and BYK®-7410 ET), a silicone-free foam-destroying polymer (e.g., BYK®-A 535), a composition having a short siloxane backbone and long organic modifications (e.g., TEGO® RAD 2100), a silica-base defoamer, a hydrophobic silica, a wax, a fatty alcohol, a fatty acid, or a wetting component (e.g., a silicone-free wetting compound, such as TEGO® Wet 510). In some embodiments, the defoamer is selected from the group consisting of BYK®-7411 ES, BYK®-7420 ES, BYK®-7410 ET, BYK®-A 535, TEGO® RAD2100, and TEGO® WET510. In some embodiments, the additive is a surfactant selected from the group consisting of an amphoteric surfactant, a zwitterionic surfactant, an anionic surfactant, a nonionic surfactant, a cationic surfactant, or any combination thereof. The cationic surfactant is selected from quaternary salts, certain amines and combinations thereof. In some embodiments, the additive is selected from SIU2400 (Miwon), BDT1006 (Dymax), BYK®-430, and BYK®-A535.

In some embodiments, the composition further comprises 0.05 to 1 wt %, 0.05 to 2 wt %, 0.05 to 3 wt %, 0.05 to 4 wt %, 0.05 to 5 wt %, 0.1 to 1 wt %, 0.1 to 2 wt %, 0.1 to 3 wt %, 0.1 to 4 wt %, 0.1 to 5 wt %, 0.1 to 6 wt %, 0.1 to 7 wt %, 0.1 to 8 wt %, 0.1 to 9 wt %, or 0.1 to 10 wt %, based on the total weight of the composition, of a photoblocker. The photoblocker can absorb irradiation and prevent or decrease the rate of polymerization or degradation, and its addition to the curable composition can increase the resolution of printable materials. In certain embodiments, the photoblocker comprises a hydroquinone, 1,4-dihydroxybenzene, a compound belonging to the HALS (hindered-amine light stabilizer) family, a benzophenone, a benzotriazole, any derivative thereof, or any combination thereof. In some embodiments, the photoblocker comprises 2,2'-dihydroxy-4-methoxybenzophenone. In certain embodiments, the photoblocker is selected from the group consisting of Michler's ketone, 4-Allyloxy-2-hydroxybenzophenone 99%, 2-(2H-Benzotriazol-2-yl)-4,6-bis(1-methyl-1-phenylethyl)phenol powder, 2-(2H-Benzotriazol-2-yl)-4,6-di-tert-pentylphenol, 2-(2H-Benzotriazol-2-yl)-6-dodecyl-4-methylphenol, 2-[3-(2H-Benzotriazol-2-yl)-4-hydroxyphenyl]ethyl methacrylate, 2-(2H-Benzotriazol-2-yl)-4-methyl-6-(2-propenyl)phenol, 2-(2H-Benzotriazol-2-yl)-4-(1,1,3,3-tetramethylbutyl) phenol, 2-(4-Benzoyl-3-hydroxyphenoxy)ethyl acrylate, 3,9-Bis(2,4-dicumylphenoxy)-2,4,8,10-tetraoxa-3,9-diphosphaspiro[5.5]undecane, Bis(octadecyl)hydroxylamine powder, 3,9-Bis(octadecyloxy)-2,4,8,10-tetraoxa-3,9-diphosphaspiro[5.5]undecane, Bis(1-octyloxy-2,2,6,6-tetramethyl-4-piperidyl) sebacate, Bis(2,2,6,6-tetramethyl-4-piperidyl) sebacate, 2-tert-Butyl-6-(5-chloro-2H-benzotriazol-2-yl)-4-methylphenol, 2-tert-Butyl-4-ethylphenol, 5-Chloro-2-hydroxybenzophenone, 5-Chloro-2-hydroxy-4-methylbenzophenone, 2,4-Di-tert-butyl-6-(5-chloro-2H-benzotriazol-2-yl)phenol, 2,6-Di-tert-butyl-4-(dimethylaminomethyl) phenol, 3',5'-Dichloro-2'-hydroxyacetophenone, Didodecyl 3,3'-thiodipropionate, 2,4-Dihydroxybenzophenone, 2,2'-Dihydroxy-4-methoxybenzophenone, 2',4'-Dihydroxy-3'-propylacetophenone, 2,3-Dimethylhydroquinone, 2-(4,6-Diphenyl-1,3,5-triazin-2-yl)-5-[(hexyl)oxy]-phenol, 5-Ethyl-1-aza-3,7-dioxabicyclo[3.3.0]octane, Ethyl 2-cyano-3,3-diphenylacrylate, 2-Ethylhexyl 2-cyano-3,3-diphenylacrylate, 2-Ethylhexyl trans-4-methoxycinnamate, 2-Ethylhexyl salicylate, 2-Hydroxy-4-(octyloxy)benzophenone, Menthyl anthranilate, 2-Methoxyhydroquinone, Methyl-p-benzoquinone, 2,2'-Methylenebis[6-(2H-benzotriazol-2-yl)-4-(1,1,3,3-tetramethylbutyl)phenol], 2,2'-Methylenebis(6-tert-butyl-4-ethylphenol), 2,2'-Methylenebis(6-tert-butyl-4-methylphenol), 5,5'-Methylenebis(2-hydroxy-4-methoxybenzophenone), Methylhydroquinone, 4-Nitrophenol sodium salt hydrate, Octadecyl 3-(3,5-di-tert-butyl-4-hydroxyphenyl)propionate, Pentaerythritol tetrakis (3,5-di-tert-butyl-4-hydroxyhydrocinnamate), 2-Phenyl-5-benzimidazolesulfonic acid, Poly[[6-[(1,1,3,3-tetramethylbutyl)amino]-s-triazine-2,4-diyl]-[(2,2,6,6-tetramethyl-4-piperidyl)imino]-hexamethylene-[(2,2,6,6-tetramethyl-4-piperidyl)imino], Sodium D-isoascorbate monohydrate, Tetrachloro-1,4-benzoquinone, Triisodecyl phosphite, 1,3,5-Trimethyl-2,4,6-tris(3,5-di-tert-butyl-4-hydroxybenzyl)benzene, Tris(4-tert-butyl-3-hydroxy-2,6-dimethylbenzyl) isocyanurate, Tris(2,4-di-tert-butylphenyl) phosphite, 1,3,5-Tris(2-hydroxyethyl)isocyanurate, and Tris (nonylphenyl)phosphite In some embodiments, the photoblocker has a maximum wavelength absorbance between 200 and 300 nm, between 300 and 400 nm, between 400 and 500 nm, between 500 and 600 nm, between 600 and 700 nm, between 700 and 800 nm, between 800 and 900 nm, between 150 and 200 nm, between 200 and 250 nm, between 250 and 300 nm, between 300 and 350 nm, between 350 and 400 nm, between 400 and 450 nm, between 450 and 500 nm, between 500 and 550 nm, between 550 and 600 nm, between 600 and 650 nm, between 650 and 700 nm, or between 700 and 750 nm. In some embodiments, the photoblocker has a maximum wavelength absorbance between 300 to 500 nm, such as 300 to 400 nm or 350 to 480 nm.

In some embodiments, the composition further comprises 0.05 to 1 wt %, 0.05 to 2 wt %, 0.05 to 3 wt %, 0.05 to 4 wt %, 0.05 to 5 wt %, 0.1 to 1 wt %, 0.1 to 2 wt %, 0.1 to 3 wt %, 0.1 to 4 wt %, 0.1 to 5 wt %, 0.1 to 6 wt %, 0.1 to 7 wt %, 0.1 to 8 wt %, 0.1 to 9 wt %, or 0.1 to 10 wt %, based on the total weight of the composition, of a photoinitiator. In some embodiments, the photoinitiator is a free radical photoinitiator. In certain embodiments, the free radical photoinitiator comprises an alpha hydroxy ketone moiety (e.g., 2-hydroxy-2-methylpropiophenone or 1-hydroxycyclohexyl phenyl ketone), an alpha-amino ketone (e.g., 2-benzyl-2-(dimethylamino)-4'-morpholinobutyrophenone or 2-methyl-1-[4-(methylthio)phenyl]-2-morpholinopropan-1-one), 4-methyl benzophenone, an azo compound (e.g., 4,4'-Azobis(4-cyanovaleric acid), 1,1'-Azobis(cyclohexanecarbonitrile, Azobisisobutyronitrile, 2,2'-Azobis(2-methylpropionitrile), or 2,2'-Azobis(2-methylpropionitrile)), an inorganic peroxide, an organic peroxide, or any combination thereof. In some embodiments, the composition comprises a photoinitiator comprising SpeedCure TPO-L (ethyl(2,4,6-trimethylbenzoyl)phenyl phosphinate). In some embodiments, the composition comprises a photoinitiator selected from a benzophenone, a mixture of benzophenone and a tertiary amine containing a carbonyl group which is directly bonded to at least one aromatic ring, and an Irgacure (e.g., Irgacure 907 (2-methyl-1-[4-(methylthio)phenyl]-2-morpholino-propanone-1) or Irgacure 651 (2,2-dimethoxy-1,2-diphenylethan-1-one). In some embodiments, the photoinitiator comprises an acetophenone photoinitiator (e.g., 4'-hydroxyacetophenone, 4'0phenoxyacetophenone, 4'-ethoxyacetophenone), a benzoin, a benzoin derivative, a benzil, a benzil derivative, a benzophenone (e.g., 4-benzoylbiphenyl, 3,4-(dimethylamino)benzophenone, 2-methylbenzophenone), a cationic photoinitiator (e.g., diphenyliodonium nitrate, (4-iodophenyl)diphenylsulfonium triflate, triphenylsulfonium triflate), an anthraquinone, a quinone (e.g., camphorquinone), a phosphine oxide, a phosphinate, 9,10-phenanthrenequinone, a thioxanthone, any combination thereof, or any derivative thereof.

In some embodiments, the photoinitiator has a maximum wavelength absorbance between 200 and 300 nm, between 300 and 400 nm, between 400 and 500 nm, between 500 and 600 nm, between 600 and 700 nm, between 700 and 800 nm, between 800 and 900 nm, between 150 and 200 nm, between 200 and 250 nm, between 250 and 300 nm, between 300 and 350 nm, between 350 and 400 nm, between 400 and 450 nm, between 450 and 500 nm, between 500 and 550 nm, between 550 and 600 nm, between 600 and 650 nm, between 650 and 700 nm, or between 700 and 750 nm. In some embodiments, the photoinitiator has a maximum wavelength absorbance between 300 to 500 nm.

In some embodiments, the additive is a branched dendritic oligomer. In some embodiments, the additive has one or more, two or more, three or more, four or more, five or more, six or more, seven or more, eight or more, nine or more, ten or more, or greater than 10 functional groups. In some embodiments, the additive has one or more, two or more, three or more, four or more, five or more, six or more, seven or more, eight or more, nine or more, ten or more, or greater than 10 acrylate functional groups. In certain embodiments, the branched dendritic oligomer additive is a dendritic acrylate oligomer. In some embodiments, the dendritic acrylate oligomer is Bomar™ BDT-1006, Bomar™ BDT-1018, Bomar™ BDT-4330, and the like. In some embodiments, the multi-functional additive comprises a silicone urethane acrylate. As a non-limiting example, the silicone urethane acrylate can have 1 functional group, 2 functional groups, 3 functional groups, 4 functional groups, 5 functional groups, 6 functional groups, 7 functional groups, 8 functional groups, 9 functional groups, 10 functional groups, 11 functional groups, 12 functional groups, 13 functional groups, 14 functional groups, 15 functional groups, 16 functional groups, 17 functional groups, 18 functional groups, 19 functional groups, 20 functional groups, or greater than 20 functional groups. In some embodiments, the additive can be a silicone urethane acrylate or comprises a silicone urethane acrylate. As a non-limiting example, the silicone urethane acrylate can have 1 acrylate group, 2 acrylate groups, 3 acrylate groups, 4 acrylate groups, 5 acrylate groups, 6 acrylate groups, 7 acrylate groups, 8 acrylate groups, 9 acrylate groups, 10 acrylate groups, 11 acrylate groups, 12 acrylate groups, 13 acrylate groups, 14 acrylate groups, 15 acrylate groups, 16 acrylate groups, 17 acrylate groups, 18 acrylate groups, 19 acrylate groups, 20 acrylate groups, or greater than 20 acrylate groups. As non-limiting examples of silicone acrylates, the additive can be Miramer SIU2400 (a silicone urethane acrylate having a functionality number of 10, diluted with 10% TPGDA) or SIP910 (a silicone polyester acrylate having a functionality number of 2).

In certain aspects, the present disclosure provides a curable composition for use in a high temperature lithography-based photopolymerization process, said composition comprising the following polymerizable Components A to C, Component A being at least one oligomeric dimethacrylate according to the following chemical formula (I), serving as a glass transition temperature modifier:

(I)

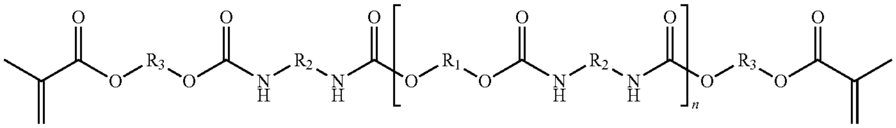

wherein:

each $R_1$ and each $R_2$ independently represent a divalent, linear, branched or cyclic $C_5$-$C_{15}$ aliphatic radical, with the proviso that at least one of $R_1$ and $R_2$ is or comprises a $C_5$-$C_6$ cycloaliphatic structure, each $R_3$ independently represents a divalent, linear or branched $C_2$-$C_4$ alkyl radical, and n is an integer from 1 to 5, with the proviso that $R_1$, $R_2$, $R_3$ and n are selected so as to result in a number average molecular weight of the oligomeric dimethacrylate from 0.4 to 5 kDa;

Component B being at least one, optionally polyether-modified, (poly)carbonate-(poly)urethane dimethacrylate according to any one of the following chemical formulas (II), (III), (IV) or (V), serving as a toughness modifier:

(II)
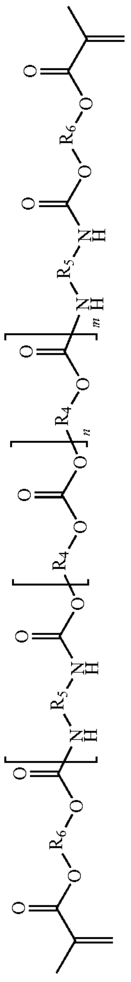
(III)
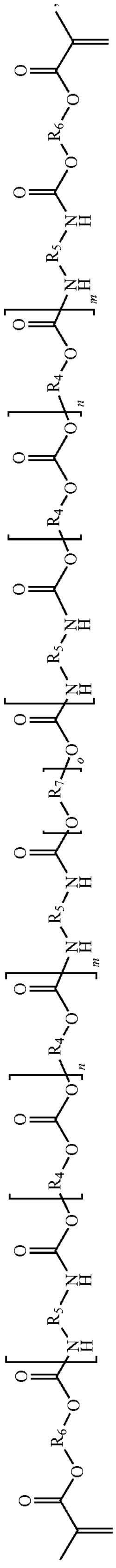
,
(IV)
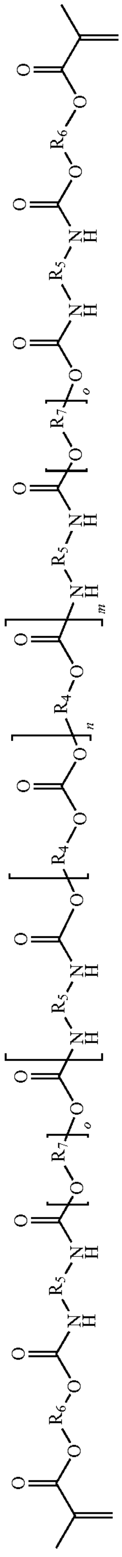
or
(V)
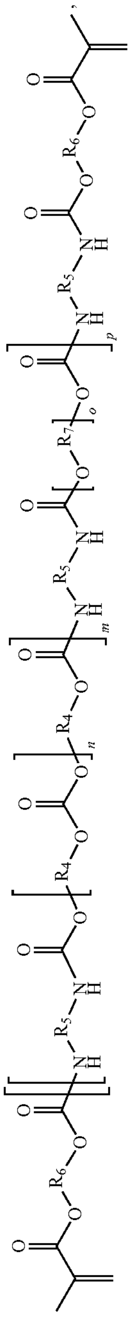
, wherein:

each $R_4$ and each $R_5$ independently represent a divalent, linear, branched or cyclic $C_5$-$C_{15}$ aliphatic radical, each $R_6$ independently represents a divalent, linear or branched $C_2$-$C_4$ alkyl radical, each $R_7$ independently represents a divalent, linear or branched $C_2$-$C_6$ alkyl radical, each n is independently an integer from 1 to 10, each m is independently an integer from 1 to 20, each o is independently an integer from 5 to 50, and p is an integer from 1 to 40, with the proviso that $R_4$, $R_5$, $R_6$, $R_7$, n, m, o and p are selected so as to result in a number average molecular weight of the (poly)carbonate-(poly)urethane dimethacrylate greater than 5 kDa; and Component C being at least one mono- or multifunctional methacrylate-based reactive diluent.

These oligomeric (poly)carbonate-(poly)urethane dimethacrylates having relatively low molecular weights from 0.4 to 5 kDa, which are used as glass transition temperature modifiers, and polymeric (poly)carbonate-(poly)urethane dimethacrylates having high molecular weights of more than 5 kDa, which are used as tough-ness modifiers, as defined above, are typically miscible and compatible due to their related (poly)carbonate-(poly)urethane basic structures.

When mixed with one or more reactive diluent(s), they result in curable compositions being well processible at the processing temperatures usually employed in high temperature lithography-based photopolymerization processes, i.e. temperatures between 90° C. and 120° C., as their viscosities at these temperatures are sufficiently low, despite the presence of the high molecular weight Component B. Moreover, as such curable compositions comprise multiple divalent polymerizable components, they result in crosslinked polymers, more specifically in crosslinked polymers having excellent thermomechanical properties, as detailed below.

Preferred compositional ranges of the amounts of these three components are from 20 to 50 wt % of Component A, from 25 to 50 wt % of Component B, and from 10 to 40 wt % of Component C, based on the total weight of the curable composition.

In preferable embodiments of the present disclosure, the "carbonate radical" $R_1$ of the glass transition temperature modifiers of Component A is a divalent radical originating from a diol selected from the group consisting of 1,4-cyclohexanedimethanol (CHDM), 4,4'-isopropylidenedicyclohexanol (HBPA), 4,8-bis-(hydroxymethyl)tricyclo[5.2.1.$0^{2,6}$]decane (HTCD), 3,9-bis(1,1-dimethyl-2-hydroxyethyl)-2,4,8,10-tetraoxaspiro[5.5]undecane, 1,3-bis(hydroxymethyl)adamantane, 1,4-, 1,3- or 1,2-dihydroxycyclohexane, 1,3-adamantanediol, 4-hydroxy-α,α,4-trimethylcyclohexanemethanol, 2,3-pinanediol, 1,6-hexanediol, and mixtures thereof, more preferably a divalent radical originating from 1,4-cyclohexanedimethanol (CHDM), as such cyclic structures provide for a relatively high degree of rigidity of the molecules of oligomeric dimethacrylate A. Such rigidity may contribute to a relatively high glass transition temperature of the polymerizates, i.e. preferably a glass transition temperature >90° C., more preferably >100° C.

The "urethane radical" $R_2$ of the glass transition temperature modifiers of Component A preferably is a divalent radical originating from a diisocyanate independently selected from the group consisting of isophorone diisocyanate (IPDI), hexamethylene diisocyanate (HDI), trimethylhexamethylene diisocyanate (TMDI), dicyclohexylmethane 4,4'-diisocyanate (HMDI), 1,3-bis(isocyanatomethyl)cyclohexane, and mixtures thereof, more preferably from isophorone diisocyanate (IPDI) or hexamethylene diisocyanate (HDI). Such cycloaliphatic or short-chained linear aliphatic structures typically provide for a suitable degree of rigidity of the glass transition temperature modifiers of Component A.

In order to provide for high toughness and other mechanical properties of the polymerizates and also for keeping their glass transition temperatures relatively high, the "carbonate radical" $R_4$ of the toughness modifiers of Component B is preferably a divalent radical originating from a diol selected from the group consisting of 2,2-dimethyl-1,3-propanediol (DMP), 1,6-hexanediol, 1,4-cyclohexanedimethanol (CHDM), and mixtures thereof, which more preferably represents the alcoholic moiety of a polycarbonate-diol. For the "urethane radical" $R_5$ the same preferences are valid as for $R_2$, which means that $R_5$ preferably is a divalent radical originating from a diisocyanate independently selected from the group consisting of isophorone diisocyanate (IPDI), hexamethylene diisocyanate (HDI), trimethylhexamethylene diisocyanate (TMDI), dicyclohexylmethane 4,4'-diisocyanate (HMDI), 1,3-bis(isocyanatomethyl)cyclohexane, and mixtures thereof, more preferably from isophorone diisocyanate (IPDI) or hexamethylene diisocyanate (HDI).

In further preferred embodiments, the terminal "methacrylate radicals" $R_3$ and $R_6$ of the modifiers of Components A and B, respectively, are divalent radicals originating from a short-chained diol independently selected from the group consisting of 1,2-ethanediol, 1,3-propanediol, 1,2-propanediol, 1,4-butanediol, and mixtures thereof, more preferably from 1,2-ethanediol, the corresponding methacrylate being hydroxyethyl methacrylate, HEMA, a frequently used and economic methacrylate monomers.

As already mentioned above, the optional polyether-modification of the toughness modifiers of Component B serves as a "soft block" for providing a softening or plastifying effect for the polymerizates obtained from the curable composition of the present disclosure, and it may be positioned between two blocks of a (poly)carbonate-(poly)urethane shown in formula (II) (between the two terminal $R_6$-methacrylate moieties), as depicted in formula (III), or two polyether blocks may be positioned at both sides of one block of such (poly)carbonate-(poly)urethane, as depicted in formula (IV), or polyether blocks and (poly)carbonate-(poly)urethane blocks may be alternating to give the polymer depicted in formula (V), each of these combinations of polyether blocks and (poly)carbonate-(poly)urethane blocks being terminated by two polymerizable $R_6$-methacrylate moieties. In preferred embodiments, the corresponding "ether radical" $R_7$ of the polyether-modification is a divalent radical originating from 1,4-butanediol, which means that the polyether used as the modification preferably is polytetrahydrofuran, which is commercially available and thus an economic choice.

Generally, any commercially available compounds may be used as the Components A, B and C of the curable compositions according to the present disclosure, provided that such compounds meet the requirements defined herein. Alternatively, the Components A, B and C may be synthesized by any preparation methods known in the art of organic synthesis; for example, as exemplified in the synthesis examples herein.

As mentioned above, Components A and B, more specifically the glass transition temperature modifiers of Component A and the unmodified toughness modifiers of Component B represented by formula (II), are preferably prepared in substantially analogous manners by reacting a diol comprising the "carbonate radical" $R_1$ or $R_4$, respectively, with a molar excess of diisocyanate comprising the corresponding "urethane radical" $R_2$ or $R_5$, respectively. For preparing the oligomeric Component A, the molar excess of diisocyanate is preferably relatively high, for example, in the range of 1.8 to 2 equivalents, preferably in the range of 1.9 to 2 equivalents, of diisoyanate per 1 equivalent of diol, in order to yield the desired relatively low molecular weight. On the other hand, for preparing the relatively high molecular weight polymeric toughness modifiers of Component B, a smaller molar excess of diisocyanate may be used, for example, in the range of 1.1 to 1.6 equivalents, preferably in the range of 1.1 to 1.4 equivalents, of diisoyanate per 1 equivalent of diol, in order to produce the respective isocyanate-terminated (poly)carbonate-(poly)urethane molecules. One equivalent each of the oligomer molecule comprising $R_1$ and $R_2$ or the polymeric molecule comprising $R_4$ and $R_5$ is finally reacted with (at least) 2 equivalents of an ω-hydroxyalkyl methacrylate comprising the corresponding "meth-acrylate radical" $R_3$ or $R_6$, respectively, to yield the final oligomeric or polymeric dimethacrylates of Component A or B, respectively. These synthetic ways are shown in the reaction schemes below.

Scheme 1

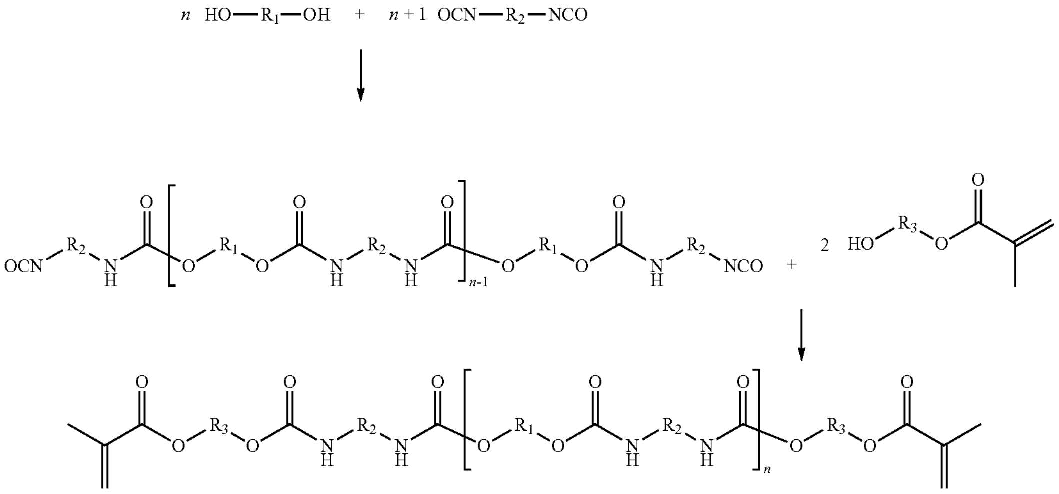

(I)

Scheme 2

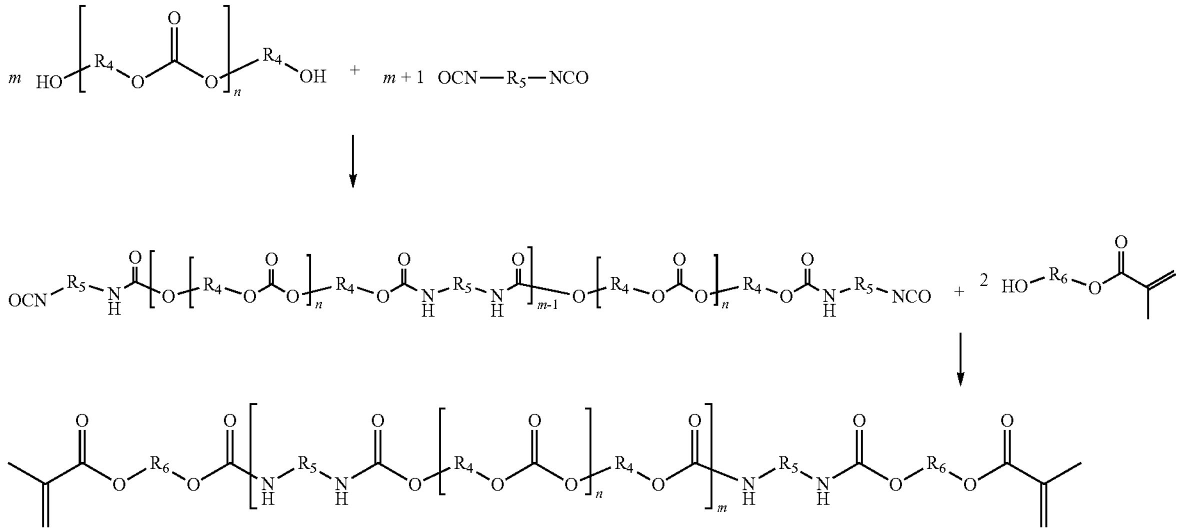

(II)

For convenience, also the polyether-modified embodiments of the toughness modifiers of Component B represented by formulas (III) to (V) are preferably prepared in a quite similar way by means of (poly) addition reactions between diols and diisocyanates. In preferred embodiments of these syntheses, however, there is—in addition to the (poly)carbonate-diol comprising "alcohol radical" $R_4$—a second species of diol reactant, i.e. a polyether-diol comprising the "ether radical" $R_7$, which is also reacted with diisocyanate.

Depending on the intended position of the polyether block(s), one of these two diol species may be first reacted with a molar excess of diisocyanate to produce an isocyanate-terminated, oligomeric first intermediate which, in turn, is reacted with the second diol species. Depending on the molar ratios selected, this polymeric second intermediate is either diol- or isocyanate-terminated. In the latter case, the second intermediate is simply reacted with the appropriate ω-hydroxyalkyl methacrylate, for example, 2-hydroxyethyl methacrylate (HEMA), to yield the final polyether-modified Component B. In the case of diol-terminated second intermediates, the ω-hydroxyalkyl methacrylate is first reacted with an equimolar amount of the respective diisocyanate to produce an isocyanate-functional methacrylate reactant.

The reaction scheme below shows a preferred synthetic way for preparing a polyether-modified (poly)carbonate-(poly)urethane dimethacrylate according to formula (III). First, a similar diisocyanate-terminated intermediate as in Scheme 2 above is prepared by reacting (poly)carbonate-diol with a molar excess of diisocyanate, whereafter 2 equivalents of this first intermediate are reacted with 1 equivalent of polyether-diol to yield an isocyanate-terminated second intermediate to which, finally, 2 equivalents of ω-hydroxyalkyl methacrylate are added, thus producing a polyether-modified toughness modifier represented by formula (III).

Scheme 3
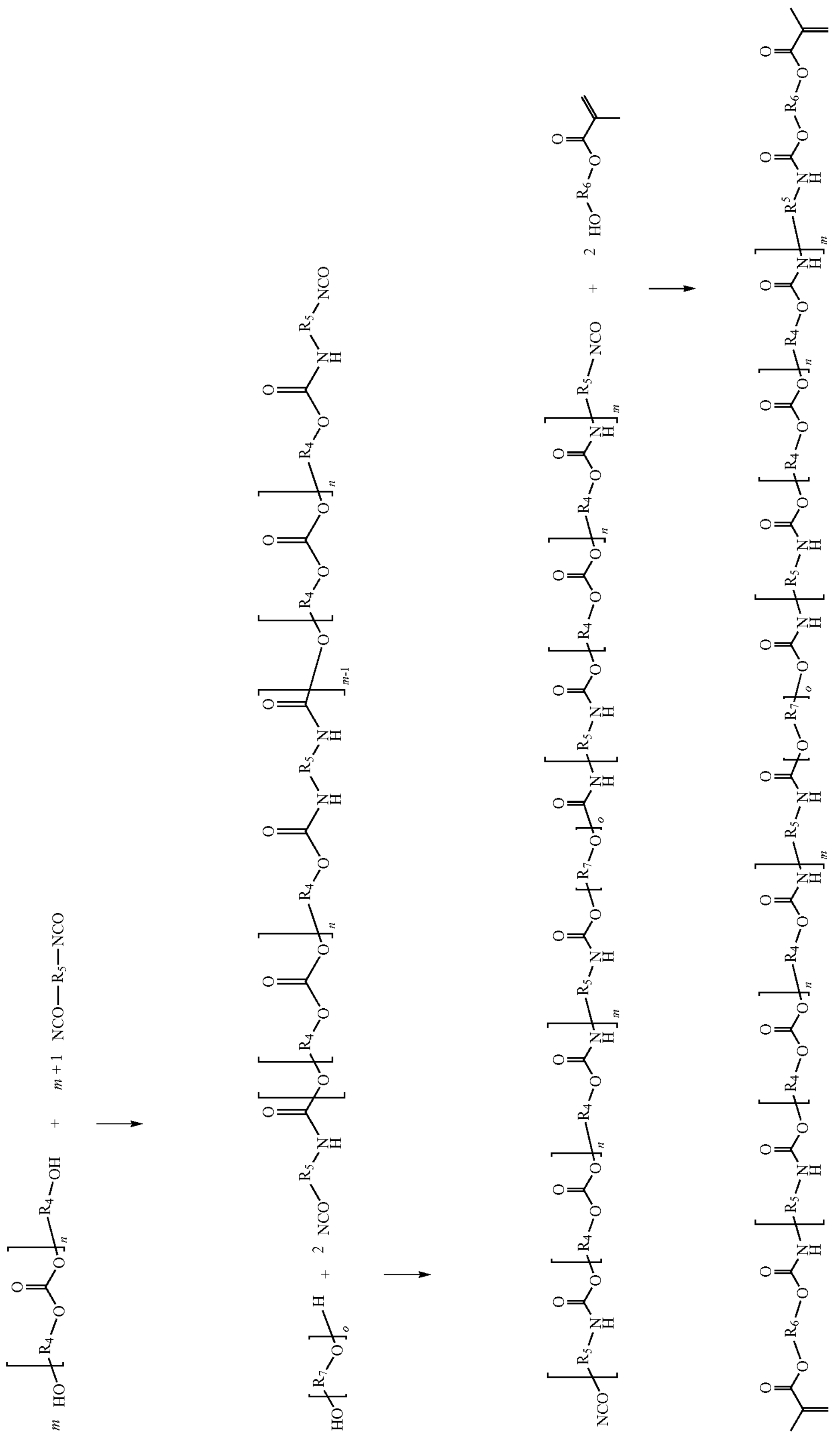
(III)

Alternatively, however, toughness modifiers according to formula (III) can also be synthesized by reacting the $R_7$-containing polyether block with 2 equivalents of $R_5$-containing diisocyanate, thus producing an isocyanate-terminated first intermediate, which in turn is reacted with 2 equivalents of the $R_4$-containing (poly)carbonate-diol, yielding a diol-terminated second intermediate. Further, the $R_6$-containing ω-hydroxyalkyl methacrylate is reacted with an equimolar amount of the $R_5$-containing diisocyanate to produce an isocyanate-functional methacrylate reactant, 2 equivalents of which are then reacted with the diol-terminated second intermediate to give Component B according to formula (III).

This synthetic way was followed in Synthesis Example 10 for synthesizing toughness modifier TNM6, comprising the preparation of first and second intermediates designated TNM6-A and TNM6-B, respectively, and of an isocyanate-functional methacrylate reactant, designated IUEM ("isocyanoisophorone-urethane ethylmethacrylate").

In a similar way, toughness modifiers according to formulas (IV) or (V) can be synthesized. For preparing those of formula (IV), again, an isocyanate-terminated first intermediate similar to that of Scheme 2 or Scheme 3 is synthesized by reacting the (poly)carbonate-diol with 2 equivalents of diisocyanate, which in turn is reacted with 2 equivalents of polyether-diol, yielding a diol-terminated second intermediate which is finally reacted with 2 equivalents of isocyanate-functionalized methacrylate reactant. This synthetic way is shown in Scheme 4 below.

Since the toughness modifiers of formula (IV) comprise double the number of polyether modifications than those according to formula (III), it may be preferable to provide for more rigid (poly)carbonate-urethane blocks by selecting relatively short-chained or cyclic radicals $R_4$ and/or $R_5$. Additionally, or alternatively, it may be preferable to select a short-chained "ether radical" $R_7$, in order not to affect the toughness-raising or -stabilizing effect of Component B.

Scheme 4
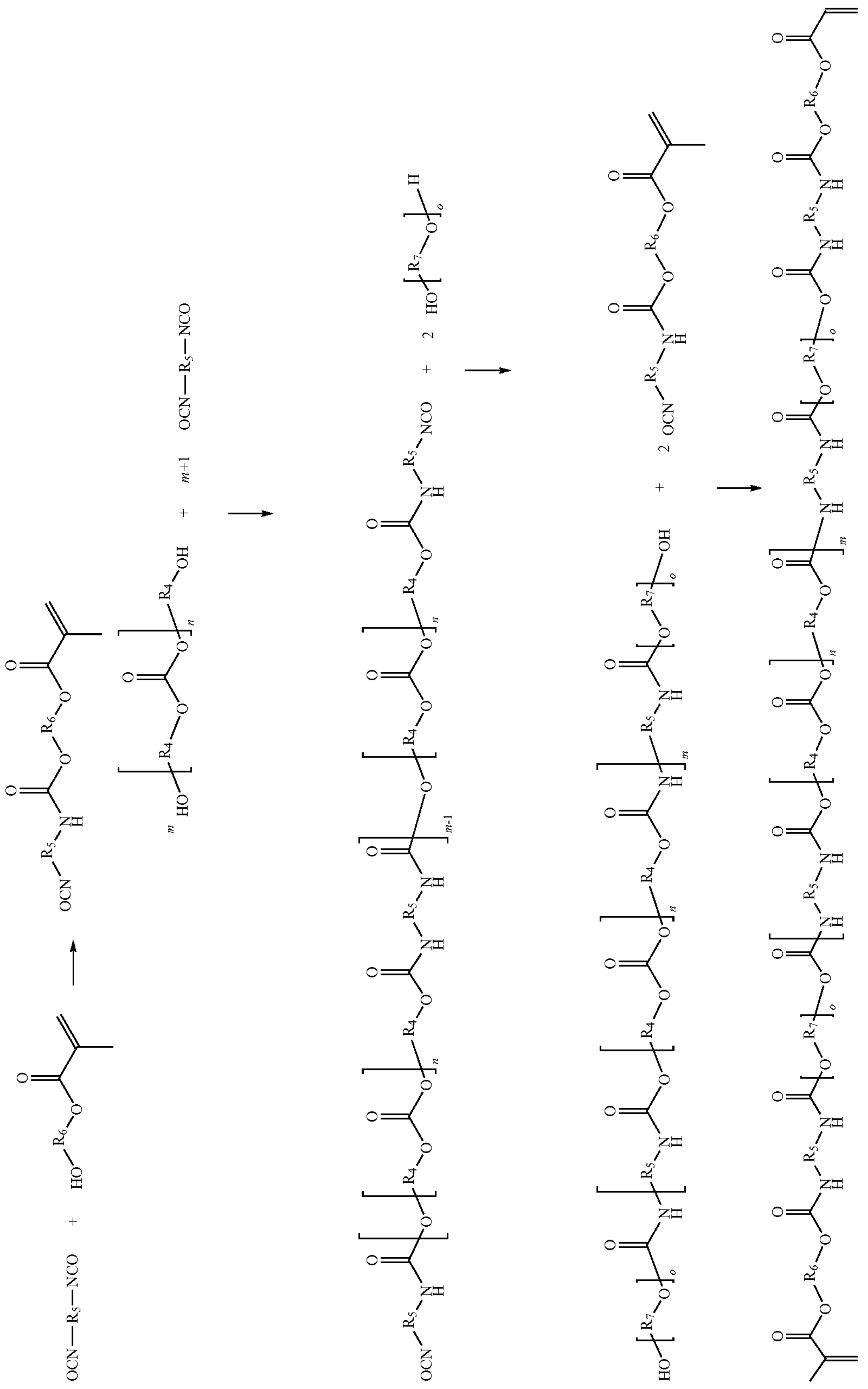
(IV)

For synthesizing toughness modifiers according to formula (V), again, an isocyanate-terminated first intermediate similar to that of Schemes 2 to 4 is synthesized by reacting the (poly)carbonate-diol with 2 equivalents of diisocyanate. However, in the present case, this first intermediate is reacted with an equimolar amount of polyether-diol, which yields relatively long-chained polyaddition products comprising alternating urethane-carbonate blocks and polyether blocks as well as both isocyanate and hydroxyl terminal groups. This polyaddition reaction may be quenched by adding either monoisocyanate or monohydroxy terminating monomers, preferably either an o-hydroxyalkyl methacrylate or its isocyanate-functionalized derivative, e.g. as shown in the first line of Scheme 4 above. The molecular weight of the thus obtained second intermediate may be controlled by appropriately selecting the reaction time until addition of the terminating monomer.

This second intermediate is methacrylate-terminated at one end and still either hydroxy- or isocyanate-terminated at the other. For introducing the second methacrylate terminal group, the second intermediate is reacted with the other species of terminating monomers, i.e. the ω-hydroxyalkyl methacrylate or its isocyanate-functionalized derivative. If the ω-hydroxyalkyl methacrylate was used to quench the polyaddition reaction, the second intermediate is finally reacted with its isocyanate-functionalized derivative, or vice versa. In Scheme 5 below, the contrary reaction is shown, i.e. the polyaddition is quenched by adding the isocyanate-functionalized methacrylate, and the second intermediate thus obtained is finally reacted with the ω-hydroxyalkyl methacrylate to yield the toughness modifier of Component B represented by formula (V).

Since the toughness modifiers of formula (V) typically comprise the highest number of polyether-modifications, i.e. where p is ≥3, it may be preferable to select quite short-chained radicals $R_4$, $R_5$ and/or $R_7$, and/or or cyclic radicals $R_4$ or $R_5$.

Scheme 5
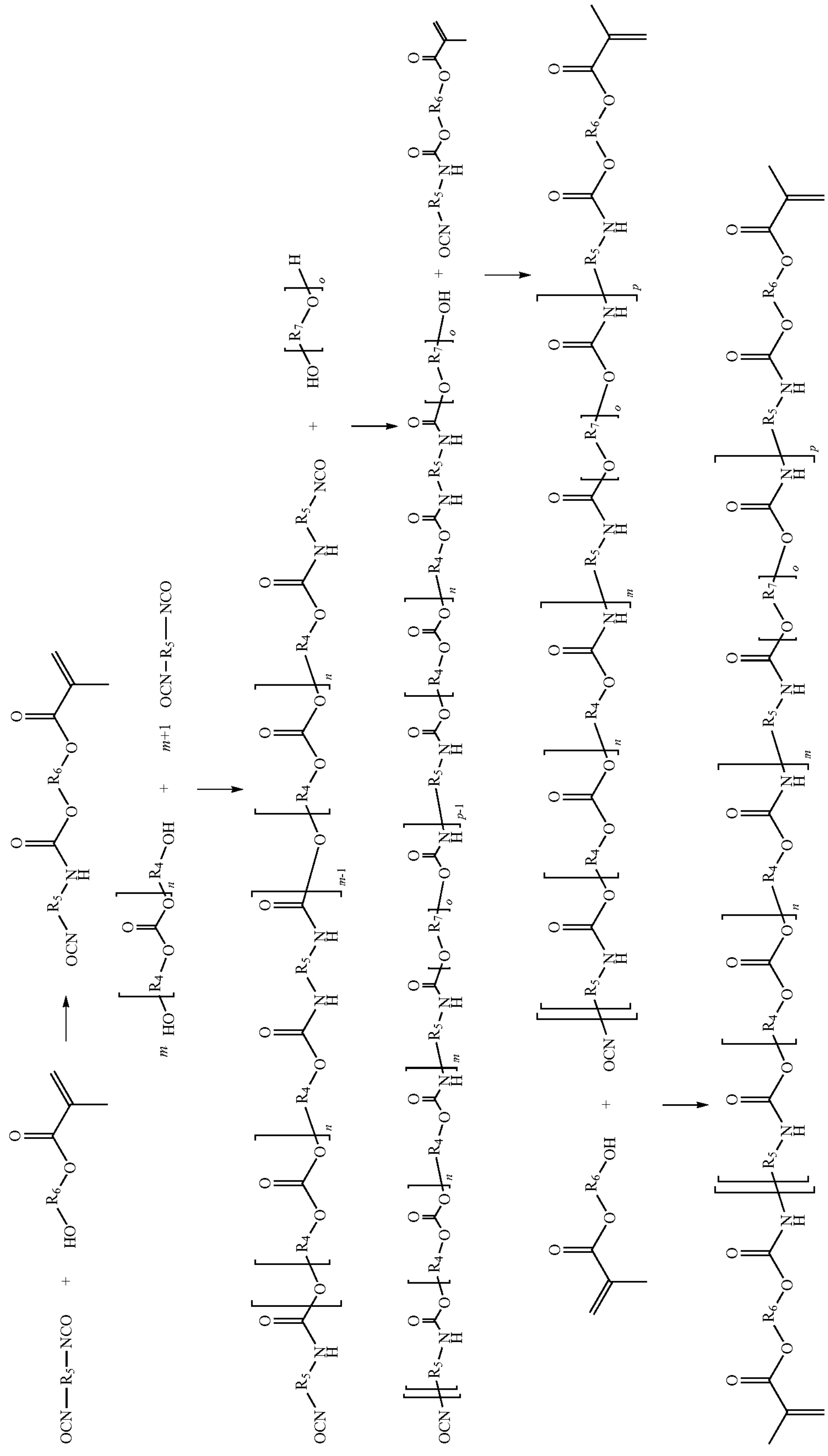
(V)

As mentioned above, a skilled artisan will be able to devise alternative ways of synthesizing glass transition temperature or toughness modifiers according to formulas (I) to (V).

As already mentioned above, according to the present disclosure, the reactive diluent of Component C is not particularly limited, so that any common species of reactive diluents may be used, as long as it is compatible with the modifiers of Components A and B. Preferable diluents, however, are the common, cost-efficient diluent TEGDMA (triethylene glycol dimethacrylate) and particularly 2-, 3- or 4-((meth)-acryloxy)benzoic acid esters, or 2-, 3- or 4-hydroxybenzoic acid ester (meth)acrylates, such as substituted cycloalkyl 2-, 3- or 4-((meth)acryloxy)benzoates, the latter having yielded very good results, as will be shown in the experimental section below. More preferably, the reactive diluent is an optionally substituted 2-, 3- or 4-((meth)-acryloxy)benzoic acid ester according to the following formula (VI):

(VI)

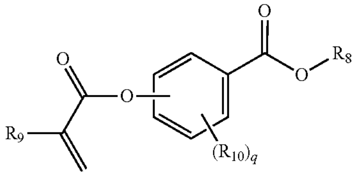

wherein:

- $R_8$ represents a $C_5$-$C_{20}$ cycloaliphatic hydrocarbyl radical selected from the group consisting of optionally substituted $C_5$-$C_7$ cycloalkyl radicals;
- $R_9$ represents H or $CH_3$;
- each $R_{10}$ independently represents $C_1$-$C_3$ alkyl or $C_1$-$C_3$ alkoxy; and
- q is an integer from 0 to 4.

In more preferred embodiments of the invention, the reactive diluent is a 2-, 3- or 4-((meth)acryloxy)benzoic acid ester according to formula (VI), wherein $R_8$ is selected from the group consisting of optionally substituted $C_5$-$C_7$ cycloalkyl radicals having 5 to 15, more preferably 5 to 12, most preferably 5 to 10, carbon atoms in total. In even more preferred embodiments, $R_8$ is selected from the group consisting of cyclohexyl radicals substituted with one or more, linear or branched $C_1$-$C_6$ alkyl groups, even more preferably one or more $C_1$-$C_3$ alkyl groups, wherein two of said $C_1$-$C_6$ alkyl groups, or $C_1$-$C_3$ alkyl groups, may be connected to form a ring together with the carbon atoms to which they are attached and optionally one or more additional, intervening carbon atoms of the cyclohexyl ring. Such monomers are typically liquid at room temperature or have suitably low melting points and show pronounced viscosity-lowering effects. Most preferably, $R_8$ is selected from the group consisting of

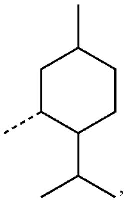,
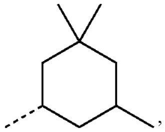,
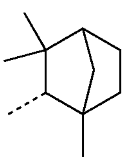
and

-continued

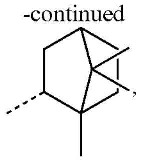, wherein the broken lines each represent a bond to the ester oxygen atom.

An exemplary representative of this group, menthyl salicylate methacrylate, was prepared as disclosed in Synthesis Example 11 and was used as Reactive Diluent 1 (RD1) in most of the examples of the present disclosure.

In some embodiments, the reactive diluent is a compound of formula (VII):

(VII)

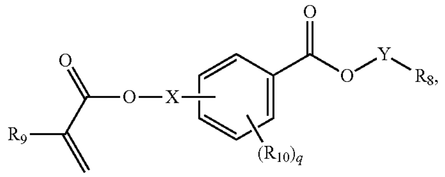

wherein:

- $R_8$ represents optionally substituted $C_3$-$C_{10}$ cycloalkyl, optionally substituted 3- to 10-membered heterocycloalkyl, or optionally substituted $C_6$-$C_{10}$ aryl;
- $R_9$ represents H or $C_1$-$C_6$ alkyl;
- each $R_{10}$ independently represents halo, $C_1$-$C_3$ alkyl, $C_1$-$C_3$ alkoxy, $Si(R_{11})_3$, $P(O)(OR_{12})_2$, or $N(R_{13})_2$;
- each $R_{11}$ independently represents $C_1$-$C_6$ alkyl or $C_1$-$C_6$ alkoxy;
- each $R_{12}$ independently represents $C_1$-$C_6$ alkyl or $C_6$-$C_{10}$ aryl;
- each $R_{13}$ independently represents H or $C_1$-$C_6$ alkyl;
- X is absent, $C_1$-$C_3$ alkylene, 1- to 3-membered heteroalkylene, or $(CH_2CH_2O)_r$;
- Y is absent or $C_1$-$C_6$ alkylene;
- q is an integer from 0 to 4; and
- r is an integer from 1 to 4.

In some embodiments, for a compound of formula (VII), $R_8$ is selected from optionally substituted $C_5$-$C_{10}$ cycloalkyl and optionally substituted $C_6$-$C_{10}$ aryl, such as optionally substituted phenyl. In some embodiments, $R_8$ is optionally substituted $C_5$-$C_7$ cycloalkyl. The optionally substituted $C_5$-$C_7$ cycloalkyl may have 5 to 15 carbon atoms in total, such as 5 to 12 or 5 to 10 carbon atoms. For a compound of formula (VII), $R_8$ may be a monocyclic cycloalkyl, such as cyclohexyl. In some embodiments, $R_8$ is a bicyclic cycloalkyl, such as a bridged, fused, or spirocyclic cycloalkyl. This includes, for example, bicyclo[2.2.1]heptyl, bicyclo[1.1.1]pentyl, spiro[4.4]nonyl, and decahydronaphthyl, each of which may be optionally substituted. In some embodiments, $R_8$ is unsubstituted. In some embodiments, $R_8$ is substituted with at least one substituent.

Exemplary optional substituents of $R_8$ include $C_1$-$C_6$ alkyl, $C_1$-$C_6$ alkoxy, $C_3$-$C_7$ cycloalkyl, $C_6$-$C_{10}$ aryl, $C_1$-$C_6$-alkoxy-$C_6$-$C_{10}$-aryl, —O(CO)—($C_1$-$C_6$)alkyl, —COO—($C_1$-$C_6$)alkyl, =O, —F, —Cl, and —Br. In some embodiments, $R_8$ is substituted with at least one —$CH_3$. For example, in some embodiments $R_8$ is substituted with one or more —$CH_3$ and optionally further substituted with one or more substituents selected from the group consisting of $C_1$-$C_6$ alkyl, $C_1$-$C_6$ alkoxy, —O(CO)—($C_1$-$C_6$)alkyl, —COO—($C_1$-$C_6$)alkyl, =O, —F, —Cl, and —Br. In some embodiments, $R_8$ is substituted with one or more, linear or branched $C_1$-$C_6$ alkyl, such as methyl, ethyl, n-propyl, iso-propyl, n-butyl, sec-butyl, iso-butyl, or tert-butyl. Two substituents of $R_8$, such as two $C_1$-$C_6$ alkyl, may be connected to form a ring. For example, two substituents on a cyclohexyl group may form a bridge, such as the methylene bridge found in bicyclo[2.2.1]heptyl. In some embodiments, $R_8$ is substituted with one or more substituents selected from the group consisting of $C_1$-$C_4$ alkyl and $C_1$-$C_4$ alkoxy.

Exemplary $R_8$ groups include, but are not limited to

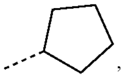, 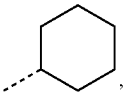, 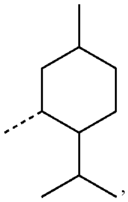, 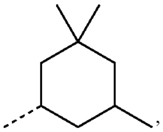, 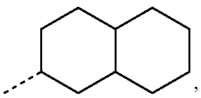, 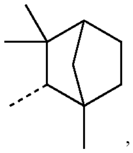, 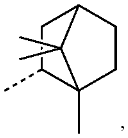, 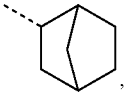, 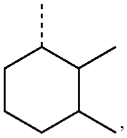, 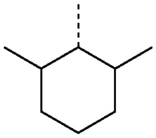, 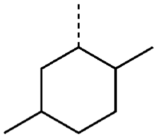, 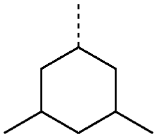, 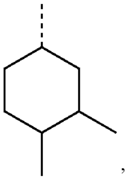, 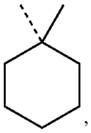, 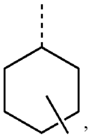, 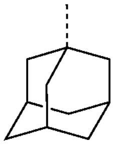, 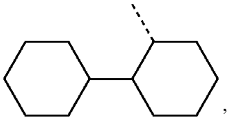, 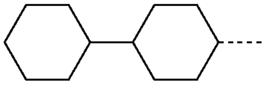, 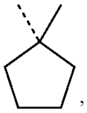, -continued

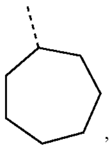, and 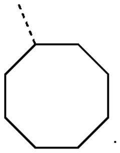.

The broken line is used herein to indicate the bond to the rest of the molecule (e.g., the bond to linker Y of formula (VII)). Further exemplary —Y—$R_8$ groups include, but are not limited to

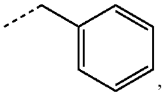, 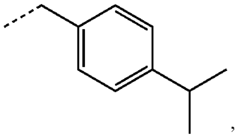, 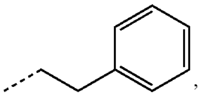, 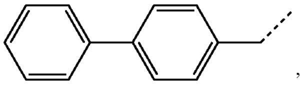, 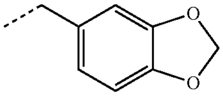, 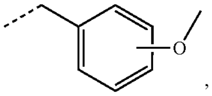, 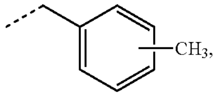 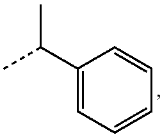, 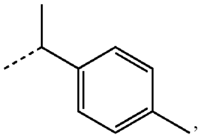, 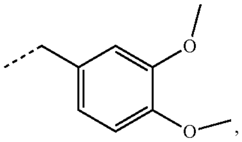, 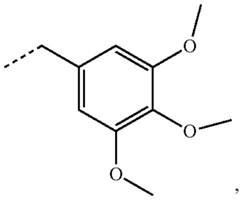, 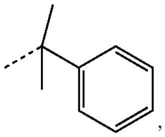, 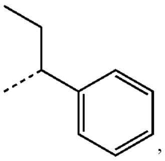, 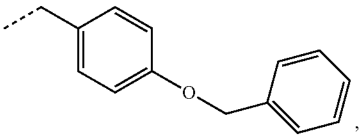, 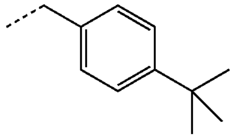, -continued

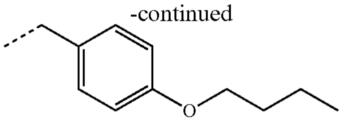

,

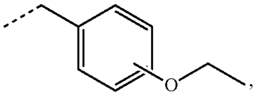

,

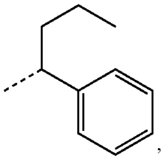

,

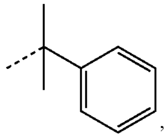

,

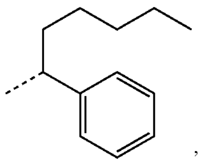

,

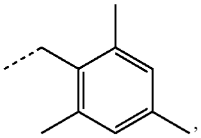

,

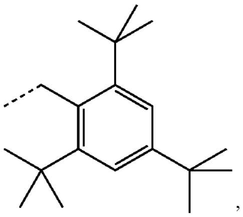

,

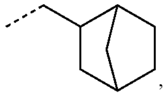

,

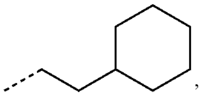

,

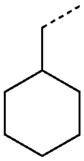

,

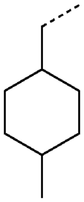

,

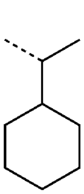

, and

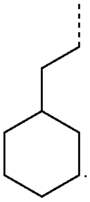

.

In some embodiments, q is 0 or 1, such as q is 0. In some embodiments, $R_9$ is H or $CH_3$. In some embodiments, X is $C_1$-$C_3$ alkylene, such as methylene. In some embodiments, X is absent. In some embodiments, Y is $C_1$-$C_3$ alkylene.

In certain aspects, the present disclosure provides a method of producing crosslinked polymers comprising providing a curable composition described herein; and polymerizing said composition; thereby producing said crosslinked polymers. The polymerizing may be carried out using a high temperature lithography-based photopolymerization process. Optionally, a solid or highly viscous resin formulation comprising said composition is heated to a predefined elevated process temperature and is subsequently irradiated with light of a suitable wavelength to be absorbed by a photoinitiator, thereby polymerizing and crosslinking the composition to obtain said crosslinked polymer. The elevated process temperature may range from 50° C. to 120° C. In some embodiments, the photopolymerization process is a direct or additive manufacturing process, such as a 3D printing process.

In certain aspects, the present disclosure provides a crosslinked polymer for use in an orthodontic appliance, wherein the crosslinked polymer is characterized by one or more of a stress relaxation of greater than or equal to 5% of the initial load; and a glass transition temperature of greater than or equal to 70° C., such as a glass transition temperature of greater than or equal to 90° C. The crosslinked polymer may further be characterized by one or more of a tensile modulus greater than or equal to 100 MPa; a tensile strength at yield greater than or equal to 5 MPa; an elongation at yield greater than or equal to 4%; an elongation at break greater than or equal to 5%; a storage modulus greater than or equal to 300 MPa; and a remaining stress at 2% strain which is greater than or equal to 0.01 MPa after 2 hours of loading.

In some embodiments, the crosslinked polymer is characterized by a stress relaxation of 5% to 85% of the initial load, such as 5% to 45%, 15% to 85%, or 20% to 45% of the initial load. In some embodiments, the crosslinked polymer is characterized by a glass transition temperature of 90° C. to 150° C. In some embodiments, the crosslinked polymer is characterized by a tensile modulus from 100 MPa to 2000 MPa, such as 800 MPa to 2000 MPa. In some embodiments, the crosslinked polymer is characterized by a tensile strength at yield of 5 MPa to 85 MPa, such as 20 MPa to 55 MPa. In some embodiments, the crosslinked polymer is characterized by a tensile strength at yield of 25 MPa to 55 MPa. In some embodiments, the crosslinked polymer is characterized by an elongation at yield of 4% to 10%, such as 5% to 10%. In some embodiments, the crosslinked polymer is characterized by an elongation at break of 5% to 250%, such as 20% to 250%. In some embodiments, the crosslinked polymer is characterized by a storage modulus of 300 MPa to 3000 MPa, such as 750 MPa to 3000 MPa. In some embodiments, the crosslinked polymer is characterized by a stress relaxation of 0.01 MPa to 15 MPa, such as 2 MPa to 15 MPa. In some embodiments, the crosslinked polymer is characterized by a stress relaxation of greater than or equal to 20% of the initial load; a glass transition temperature of greater than or equal to 90° C.; a tensile modulus from 800 MPa to 2000 MPa; and an elongation at break greater than or equal to 20%.

Stress relaxation properties may be assessed using an RSA-G2 instrument from TA Instruments, with a 3-point bending, 2% strain method. The stress relaxation is typically measured at 37° C. and 100% relative humidity and reported as the remaining load after 2 hours, as either the percent (%) of initial load or in MPa). The storage modulus is typically measured at 37° C. and is reported in MPa. The $T_g$ of the crosslinked polymer may be assessed using dynamic mechanical analysis (DMA) and is provided herein as the tan δ peak. The tensile modulus, tensile strength, elongation at yield and elongation at break may be assessed according to ISO 527-2 5B.

A crosslinked polymer described herein may comprise a first repeating unit having a number average molecular weight of greater than 5 kDa, wherein the first repeating unit comprises carbonate and urethane groups. Optionally, the first repeating unit may be derived from a (poly)carbonate-(poly)urethane dimethacrylate oligomer. In some embodiments, the number average molecular weight of the (poly) carbonate-(poly)urethane dimethacrylate oligomer is between 5 kDa to 20 kDa, such as between 10 kDa to 20 kDa. A crosslinked polymer described herein may comprise a second repeating unit having a number average molecular weight of 0.4 to 5 kDa, wherein the second repeating unit comprises a urethane group. The second repeating unit may be derived from a (poly)urethane dimethacrylate oligomer. In some embodiments, the crosslinked polymer comprises a monomer of the formula:

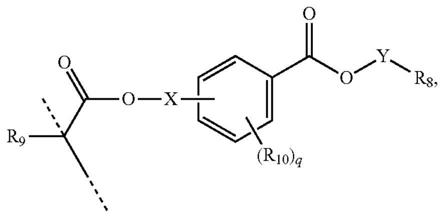

wherein:

$R_8$ represents optionally substituted $C_3$-$C_{10}$ cycloalkyl, optionally substituted 3- to 10-membered heterocycloalkyl, or optionally substituted $C_6$-$C_{10}$ aryl;

$R_9$ represents H or $C_1$-$C_6$ alkyl;

each $R_{10}$ independently represents halo, $C_1$-$C_3$ alkyl, $C_1$-$C_3$ alkoxy, $Si(R_{11})_3$, $P(O)(OR_{12})_2$, or $N(R_{13})_2$;

each $R_{11}$ independently represents $C_1$-$C_6$ alkyl or $C_1$-$C_6$ alkoxy;

each $R_{12}$ independently represents $C_1$-$C_6$ alkyl or $C_6$-$C_{10}$ aryl;

each $R_{13}$ independently represents H or $C_1$-$C_6$ alkyl;

X is absent, $C_1$-$C_3$ alkylene, 1- to 3-membered heteroalkylene, or $(CH_2CH_2O)_r$;

Y is absent or $C_1$-$C_6$ alkylene;

q is an integer from 0 to 4; and r is an integer from 1 to 4 wherein each dashed line represents a bond to a carbon atom.

In some embodiments, $R_8$ is unsubstituted or substituted with one or more substituents selected from the group consisting of $C_1$-$C_6$ alkyl, $C_1$-$C_6$ alkoxy, $C_3$-$C_7$ cycloalkyl, $C_6$-$C_{10}$ aryl, $C_1$-$C_6$-alkoxy-$C_6$-$C_{10}$-aryl, —O(CO)—($C_1$-$C_6$) alkyl, —COO—($C_1$-$C_6$)alkyl, =O, —F, —Cl, and —Br.

In some embodiments, a crosslinked polymer described herein comprises 20 to 50 wt % of the first repeating unit based on the total weight of the crosslinked polymer, such as 25 to 50% of the first repeating unit based on the total weight of the crosslinked polymer. A crosslinked polymer described herein may comprise 1 to 50 wt % of the second repeating unit based on the total weight of the crosslinked polymer, such as 20 to 50 wt % of the second repeating unit based on the total weight of the crosslinked polymer. In some embodiments, a crosslinked polymer described herein comprises 1 to 80 wt % of the monomer based on the total weight of the crosslinked polymer, such as 10 to 40 wt % of the monomer based on the total weight of the crosslinked polymer.

In certain aspects, the present disclosure provides a method of making an orthodontic appliance comprising a crosslinked polymer, the method comprising providing a curable composition described herein; and fabricating the crosslinked polymer by a direct or additive fabrication process. The composition may be exposed to light in said direct or additive fabrication process. The process may further comprise an additional curing step following fabrication of the crosslinked polymer.

In certain aspects, the present disclosure provides an orthodontic appliance comprising a crosslinked polymer described herein. The orthodontic appliance may be an aligner, expander or spacer. In some embodiments, the orthodontic appliance comprises a plurality of tooth receiving cavities configured to reposition teeth from a first configuration toward a second configuration. In some embodiments, the orthodontic appliance is one of a plurality of orthodontic appliances configured to reposition the teeth from an initial configuration toward a target configuration, optionally according to a treatment plan.

As used herein the terms "rigidity" and "stiffness" are used interchangeably, as are the corresponding terms "rigid" and "stiff."

As used herein a "plurality of teeth" encompasses two or more teeth.

In many embodiments, one or more posterior teeth comprises one or more of a molar, a premolar or a canine, and one or more anterior teeth comprising one or more of a central incisor, a lateral incisor, a cuspid, a first bicuspid or a second bicuspid.

The curable compositions and crosslinked polymers according to the present disclosure exhibit favorable thermomechanical properties for use as orthodontic appliances, for example, for moving one or more teeth.

The embodiments disclosed herein can be used to couple groups of one or more teeth to each other. The groups of one or more teeth may comprise a first group of one or more anterior teeth and a second group of one or more posterior teeth. The first group of teeth can be coupled to the second group of teeth with the polymeric shell appliances as disclosed herein.

The embodiments disclosed herein are well suited for moving one or more teeth of the first group of one or more teeth or moving one or more of the second group of one or more teeth, and combinations thereof.

The embodiments disclosed herein are well suited for combination with one or known commercially available tooth moving components such as attachments and polymeric shell appliances. In many embodiments, the appliance and one or more attachments are configured to move one or more teeth along a tooth movement vector comprising six degrees of freedom, in which three degrees of freedom are rotational and three degrees of freedom are translation.

The present disclosure provides orthodontic systems and related methods for designing and providing improved or more effective tooth moving systems for eliciting a desired tooth movement and/or repositioning teeth into a desired arrangement.

Although reference is made to an appliance comprising a polymeric shell appliance, the embodiments disclosed herein are well suited for use with many appliances that receive teeth, for example appliances without one or more of polymers or shells. The appliance can be fabricated with one or more of many materials such as metal, glass, reinforced fibers, carbon fiber, composites, reinforced composites, aluminum, biological materials, and combinations thereof for example. In some cases, the reinforced composites can comprise a polymer matrix reinforced with ceramic or metallic particles, for example. The appliance can be shaped in many ways, such as with thermoforming or direct fabrication as described herein, for example. Alternatively or in combination, the appliance can be fabricated with machining such as an appliance fabricated from a block of material with computer numeric control machining. Preferably, the appliance is fabricated using a curable composition according to the present disclosure.

Turning now to the drawings, in which like numbers designate like elements in the various figures, FIG. 1A illustrates an exemplary tooth repositioning appliance or aligner 100 that can be worn by a patient in order to achieve an incremental repositioning of individual teeth 102 in the jaw. The appliance can include a shell (e.g., a continuous polymeric shell or a segmented shell) having teeth-receiving cavities that receive and resiliently reposition the teeth. An appliance or portion(s) thereof may be indirectly fabricated using a physical model of teeth. For example, an appliance (e.g., polymeric appliance) can be formed using a physical model of teeth and a sheet of suitable layers of polymeric material. In some embodiments, a physical appliance is directly fabricated, e.g., using rapid prototyping fabrication techniques, from a digital model of an appliance. An appliance can fit over all teeth present in an upper or lower jaw, or less than all of the teeth. The appliance can be designed specifically to accommodate the teeth of the patient (e.g., the topography of the tooth-receiving cavities matches the topography of the patient's teeth), and may be fabricated based on positive or negative models of the patient's teeth generated by impression, scanning, and the like. Alternatively, the appliance can be a generic appliance configured to receive the teeth, but not necessarily shaped to match the topography of the patient's teeth. In some cases, only certain teeth received by an appliance will be repositioned by the appliance while other teeth can provide a base or anchor region for holding the appliance in place as it applies force against the tooth or teeth targeted for repositioning. In some cases, some, most, or even all of the teeth will be repositioned at some point during treatment. Teeth that are moved can also serve as a base or anchor for holding the appliance as it is worn by the patient. Typically, no wires or other means will be provided for holding an appliance in place over the teeth. In some cases, however, it may be desirable or necessary to provide individual attachments or other anchoring elements 104 on teeth 102 with corresponding receptacles or apertures 106 in the appliance 100 so that the appliance can apply a selected force on the tooth. Exemplary appliances, including those utilized in the Invisalign® System, are described in numerous patents and patent applications assigned to Align Technology, Inc. including, for example, in U.S. Pat. Nos. 6,450,807, and 5,975,893, as well as on the company's website, which is accessible on the World Wide Web (see, e.g., the url "invisalign.com"). Examples of tooth-mounted attachments suitable for use with orthodontic appliances are also described in patents and patent applications assigned to Align Technology, Inc., including, for example, U.S. Pat. Nos. 6,309,215 and 6,830,450.

Figure 1B:
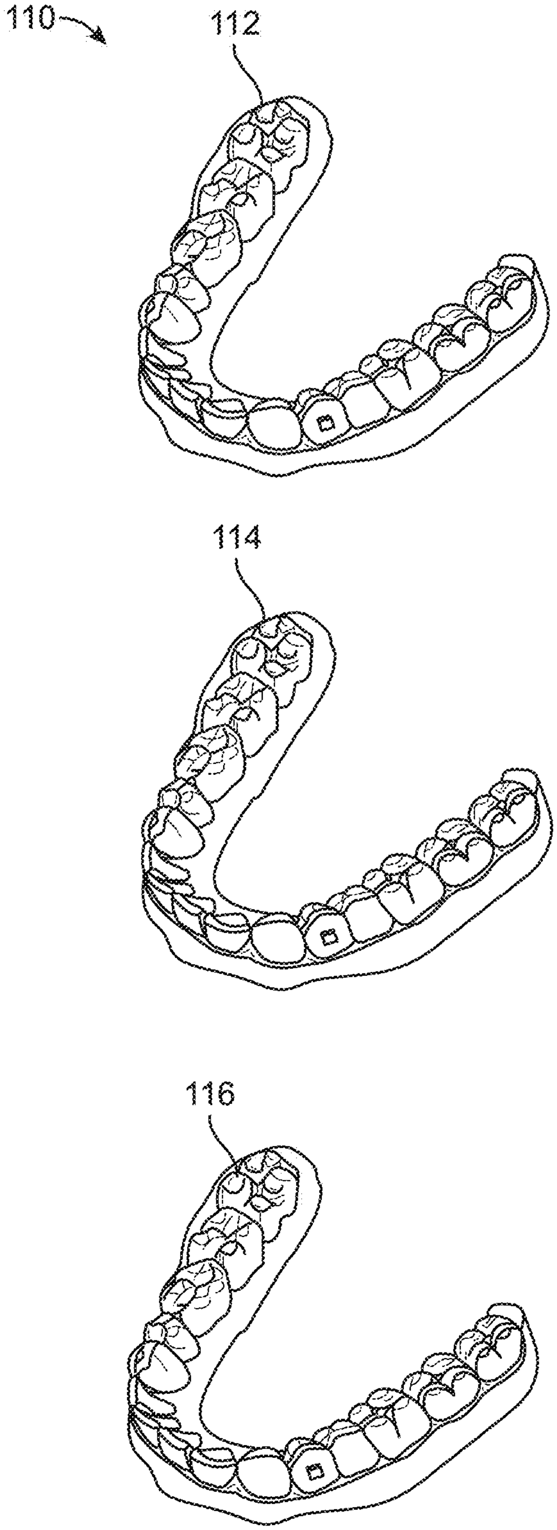
FIG. 1B illustrates a tooth repositioning system, in accordance with embodiments.

FIG. 1B illustrates a tooth repositioning system 110 including a plurality of appliances 112, 114, 116. Any of the appliances described herein can be designed and/or provided as part of a set of a plurality of appliances used in a tooth repositioning system. Each appliance may be configured so a tooth-receiving cavity has a geometry corresponding to an intermediate or final tooth arrangement intended for the appliance. The patient's teeth can be progressively repositioned from an initial tooth arrangement to a target tooth arrangement by placing a series of incremental position adjustment appliances over the patient's teeth. For example, the tooth repositioning system 110 can include a first appliance 112 corresponding to an initial tooth arrangement, one or more intermediate appliances 114 corresponding to one or more intermediate arrangements, and a final appliance 116 corresponding to a target arrangement. A target tooth arrangement can be a planned final tooth arrangement selected for the patient's teeth at the end of all planned orthodontic treatment. Alternatively, a target arrangement can be one of some intermediate arrangements for the patient's teeth during the course of orthodontic treatment, which may include various different treatment scenarios, including, but not limited to, instances where surgery is recommended, where interproximal reduction (IPR) is appropriate, where a progress check is scheduled, where anchor placement is best, where palatal expansion is desirable, where restorative dentistry is involved (e.g., inlays, onlays, crowns, bridges, implants, veneers, and the like), etc. As such, it is understood that a target tooth arrangement can be any planned resulting arrangement for the patient's teeth that follows one or more incremental repositioning stages. Likewise, an initial tooth arrangement can be any initial arrangement for the patient's teeth that is followed by one or more incremental repositioning stages.

Figure 1C:
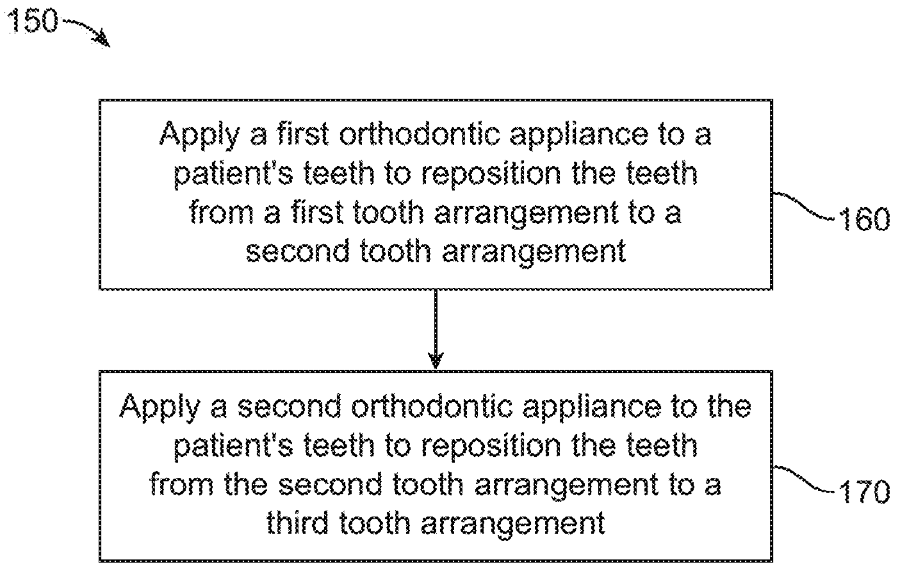
FIG. 1C illustrates a method of orthodontic treatment using a plurality of appliances, in accordance with embodiments.

FIG. 1C illustrates a method 150 of orthodontic treatment using a plurality of appliances, in accordance with embodiments. The method 150 can be practiced using any of the appliances or appliance sets described herein. In step 160, a first orthodontic appliance is applied to a patient's teeth in order to reposition the teeth from a first tooth arrangement to a second tooth arrangement. In step 170, a second orthodontic appliance is applied to the patient's teeth in order to reposition the teeth from the second tooth arrangement to a third tooth arrangement. The method 150 can be repeated as necessary using any suitable number and combination of sequential appliances in order to incrementally reposition the patient's teeth from an initial arrangement to a target arrangement. The appliances can be generated all at the same stage or in sets or batches (e.g., at the beginning of a stage of the treatment), or the appliances can be fabricated one at a time, and the patient can wear each appliance until the pressure of each appliance on the teeth can no longer be felt or until the maximum amount of expressed tooth movement for that given stage has been achieved. A plurality of different appliances (e.g., a set) can be designed and even fabricated prior to the patient wearing any appliance of the plurality. After wearing an appliance for an appropriate period of time, the patient can replace the current appliance with the next appliance in the series until no more appliances remain. The appliances are generally not affixed to the teeth and the patient may place and replace the appliances at any time during the procedure (e.g., patient-removable appliances). The final appliance or several appliances in the series may have a geometry or geometries selected to overcorrect the tooth arrangement. For instance, one or more appliances may have a geometry that would (if fully achieved) move individual teeth beyond the tooth arrangement that has been selected as the "final." Such over-correction may be desirable in order to offset potential relapse after the repositioning method has been terminated (e.g., permit movement of individual teeth back toward their pre-corrected positions). Over-correction may also be beneficial to speed the rate of correction (e.g., an appliance with a geometry that is positioned beyond a desired intermediate or final position may shift the individual teeth toward the position at a greater rate). In such cases, the use of an appliance can be terminated before the teeth reach the positions defined by the appliance. Furthermore, over-correction may be deliberately applied in order to compensate for any inaccuracies or limitations of the appliance.

The various embodiments of the orthodontic appliances presented herein can be fabricated in a wide variety of ways. In some embodiments, the orthodontic appliances herein (or portions thereof) can be produced using direct fabrication, such as additive manufacturing techniques (also referred to herein as "3D printing") or subtractive manufacturing techniques (e.g., milling). In some embodiments, direct fabrication involves forming an object (e.g., an orthodontic appliance or a portion thereof) without using a physical template (e.g., mold, mask etc.) to define the object geometry. Additive manufacturing techniques can be categorized as follows: (1) vat photopolymerization (e.g., stereolithography), in which an object is constructed layer by layer from a vat of liquid photopolymer resin; (2) material jetting, in which material is jetted onto a build platform using either a continuous or drop on demand (DOD) approach; (3) binder jetting, in which alternating layers of a build material (e.g., a powder-based material) and a binding material (e.g., a liquid binder) are deposited by a print head; (4) fused deposition modeling (FDM), in which material is drawn though a nozzle, heated, and deposited layer by layer; (5) powder bed fusion, including but not limited to direct metal laser sintering (DMLS), electron beam melting (EBM), selective heat sintering (SHS), selective laser melting (SLM), and selective laser sintering (SLS); (6) sheet lamination, including but not limited to laminated object manufacturing (LOM) and ultrasonic additive manufacturing (UAM); and (7) directed energy deposition, including but not limited to laser engineering net shaping, directed light fabrication, direct metal deposition, and 3D laser cladding. For example, stereolithography can be used to directly fabricate one or more of the appliances herein. In some embodiments, stereolithography involves selective polymerization of a photosensitive resin (e.g., a photopolymer) according to a desired cross-sectional shape using light (e.g., ultraviolet light). The object geometry can be built up in a layer-by-layer fashion by sequentially polymerizing a plurality of object cross-sections. As another example, the appliances herein can be directly fabricated using selective laser sintering. In some embodiments, selective laser sintering involves using a laser beam to selectively melt and fuse a layer of powdered material according to a desired cross-sectional shape in order to build up the object geometry. As yet another example, the appliances herein can be directly fabricated by fused deposition modeling. In some embodiments, fused deposition modeling involves melting and selectively depositing a thin filament of thermoplastic polymer in a layer-by-layer manner in order to form an object. In yet another example, material jetting can be used to directly fabricate the appliances herein. In some embodiments, material jetting involves jetting or extruding one or more materials onto a build surface in order to form successive layers of the object geometry.

Alternatively or in combination, some embodiments of the appliances herein (or portions thereof) can be produced using indirect fabrication techniques, such as by thermoforming over a positive or negative mold. Indirect fabrication of an orthodontic appliance can involve producing a positive or negative mold of the patient's dentition in a target arrangement (e.g., by rapid prototyping, milling, etc.) and thermoforming one or more sheets of material over the mold in order to generate an appliance shell.

In some embodiments, the direct fabrication methods provided herein build up the object geometry in a layer-by-layer fashion, with successive layers being formed in discrete build steps. Alternatively or in combination, direct fabrication methods that allow for continuous build-up of an object geometry can be used, referred to herein as "continuous direct fabrication." Various types of continuous direct fabrication methods can be used. As an example, in some embodiments, the appliances herein are fabricated using "continuous liquid interphase printing," in which an object is continuously built up from a reservoir of photopolymerizable resin by forming a gradient of partially cured resin between the building surface of the object and a polymerization-inhibited "dead zone." In some embodiments, a semi-permeable membrane is used to control transport of a photopolymerization inhibitor (e.g., oxygen) into the dead zone in order to form the polymerization gradient. Continuous liquid interphase printing can achieve fabrication speeds about 25 times to about 100 times faster than other direct fabrication methods, and speeds about 1000 times faster can be achieved with the incorporation of cooling systems. Continuous liquid interphase printing is described in U.S. Patent Publication Nos. 2015/0097315, 2015/0097316, and 2015/0102532, the disclosures of each of which are incorporated herein by reference in their entirety.

As another example, a continuous direct fabrication method can achieve continuous build-up of an object geometry by continuous movement of the build platform (e.g., along the vertical or Z-direction) during the irradiation phase, such that the hardening depth of the irradiated photopolymer is controlled by the movement speed. Accordingly, continuous polymerization of material on the build surface can be achieved. Such methods are described in U.S. Pat. No. 7,892,474, the disclosure of which is incorporated herein by reference in its entirety.

In another example, a continuous direct fabrication method can involve extruding a composite material composed of a curable liquid material surrounding a solid strand. The composite material can be extruded along a continuous three-dimensional path in order to form the object. Such methods are described in U.S. Patent Publication No. 2014/0061974, the disclosure of which is incorporated herein by reference in its entirety.

In yet another example, a continuous direct fabrication method utilizes a "heliolithography" approach in which the liquid photopolymer is cured with focused radiation while the build platform is continuously rotated and raised. Accordingly, the object geometry can be continuously built up along a spiral build path. Such methods are described in U.S. Patent Publication No. 2014/0265034, the disclosure of which is incorporated herein by reference in its entirety.

The direct fabrication approaches provided herein are compatible with a wide variety of materials, including but not limited to one or more of the following: a polyester, a co-polyester, a polycarbonate, a thermoplastic polyurethane, a polypropylene, a polyethylene, a polypropylene and polyethylene copolymer, an acrylic, a cyclic block copolymer, a polyetheretherketone, a polyamide, a polyethylene terephthalate, a polybutylene terephthalate, a polyetherimide, a polyethersulfone, a polytrimethylene terephthalate, a styrenic block copolymer (SBC), a silicone rubber, an elastomeric alloy, a thermoplastic elastomer (TPE), a thermoplastic vulcanizate (TPV) elastomer, a polyurethane elastomer, a block copolymer elastomer, a polyolefin blend elastomer, a thermoplastic co-polyester elastomer, a thermoplastic polyamide elastomer, a thermoset material, or combinations thereof. The materials used for direct fabrication can be provided in an uncured form (e.g., as a liquid, resin, powder, etc.) and can be cured (e.g., by photopolymerization, light curing, gas curing, laser curing, crosslinking, etc.) in order to form an orthodontic appliance or a portion thereof. The properties of the material before curing may differ from the properties of the material after curing. Once cured, the materials herein can exhibit sufficient strength, stiffness, durability, biocompatibility, etc. for use in an orthodontic appliance. The post-curing properties of the materials used can be selected according to the desired properties for the corresponding portions of the appliance.

In some embodiments, relatively rigid portions of the orthodontic appliance can be formed via direct fabrication using one or more of the following materials: a polyester, a co-polyester, a polycarbonate, a thermoplastic polyurethane, a polypropylene, a polyethylene, a polypropylene and polyethylene copolymer, an acrylic, a cyclic block copolymer, a polyetheretherketone, a polyamide, a polyethylene terephthalate, a polybutylene terephthalate, a polyetherimide, a polyethersulfone, and/or a polytrimethylene terephthalate.

In some embodiments, relatively elastic portions of the orthodontic appliance can be formed via direct fabrication using one or more of the following materials: a styrenic block copolymer (SBC), a silicone rubber, an elastomeric alloy, a thermoplastic elastomer (TPE), a thermoplastic vulcanizate (TPV) elastomer, a polyurethane elastomer, a block copolymer elastomer, a polyolefin blend elastomer, a thermoplastic co-polyester elastomer, and/or a thermoplastic polyamide elastomer.

Machine parameters can include curing parameters. For digital light processing (DLP)-based curing systems, curing parameters can include power, curing time, and/or grayscale of the full image. For laser-based curing systems, curing parameters can include power, speed, beam size, beam shape and/or power distribution of the beam. For printing systems, curing parameters can include material drop size, viscosity, and/or curing power. These machine parameters can be monitored and adjusted on a regular basis (e.g., some parameters at every 1−x layers and some parameters after each build) as part of the process control on the fabrication machine. Process control can be achieved by including a sensor on the machine that measures power and other beam parameters every layer or every few seconds and automatically adjusts them with a feedback loop. For DLP machines, gray scale can be measured and calibrated before, during, and/or at the end of each build, and/or at predetermined time intervals (e.g., every $n^{th}$ build, once per hour, once per day, once per week, etc.), depending on the stability of the system. In addition, material properties and/or photo-characteristics can be provided to the fabrication machine, and a machine process control module can use these parameters to adjust machine parameters (e.g., power, time, gray scale, etc.) to compensate for variability in material properties. By implementing process controls for the fabrication machine, reduced variability in appliance accuracy and residual stress can be achieved.

Optionally, the direct fabrication methods described herein allow for fabrication of an appliance including multiple materials, referred to herein as “multi-material direct fabrication.” In some embodiments, a multi-material direct fabrication method involves concurrently forming an object from multiple materials in a single manufacturing step. For instance, a multi-tip extrusion apparatus can be used to selectively dispense multiple types of materials from distinct material supply sources in order to fabricate an object from a plurality of different materials. Such methods are described in U.S. Pat. No. 6,749,414, the disclosure of which is incorporated herein by reference in its entirety. Alternatively or in combination, a multi-material direct fabrication method can involve forming an object from multiple materials in a plurality of sequential manufacturing steps. For instance, a first portion of the object can be formed from a first material in accordance with any of the direct fabrication methods herein, then a second portion of the object can be formed from a second material in accordance with methods herein, and so on, until the entirety of the object has been formed.

Direct fabrication can provide various advantages compared to other manufacturing approaches. For instance, in contrast to indirect fabrication, direct fabrication permits production of an orthodontic appliance without utilizing any molds or templates for shaping the appliance, thus reducing the number of manufacturing steps involved and improving the resolution and accuracy of the final appliance geometry. Additionally, direct fabrication permits precise control over the three-dimensional geometry of the appliance, such as the appliance thickness. Complex structures and/or auxiliary components can be formed integrally as a single piece with the appliance shell in a single manufacturing step, rather than being added to the shell in a separate manufacturing step. In some embodiments, direct fabrication is used to produce appliance geometries that would be difficult to create using alternative manufacturing techniques, such as appliances with very small or fine features, complex geometric shapes, undercuts, interproximal structures, shells with variable thicknesses, and/or internal structures (e.g., for improving strength with reduced weight and material usage). For example, in some embodiments, the direct fabrication approaches herein permit fabrication of an orthodontic appliance with feature sizes of less than or equal to about 5 μm, or within a range from about 5 μm to about 50 μm, or within a range from about 20 μm to about 50 μm.

The direct fabrication techniques described herein can be used to produce appliances with substantially isotropic material properties, e.g., substantially the same or similar strengths along all directions. In some embodiments, the direct fabrication approaches herein permit production of an orthodontic appliance with a strength that varies by no more than about 25%, about 20%, about 15%, about 10%, about 5%, about 1%, or about 0.5% along all directions. Additionally, the direct fabrication approaches herein can be used to produce orthodontic appliances at a faster speed compared to other manufacturing techniques. In some embodiments, the direct fabrication approaches herein allow for production of an orthodontic appliance in a time interval less than or equal to about 1 hour, about 30 minutes, about 25 minutes, about 20 minutes, about 15 minutes, about 10 minutes, about 5 minutes, about 4 minutes, about 3 minutes, about 2 minutes, about 1 minutes, or about 30 seconds. Such manufacturing speeds allow for rapid “chair-side” production of customized appliances, e.g., during a routine appointment or checkup.

In some embodiments, the direct fabrication methods described herein implement process controls for various machine parameters of a direct fabrication system or device in order to ensure that the resultant appliances are fabricated with a high degree of precision. Such precision can be beneficial for ensuring accurate delivery of a desired force system to the teeth in order to effectively elicit tooth movements. Process controls can be implemented to account for process variability arising from multiple sources, such as the material properties, machine parameters, environmental variables, and/or post-processing parameters.

Material properties may vary depending on the properties of raw materials, purity of raw materials, and/or process variables during mixing of the raw materials. In many embodiments, resins or other materials for direct fabrication should be manufactured with tight process control to ensure little variability in photo-characteristics, material properties (e.g., viscosity, surface tension), physical properties (e.g., modulus, strength, elongation) and/or thermal properties (e.g., glass transition temperature, heat deflection temperature). Process control for a material manufacturing process can be achieved with screening of raw materials for physical properties and/or control of temperature, humidity, and/or other process parameters during the mixing process. By implementing process controls for the material manufacturing procedure, reduced variability of process parameters and more uniform material properties for each batch of material can be achieved. Residual variability in material properties can be compensated with process control on the machine, as discussed further herein.

Machine parameters can include curing parameters. For digital light processing (DLP)-based curing systems, curing parameters can include power, curing time, and/or grayscale of the full image. For laser-based curing systems, curing parameters can include power, speed, beam size, beam shape and/or power distribution of the beam. For printing systems, curing parameters can include material drop size, viscosity, and/or curing power. These machine parameters can be monitored and adjusted on a regular basis (e.g., some parameters at every 1−x layers and some parameters after each build) as part of the process control on the fabrication machine. Process control can be achieved by including a sensor on the machine that measures power and other beam parameters every layer or every few seconds and automatically adjusts them with a feedback loop. For DLP machines, gray scale can be measured and calibrated at the end of each build. In addition, material properties and/or photo-characteristics can be provided to the fabrication machine, and a machine process control module can use these parameters to adjust machine parameters (e.g., power, time, gray scale, etc.) to compensate for variability in material properties. By implementing process controls for the fabrication machine, reduced variability in appliance accuracy and residual stress can be achieved.

In many embodiments, environmental variables (e.g., temperature, humidity, Sunlight or exposure to other energy/curing source) are maintained in a tight range to reduce variable in appliance thickness and/or other properties. Optionally, machine parameters can be adjusted to compensate for environmental variables.

In many embodiments, post-processing of appliances includes cleaning, post-curing, and/or support removal processes. Relevant post-processing parameters can include purity of cleaning agent, cleaning pressure and/or temperature, cleaning time, post-curing energy and/or time, and/or consistency of support removal process. These parameters can be measured and adjusted as part of a process control scheme. In addition, appliance physical properties can be varied by modifying the post-processing parameters. Adjusting post-processing machine parameters can provide another way to compensate for variability in material properties and/or machine properties.

The configuration of the orthodontic appliances herein can be determined according to a treatment plan for a patient, e.g., a treatment plan involving successive administration of a plurality of appliances for incrementally repositioning teeth. Computer-based treatment planning and/or appliance manufacturing methods can be used in order to facilitate the design and fabrication of appliances. For instance, one or more of the appliance components described herein can be digitally designed and fabricated with the aid of computer-controlled manufacturing devices (e.g., computer numerical control (CNC) milling, computer-controlled rapid prototyping such as 3D printing, etc.). The computer-based methods presented herein can improve the accuracy, flexibility, and convenience of appliance fabrication.

Figure 2:
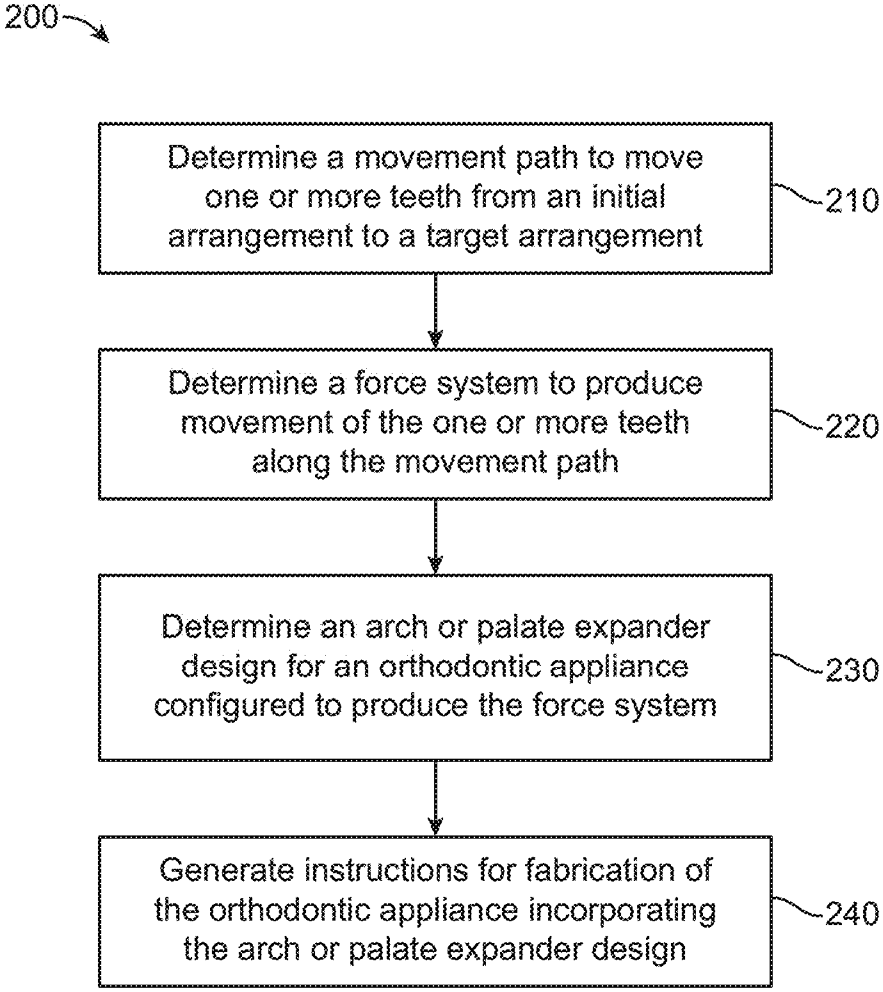
FIG. 2 illustrates a method for designing an orthodontic appliance, in accordance with embodiments.

FIG. 2 illustrates a method 200 for designing an orthodontic appliance to be produced by direct fabrication, in accordance with embodiments. The method 200 can be applied to any embodiment of the orthodontic appliances described herein. Some or all of the steps of the method 200 can be performed by any suitable data processing system or device, e.g., one or more processors configured with suitable instructions.

In step 210, a movement path to move one or more teeth from an initial arrangement to a target arrangement is determined. The initial arrangement can be determined from a mold or a scan of the patient's teeth or mouth tissue, e.g., using wax bites, direct contact scanning, x-ray imaging, tomographic imaging, sonographic imaging, and other techniques for obtaining information about the position and structure of the teeth, jaws, gums and other orthodontically relevant tissue. From the obtained data, a digital data set can be derived that represents the initial (e.g., pretreatment) arrangement of the patient's teeth and other tissues. Optionally, the initial digital data set is processed to segment the tissue constituents from each other. For example, data structures that digitally represent individual tooth crowns can be produced. Advantageously, digital models of entire teeth can be produced, including measured or extrapolated hidden surfaces and root structures, as well as surrounding bone and soft tissue.

The target arrangement of the teeth (e.g., a desired and intended end result of orthodontic treatment) can be received from a clinician in the form of a prescription, can be calculated from basic orthodontic principles, and/or can be extrapolated computationally from a clinical prescription. With a specification of the desired final positions of the teeth and a digital representation of the teeth themselves, the final position and surface geometry of each tooth can be specified to form a complete model of the tooth arrangement at the desired end of treatment.

Having both an initial position and a target position for each tooth, a movement path can be defined for the motion of each tooth. In some embodiments, the movement paths are configured to move the teeth in the quickest fashion with the least amount of round-tripping to bring the teeth from their initial positions to their desired target positions. The tooth paths can optionally be segmented, and the segments can be calculated so that each tooth's motion within a segment stays within threshold limits of linear and rotational translation. In this way, the end points of each path segment can constitute a clinically viable repositioning, and the aggregate of segment end points can constitute a clinically viable sequence of tooth positions, so that moving from one point to the next in the sequence does not result in a collision of teeth.

In step 220, a force system to produce movement of the one or more teeth along the movement path is determined. A force system can include one or more forces and/or one or more torques. Different force systems can result in different types of tooth movement, such as tipping, translation, rotation, extrusion, intrusion, root movement, etc. Biomechanical principles, modeling techniques, force calculation/measurement techniques, and the like, including knowledge and approaches commonly used in orthodontia, may be used to determine the appropriate force system to be applied to the tooth to accomplish the tooth movement. In determining the force system to be applied, sources may be considered including literature, force systems determined by experimentation or virtual modeling, computer-based modeling, clinical experience, minimization of unwanted forces, etc.

The determination of the force system can include constraints on the allowable forces, such as allowable directions and magnitudes, as well as desired motions to be brought about by the applied forces. For example, in fabricating palatal expanders, different movement strategies may be desired for different patients. For example, the amount of force needed to separate the palate can depend on the age of the patient, as very young patients may not have a fully-formed suture. Thus, in juvenile patients and others without fully-closed palatal sutures, palatal expansion can be accomplished with lower force magnitudes. Slower palatal movement can also aid in growing bone to fill the expanding suture. For other patients, a more rapid expansion may be desired, which can be achieved by applying larger forces. These requirements can be incorporated as needed to choose the structure and materials of appliances; for example, by choosing palatal expanders capable of applying large forces for rupturing the palatal suture and/or causing rapid expansion of the palate. Subsequent appliance stages can be designed to apply different amounts of force, such as first applying a large force to break the suture, and then applying smaller forces to keep the suture separated or gradually expand the palate and/or arch.

The determination of the force system can also include modeling of the facial structure of the patient, such as the skeletal structure of the jaw and palate. Scan data of the palate and arch, such as Xray data or 3D optical scanning data, for example, can be used to determine parameters of the skeletal and muscular system of the patient's mouth, so as to determine forces sufficient to provide a desired expansion of the palate and/or arch. In some embodiments, the thickness and/or density of the mid-palatal suture may be measured, or input by a treating professional. In other embodiments, the treating professional can select an appropriate treatment based on physiological characteristics of the patient. For example, the properties of the palate may also be estimated based on factors such as the patient's age—for example, young juvenile patients will typically require lower forces to expand the suture than older patients, as the suture has not yet fully formed.

In step 230, an arch or palate expander design for an orthodontic appliance configured to produce the force system is determined. Determination of the arch or palate expander design, appliance geometry, material composition, and/or properties can be performed using a treatment or force application simulation environment. A simulation environment can include, e.g., computer modeling systems, biomechanical systems or apparatus, and the like. Optionally, digital models of the appliance and/or teeth can be produced, such as finite element models. The finite element models can be created using computer program application software available from a variety of vendors. For creating solid geometry models, computer aided engineering (CAE) or computer aided design (CAD) programs can be used, such as the AutoCAD® software products available from Autodesk, Inc., of San Rafael, CA. For creating finite element models and analyzing them, program products from a number of vendors can be used, including finite element analysis packages from ANSYS, Inc., of Canonsburg, PA, and SIMULIA(Abaqus) software products from Dassault Systèmes of Waltham, MA.

Optionally, one or more arch or palate expander designs can be selected for testing or force modeling. As noted above, a desired tooth movement, as well as a force system required or desired for eliciting the desired tooth movement, can be identified. Using the simulation environment, a candidate arch or palate expander design can be analyzed or modeled for determination of an actual force system resulting from use of the candidate appliance. One or more modifications can optionally be made to a candidate appliance, and force modeling can be further analyzed as described, e.g., in order to iteratively determine an appliance design that produces the desired force system.

In step 240, instructions for fabrication of the orthodontic appliance incorporating the arch or palate expander design are generated. The instructions can be configured to control a fabrication system or device in order to produce the orthodontic appliance with the specified arch or palate expander design. In some embodiments, the instructions are configured for manufacturing the orthodontic appliance using direct fabrication (e.g., stereolithography, selective laser sintering, fused deposition modeling, 3D printing, continuous direct fabrication, multi-material direct fabrication, etc.), in accordance with the various methods presented herein. In alternative embodiments, the instructions can be configured for indirect fabrication of the appliance, e.g., by thermoforming.

Method 200 may comprise additional steps: 1) The upper arch and palate of the patient is scanned intraorally to generate three dimensional data of the palate and upper arch; 2) The three dimensional shape profile of the appliance is determined to provide a gap and teeth engagement structures as described herein.

Although the above steps show a method 200 of designing an orthodontic appliance in accordance with some embodiments, a person of ordinary skill in the art will recognize some variations based on the teaching described herein. Some of the steps may comprise sub-steps. Some of the steps may be repeated as often as desired. One or more steps of the method 200 may be performed with any suitable fabrication system or device, such as the embodiments described herein. Some of the steps may be optional, and the order of the steps can be varied as desired.

Figure 3:
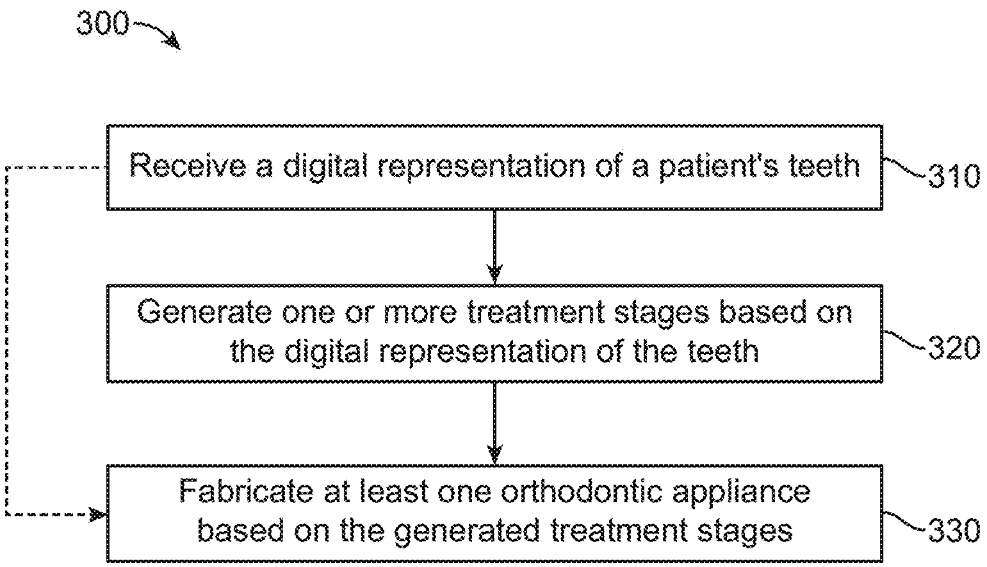
FIG. 3 illustrates a method for digitally planning an orthodontic treatment, in accordance with embodiments.

FIG. 3 illustrates a method 300 for digitally planning an orthodontic treatment and/or design or fabrication of an appliance, in accordance with embodiments. The method 300 can be applied to any of the treatment procedures described herein and can be performed by any suitable data processing system.

In step 310, a digital representation of a patient's teeth is received. The digital representation can include surface topography data for the patient's intraoral cavity (including teeth, gingival tissues, etc.). The surface topography data can be generated by directly scanning the intraoral cavity, a physical model (positive or negative) of the intraoral cavity, or an impression of the intraoral cavity, using a suitable scanning device (e.g., a handheld scanner, desktop scanner, etc.).

In step 320, one or more treatment stages are generated based on the digital representation of the teeth. The treatment stages can be incremental repositioning stages of an orthodontic treatment procedure designed to move one or more of the patient's teeth from an initial tooth arrangement to a target arrangement. For example, the treatment stages can be generated by determining the initial tooth arrangement indicated by the digital representation, determining a target tooth arrangement, and determining movement paths of one or more teeth in the initial arrangement necessary to achieve the target tooth arrangement. The movement path can be optimized based on minimizing the total distance moved, preventing collisions between teeth, avoiding tooth movements that are more difficult to achieve, or any other suitable criteria.

In step 330, at least one orthodontic appliance is fabricated based on the generated treatment stages. For example, a set of appliances can be fabricated, each shaped according a tooth arrangement specified by one of the treatment stages, such that the appliances can be sequentially worn by the patient to incrementally reposition the teeth from the initial arrangement to the target arrangement. The appliance set may include one or more of the orthodontic appliances described herein. The fabrication of the appliance may involve creating a digital model of the appliance to be used as input to a computer-controlled fabrication system. The appliance can be formed using direct fabrication methods, indirect fabrication methods, or combinations thereof, as desired.

In some instances, staging of various arrangements or treatment stages may not be necessary for design and/or fabrication of an appliance. As illustrated by the dashed line in FIG. 3, design and/or fabrication of an orthodontic appliance, and perhaps a particular orthodontic treatment, may include use of a representation of the patient's teeth (e.g., receive a digital representation of the patient's teeth 310), followed by design and/or fabrication of an orthodontic appliance based on a representation of the patient's teeth in the arrangement represented by the received representation.

EXAMPLES

The following examples are given for the purpose of illustrating various embodiments of the invention and are not meant to limit the present disclosure in any fashion. The present examples, along with the methods described herein are presently representative of preferred embodiments, are exemplary, and are not intended as limitations on the scope of the invention. Changes therein and other uses which are encompassed within the spirit of the invention as defined by the scope of the claims will occur to those skilled in the art.

All chemicals were purchased from commercial sources and were used without further purification, unless otherwise stated.

1H NMR spectra were recorded on a BRUKER AC-E-200 FT-NMR spectrometer. The chemical shifts are reported in ppm (s: singlet, d: doublet, t: triplet, q: quartet, m: multiplet). The solvent used was deuterated chloroform ($CDCl_3$, 99.5% deuteration). IR spectra were recorded on a Perkin Elmer Spectrum 65 FT-IR spectrometer.

Synthesis Example 1: Synthesis of Glass Transition Modifier TGM1

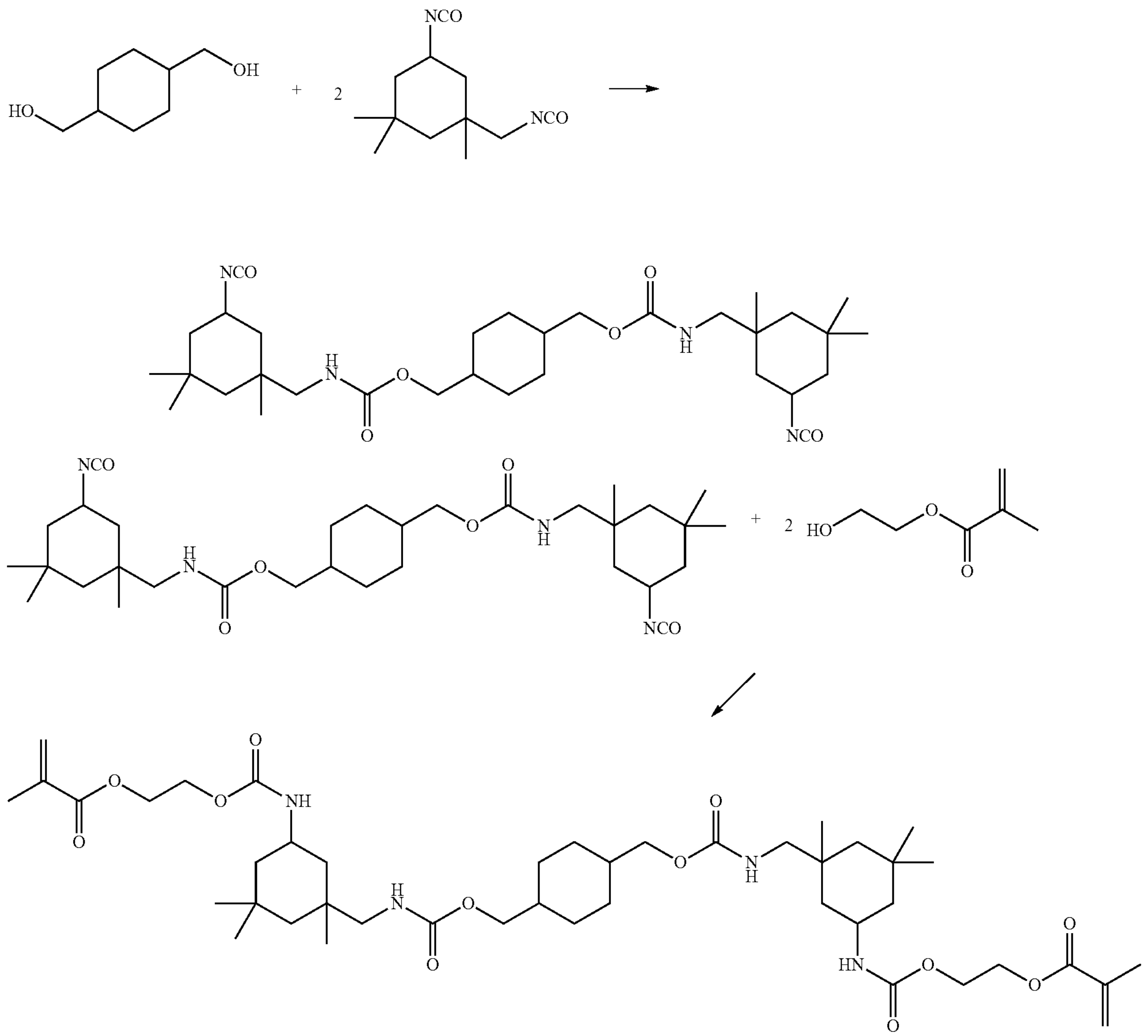

TGM1

20 g of cyclohexanedimethanol (CHDM, M=144.21 g/mol, 0.139 mol) were added to 200 ml of dimethylformamide and stirred until complete dissolution at 60° C. Then, 61.66 g isophorone diisocyanate (IPDI, M=222.3 g/mol, 0.277 mol) were added to the mixture. The reaction was monitored using ATR-IR spectroscopy and was finished when the area of the NCO group absorption signal (2275-2250 $cm^{-1}$) in the IR spectra became constant (approx. 3 h). Then, 36.10 g of hydroxyethyl methacrylate (HEMA, M=130.14 g/mol, 0.277 mol) were added to the mixture together with 35 mg of 3,5-di-tert-butyl-4-hydroxytoluene (BHT) as an inhibitor (300 ppm) and 58 mg of dibutyltin dilaurate (DBTDL) as a catalyst (500 ppm). The solution was reacted until the signal of the NCO group completely disappeared in the IR spectra. The solvent was distilled off and the resulting colorless viscous liquid TGM1 was used without further purification. $^{1}$H NMR (CDCl3, 200 MHz, δ, ppm): 6.14 (d, 2H, 2×>C═$CH_2$, cis), 5.61 (d, 2H, 2×>C═$CH_2$, trans), 4.95-4.47 (m, 4H, 4× C—NH—), 4.32 (m, 8H, 2×—O—$CH_2$—$CH_2$—O—), 4.1-3.8 (m, 6H, 2×>CH—NH, 2×>CH—$CH_2$—O), 3.2 (q, 1H, NH—$CH_2$—), 2.9 (m, 3H, NH—$CH_2$—), 1.95 (s, 6H, 2×$CH_2$═C—$CH_3$), 1.9-0.8 (m, 40H, >$CH_2$, >C—$CH_3$, >CH—). $IR_{neat}$ ($cm^{-1}$): 3325 ($\nu_{N—H}$), 2950 ($\nu_{C—H}$), 2923 ($\nu_{C—H}$), 1703 ($\nu_{C═O}$), 1637 ($\nu_{C═C}$), 1527 ($\delta_{NH}$), 1452 ($\delta_{CH3}$), 1300 ($\delta_{CH2}$), 1237 ($\nu_{C—O}$), 1165 ($\nu_{C—N}$), 1139 (νC—O), 1037 ($\delta_{>CH2}$), 891 ($\gamma_{C═C}$).

Synthesis Example 2: Synthesis of Glass Transition Modifier TGM2

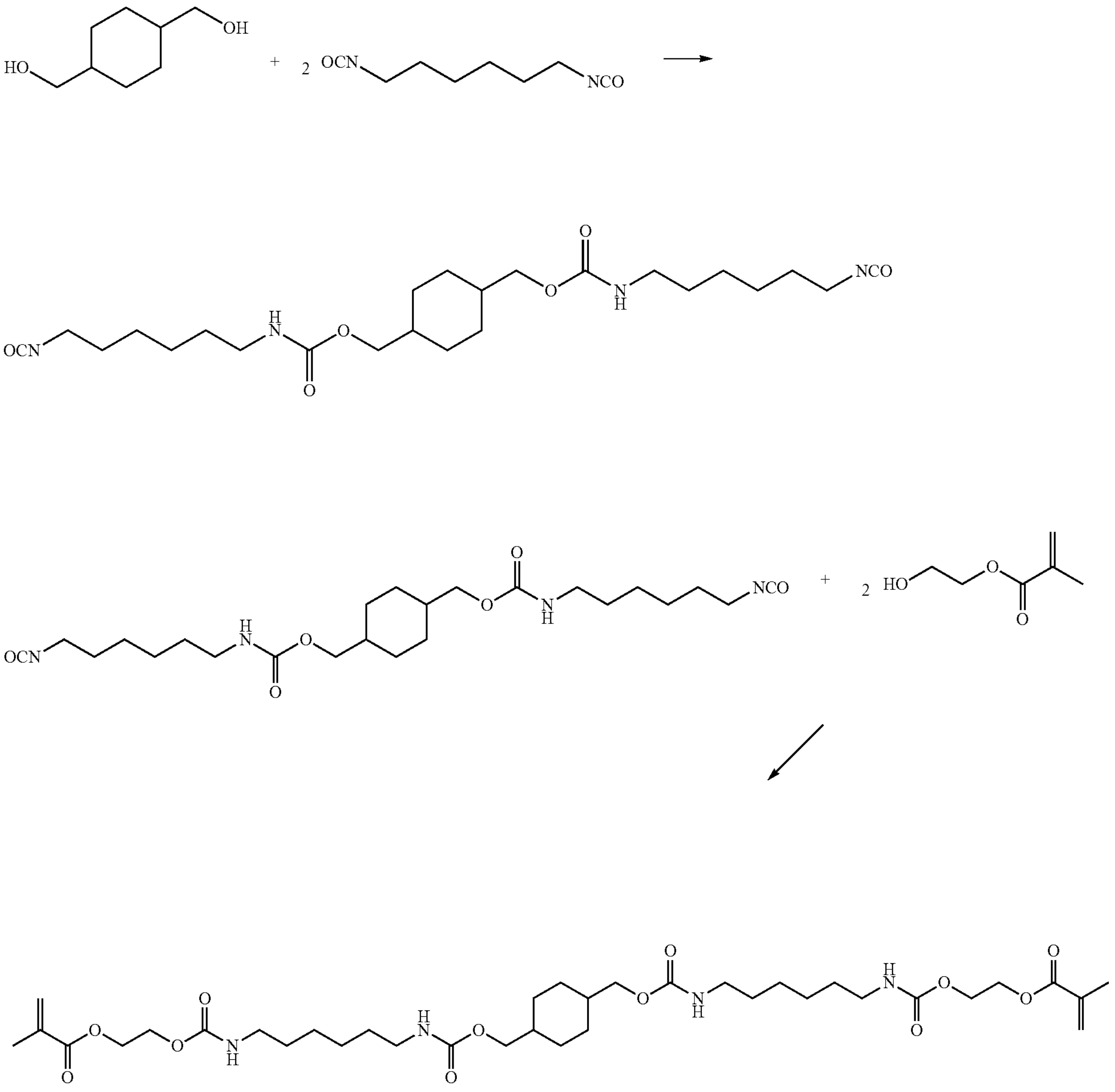

TGM2

The preparation of TGM2 was similar to Synthesis Example 1, using hexamethylene diisocyanate (HDI) as the reactive isocyanate compound in the first step. The white, solid product TGM2 was quenched in deionized water, filtered off and dried before use. $^1$H NMR ($CDCl_3$, 200 MHz, δ, ppm): 6.06 (d, 2H, 2x>C═$CH_2$, cis), 5.52 (d, 2H, 2x>C═$CH_2$, trans), 4.72 (s, 4H, 4x —NH—), 4.25 (m, 8H, 2x—O—$CH_2$—$CH_2$—O—), 3.84 (d, 4H, 2x>CH—$CH_2$—O), 3.09 (m, 8H, 4x OCO—NH—$CH_2$—), 1.88 (s, 6H, 2x $CH_2$═C—$CH_3$), 1.8-0.8 (m, 26H, —$CH_2$—, >CH—). $IR_{neat}$ ($cm^{-1}$): 3325 ($\nu_{N-H}$), 2940 ($\nu_{C-H}$), 2854 ($\nu_{C-H}$), 1715 ($\nu_{C=O}$), 1685 ($\nu_{C=O}$), 1638 ($\nu_{C=C}$), 1532 ($\delta_{NH}$), 1441 ($\delta_{CH2}$), 1342 ($\delta_{CH2}$), 1260 ($\nu_{C-O}$), 1167 ($\nu_{C-N}$), 1137 ($\nu_{C-O}$), 1061 ($\delta_{>CH2}$), 944 ($\gamma_{C=C}$).

Synthesis Example 3. Synthesis of Glass Transition Modifier TGM3

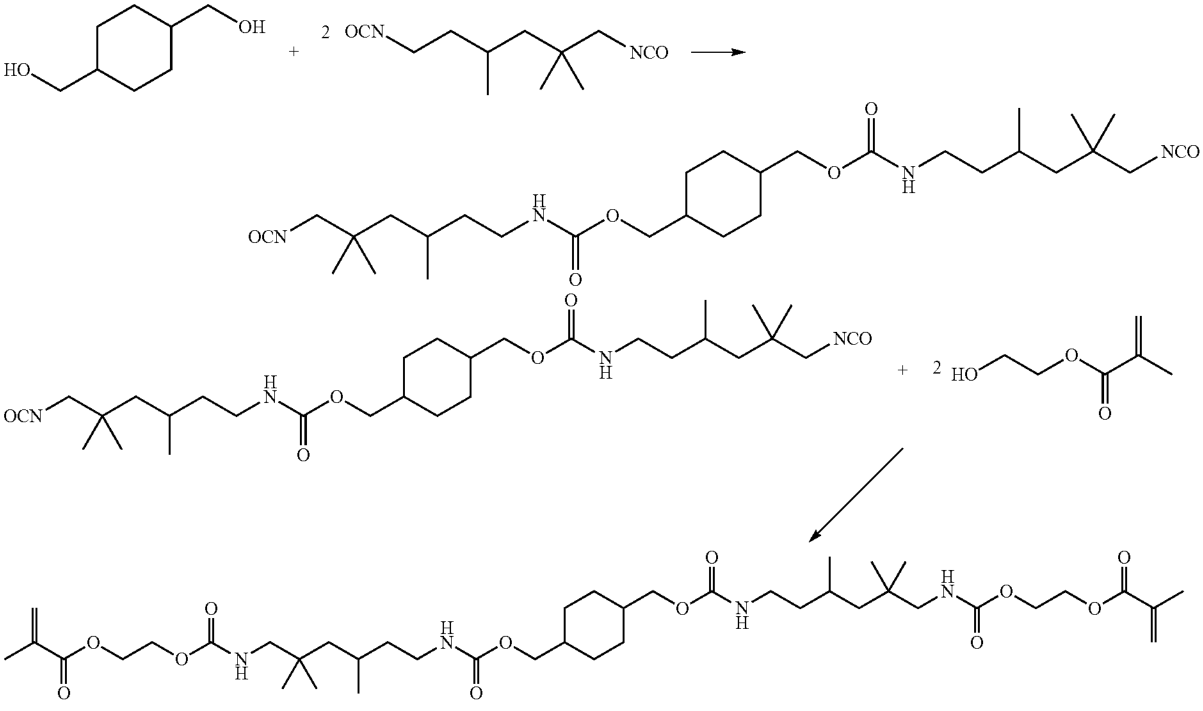

TGM3

The preparation of TGM3 was similar to Synthesis Example 1, using trimethylhexamethylene diisocyanate (TMDI) as the reactive isocyanate compound in the first step. The white, solid product TGM3 was quenched in deionized water, filtered off and dried before use. $^1$H NMR ($CDCl_3$, 200 MHz, δ, ppm): 6.07 (d, 2H, 2x>C═$CH_2$, cis), 5.52 (d, 2H, 2x>C═$CH_2$, trans), 4.95-4.55 (m, 4H, 4xC—NH—), 4.26 (m, 8H, 2x—O—$CH_2$—$CH_2$—O—), 3.95-3.75 (m, 4H, 2x>CH—$CH_2$—O—), 3.2-2.8 (m, 8H, NH—$CH_2$—), 1.88 (s, 6H, 2x$CH_2$═C—$CH_3$), 1.8-0.7 (m, 38H, >$CH_2$, —$CH_2$—$CH_2$—, CH—$CH_3$>CH—). $IR_{neat}$ ($cm^{-1}$): 3335 ($\nu_{N-H}$), 2928 ($\nu_{C-H}$), 2865 ($\nu_{C-H}$), 1695 ($\nu_{C=O}$), 1640 ($\nu_{C=C}$), 1529 ($\delta_{NH}$), 1450 ($\delta_{CH2}$), 1364 ($\delta_{CH2}$), 1240 ($\nu_{C-O}$), 1163 ($\nu_{C-N}$), 1139 ($\nu_{C-O}$), 1033 ($\delta_{>CH2}$), 946 ($\gamma_{C=C}$).

Synthesis Example 4: Synthesis of Glass Transition Modifier TGM4

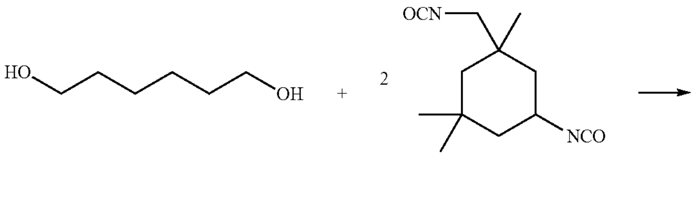

-continued

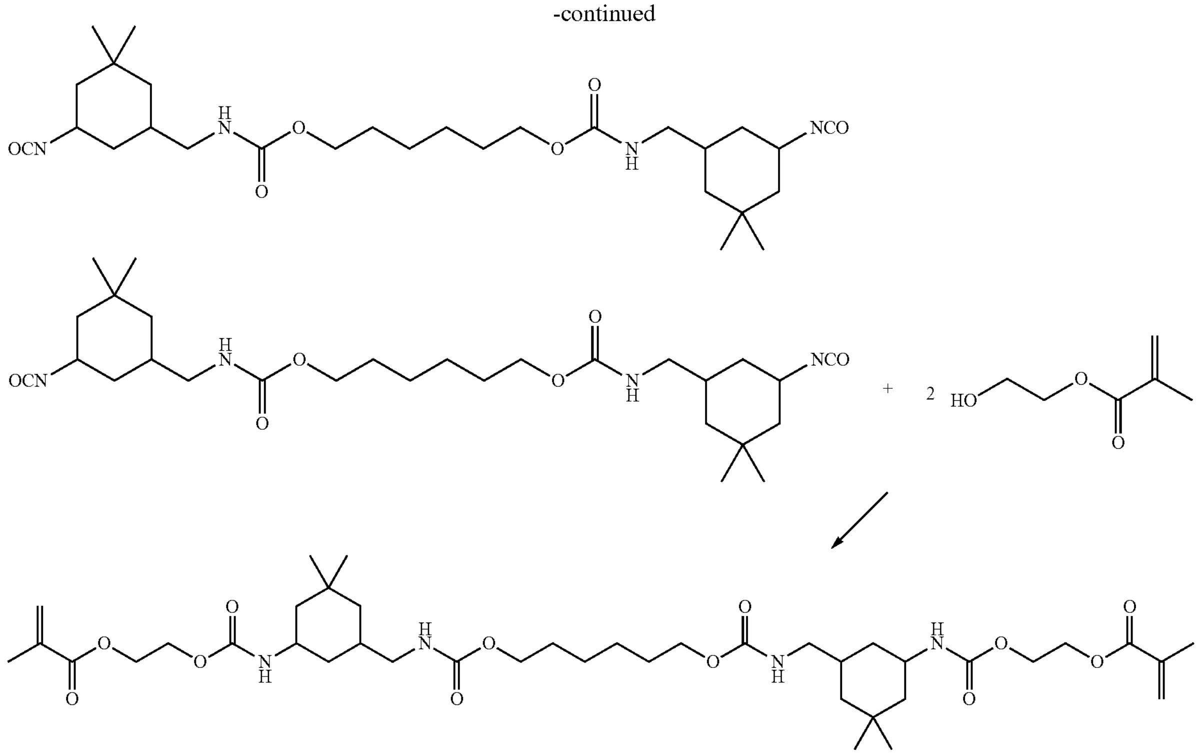

TGM4

The preparation was similar to Synthesis Example 1, using hexanediol (HD) as the diol compound in the first step. The colorless, viscous product TGM4 was quenched in deionized water, filtered off and dried before use. $^{1}H$ NMR ($CDCl_3$, 200 MHz, δ, ppm): 6.07 (d, 2H, 2x>C=$CH_2$, cis), 5.53 (d, 2H, 2x>C=$CH_2$, trans), 4.72 (s, 4H, 4x—NH—), 4.25 (m, 8H, 2x—O—$CH_2$—$CH_2$—O—), 3.84 (d, 4H, 2x>CH—$CH_2$—O), 3.09 (m, 8H, 4xOCO—NH—$CH_2$—), 1.88 (s, 6H, 2x$CH_2$=C—$CH_3$), 1.8-0.8 (m, 26H, —$CH_2$—, >CH—). $IR_{neat}$ ($cm^{-1}$): 3330 ($\nu_{N-H}$), 2952 ($\nu_{C-H}$), 2861 ($\nu_{C-H}$), 1691 ($\nu_{C=O}$), 1636 ($\nu_{C=C}$), 1529 ($\delta_{NH}$), 1454 ($\delta_{CH2}$), 1364 ($\delta_{CH2}$), 1301 ($\nu_{C-O}$), 1238 ($\nu_{C-O}$), 1171 ($\nu_{C-N}$), 1041 ($\nu_{C-O}$), 946 ($\gamma_{C=C}$).

Synthesis Example 5: Synthesis of Toughness Modifier TNM1

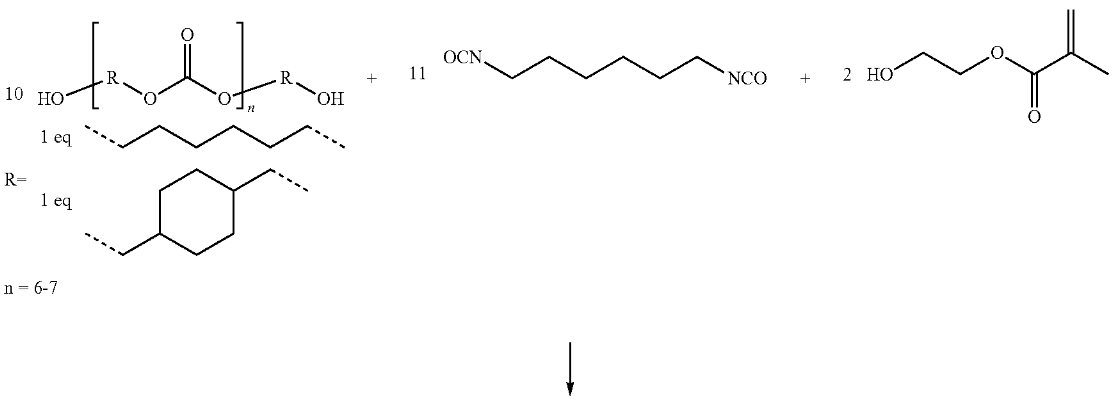

-continued

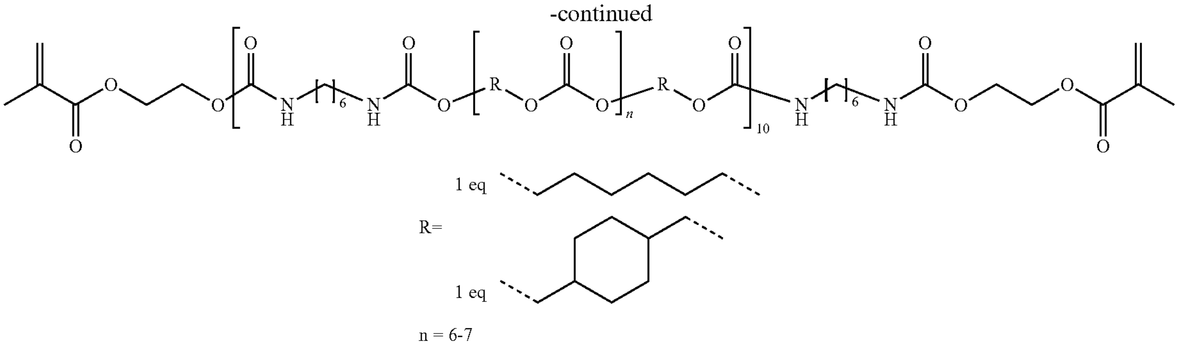

TNM1

40 g of UBE Eternacoll UM-90 (1/1) polycarbonate diol ($M_{avg}$=900 g/mol, 0.044 mol, 10 eq) were added to 200 ml of dimethylformamide and the solution was stirred at 90° C. Then, 8.22 g of HDI (M=168.2 g/mol, 0.049 mol, 11 eq) and 25 mg of dibutyltin dilaurate (500 ppm) were added to the flask and the reaction was monitored via ATR-IR spectroscopy. After approximately 3 h, the isocyanate signal in the IR spectra remained constant. In the second step of the reaction, 1.15 g of HEMA (M=130.14 g/mol, 0.0089 mol, 2 eq) and 15 mg of butylhydroxytoluene (300 ppm) were added and the reaction was continued until the signal of the NCO group had completely disappeared in the IR spectra (approx. 1 h). Afterwards, water was added to precipitate the colorless solid product TNM1 which was washed with deionized water and dried in vacuo. $^1$H NMR ($CDCl_3$, 200 MHz, δ, ppm): 6.10 (d, 2H, 2x>C═$CH_2$, cis), 5.54 (d, 2H, 2x>C═$CH_2$, trans), 4.69 (s, 22H, 22x—NH—), 4.27 (m, 8H, 2x—O—$CH_2$—$CH_2$—O—), 4.15-3.77 (m, 264H, O═C—O—$CH_2$—), 3.12 (q, 44H, 22xOCO—NH—$CH_2$—), 1.81 (s, 6H, 2x$CH_2$═C—$CH_3$), 1.75-0.98 (m, 692H, >$CH_2$, —$CH_2$—, >CH—). $IR_{neat}$ ($cm^{-1}$): 3333 ($\nu_{N—H}$), 2930 ($\nu_{C—H}$), 2858 ($\nu_{C—H}$), 1717 ($\nu_{C═O}$), 1684 ($\nu_{C═O}$), 1637 ($\nu_{C═C}$), 1530 ($\delta_{NH}$), 1454 ($\delta_{CH3}$), 1318 ($\delta_{CH2}$), 1243 ($\nu_{C—O}$), 1167 ($\nu_{C—N}$), 1131 ($\nu_{C—O}$), 1045 ($\delta_{>CH2}$), 951 ($\gamma_{C═C}$). GPC: $M_n$=13,170 Da; PDI=2.27

Synthesis Example 6: Synthesis of Toughness Modifier TNM2

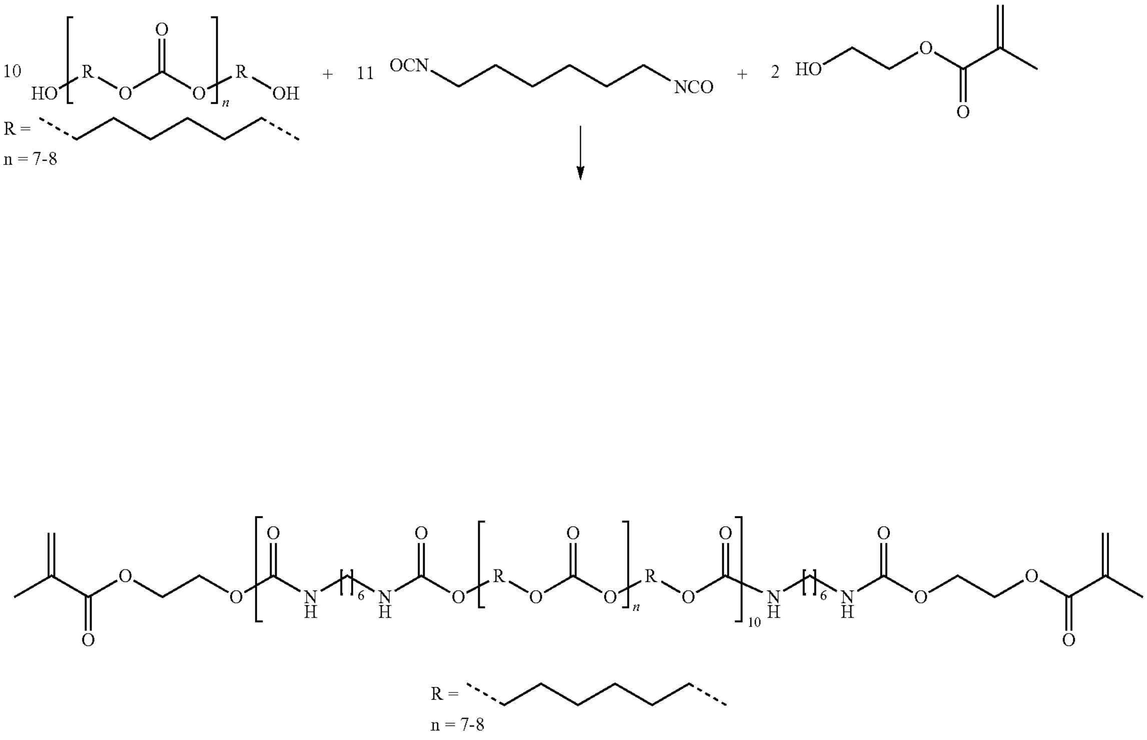

TNM2

The preparation was similar to Synthesis Example 3, using UBE Eternacoll UH-100 polycarbonate diol ($M_{avg}$=1000 g/mol, 10 eq) was used as reactant. The white solid product TNM2 was precipitated with ethanol and dried in vacuo. $^1$H NMR ($CDCl_3$, 200 MHz, δ, ppm): 6.11 (d, 2H, 2x>C═$CH_2$, cis), 5.56 (d, 2H, 2x>C═$CH_2$, trans), 4.69 (s, 22H, 22x—NH—), 4.27 (m, 8H, 2x—O—$CH_2$—$CH_2$—O—), 4.16-3.96 (m, 284H, O═C—O—$CH_2$—), 3.12 (q, 44H, 22xOCO—NH—$CH_2$—), 1.92 (s, 6H, 2x$CH_2$═C—$CH_3$), 1.75-1.21 (m, 656H, —$CH_2$—). $IR_{neat}$ ($cm^{-1}$): 3322 ($\nu_{N—H}$), 2936 ($\nu_{C—H}$), 2862 ($\nu_{C—H}$), 1717 ($\nu_{C═O}$), 1683 ($\nu_{C═O}$), 1638 ($\nu_{C═C}$), 1537 ($\delta_{NH}$), 1455 ($\delta_{CH3}$), 1319 ($\delta_{CH2}$), 1245 ($\nu_{C—O}$), 1167 ($\nu_{C—N}$), 1139 ($\nu_{C—O}$), 1044 ($\delta_{>CH2}$), 954 ($\gamma_{C═C}$). GPC: $M_n$=14,899 Da; PDI=2.28

Synthesis Example 7: Synthesis of Toughness Modifier TNM3

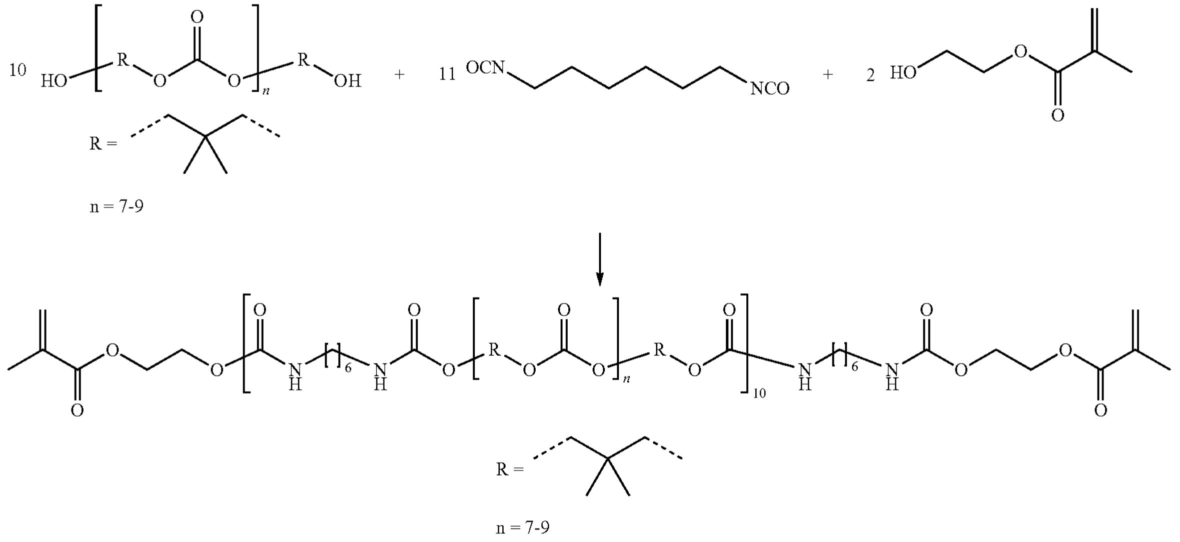

TNM3

The preparation was similar to Synthesis Example 3, using BENEBiOL NL1050B from Mitsubishi Chemical ($M_{avg}$=1000 g/mol, 10 eq) as the polycarbonate diol. At the end of the synthesis, the solvent was distilled off and the colorless viscous liquid TNM3 was used without further purification. $^1$H NMR ($CDCl_3$, 200 MHz, δ, ppm): 6.07 (d, 2H, 2x>C═$CH_2$, cis), 5.50 (d, 2H, 2x>C═$CH_2$, trans), 4.74 (s, 22H, 22x—NH—), 4.26 (m, 8H, 2x—O—$CH_2$—$CH_2$—O—), 4.14 (m, 184H, O═C—O—$CH_2$—), 3.93 (m, 156H, O═C—O—$CH_2$—), 3.13 (m, 44H, 22xOCO—NH—$CH_2$—), 1.88 (s, 6H, 2x$CH_2$═C—$CH_3$), 1.75 (s, 260H, —($CH_2$), 1.51-1.20 (m, 88H, NH—CH2—($CH_2$)4-$CH_2$—NH), 0.98 (m, 250H>C—($CH_3$)$_2$). $IR_{neat}$ ($cm^{-1}$): 3384 ($\nu_{N—H}$), 2961 ($\nu_{C—H}$), 2936 ($\nu_{C—H}$), 2879 ($\nu_{C—H}$), 1742 ($\nu_{C═O}$), 1716 ($\nu_{C═O}$), 1637 ($\nu_{C═C}$), 1524 ($\delta_{NH}$), 1455 ($\delta_{CH3}$), 1403 ($\delta_{CH2}$), 1319 ($\delta_{CH2}$), 1235 ($\nu_{C—O}$), 1168 ($\nu_{C—N}$), 1139 ($\nu_{C—O}$), 1027 ($\delta_{>CH2}$), 944 ($\gamma_{C═C}$). GPC: $M_n$=14,932 Da; PDI=2.13

Synthesis Example 8: Synthesis of Toughness Modifier TNM4

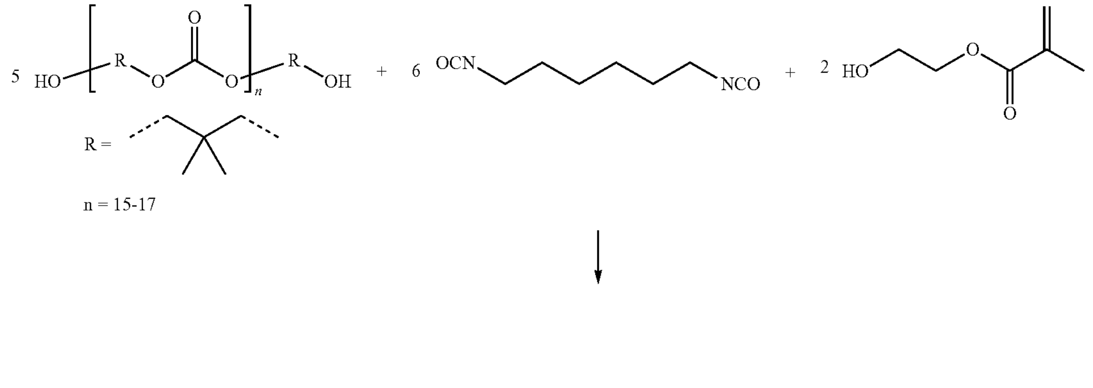

-continued

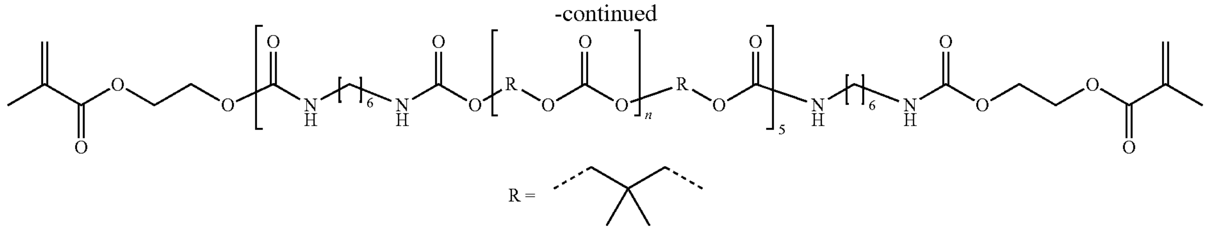

n = 15-17

TNM4

The preparation was similar to Synthesis Example 3, using BENEBiOL NL2050B from Mitsubishi Chemical ($M_{avg}$=2000 g/mol, 5 eq) and HDI (M=168.2 g/mol, 6 eq) were used in a 5/6 ratio to obtain a final molecular weight of ~15,000 g/mol. Finally, the solvent was distilled off and the colorless viscous liquid TNM4 was used without further purification. $^1$H NMR ($CDCl_3$, 200 MHz, δ, ppm): 6.09 (d, 2H, 2x>C═$CH_2$, cis), 5.54 (d, 2H, 2x>C═$CH_2$, trans), 4.66 (s, 12H, 12x—NH—), 4.25 (m, 8H, 2x—O—$CH_2$—$CH_2$—O—), 4.09 (m, 192H, O═C—O—$CH_2$—), 3.89 (m, 164H, O═C—O—$CH_2$—), 3.10 (m, 24H, 12xOCO—NH—$CH_2$—), 1.88 (s, 6H, 2x$CH_2$═C—$CH_3$), 1.71 (s, 250H, —($CH_2$)—), 1.51-1.20 (m, 48H, NH—$CH_2$—($CH_2$)4-$CH_2$—NH), 0.99 (m, 240H>C—($CH_3$)$_2$). $IR_{neat}$ ($cm^{-1}$): 3372 ($\nu_{N-H}$), 2960 ($\nu_{C-H}$), 2912 ($\nu_{C-H}$), 2880 ($\nu_{C-H}$), 1730 ($\nu_{C=O}$), 1716 ($\nu_{C=O}$), 1635 ($\nu_{C=C}$), 1520 ($\delta_{NH}$), 1468 ($\delta_{CH3}$), 1399 ($\delta_{CH2}$), 1305 ($\delta_{CH2}$), 1242 ($\nu_{C-O}$), 1173 ($\nu_{C-N}$), 1148 ($\nu_{C-O}$), 1025 ($\delta_{>CH2}$), 952 (γC═C). GPC: $M_n$=12,940 Da; PDI=2.04

Synthesis Example 9: Synthesis of Toughness Modifier TNM5

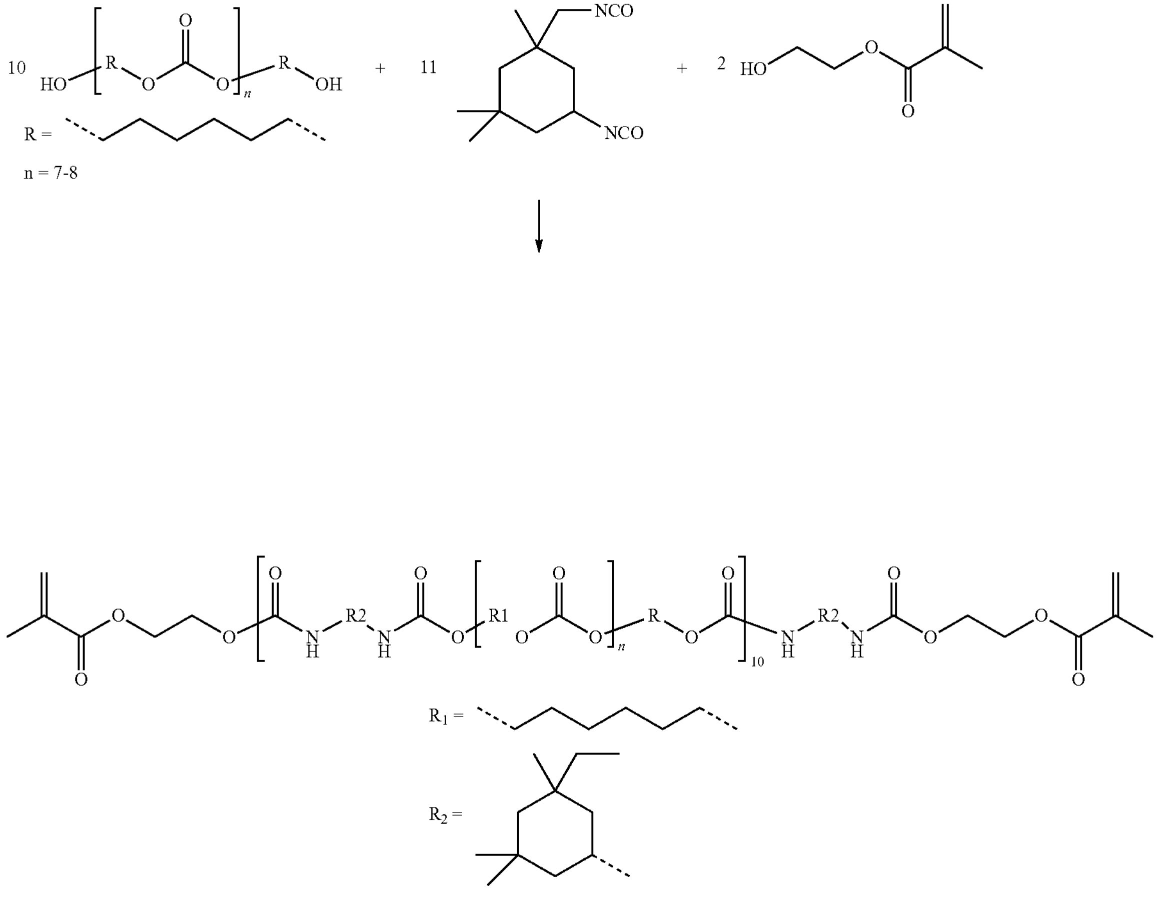

n = 7-8

TNM5

The preparation was similar to Synthesis Example 3, using BENEBiOL NL1050B from Mitsubishi Chemical ($M_{avg}$=1000 g/mol, 10 eq) as the polycarbonate diol and isophorone diisocyanate (M=222.3 g/mol, 11 eq) in a 10/11 ratio to obtain a final molecular weight of ~15,000 g/mol. The product TNM5 was precipitated and washed with deionized water and dried in vacuo. $^1$H NMR ($CDCl_3$, 200 MHz, δ, ppm): 6.15 (d, 2H, 2x>C═$CH_2$, cis), 5.60 (d, 2H, 2x>C═$CH_2$, trans), 4.82 (s, 11H, 11x>CH—NH—), 4.58 (s, 11H, 11x—$CH_2$—NH—), 4.32 (t, 8H, 2x—O—$CH_2$—$CH_2$—O—), 4.24-3.86 (m, 250H, >CH—NH, —$CH_2$—O), 3.28 (s, 6H, —$CH_2$—NH—), 2.95 (m, 16H, —$CH_2$—NH—), 1.97 (s, 6H, 2x$CH_2$═C—$CH_3$), 1.9-0.8 (t, 645H, >$CH_2$, >C—$CH_3$, >CH—). $IR_{neat}$ ($cm^{-1}$): 3377 ($\nu_{N—H}$), 2957 ($\nu_{C—H}$), 2925 ($\nu_{C—H}$), 2875 ($\nu_{C—H}$), 1742 ($\nu_{C═O}$), 1717 ($\nu_{C═O}$), 1637 ($\nu_{C═C}$), 1524 ($\delta_{NH}$), 1455 ($\delta_{CH3}$), 1403 ($\delta_{CH2}$), 1319 ($\delta_{CH2}$), 1234 ($\nu_{C—O}$), 1168 ($\nu_{C—N}$), 1131 ($\nu_{C—O}$), 1027 ($\delta_{>CH2}$), 944 (γC═C). GPC: $M_n$=13,901 Da; PDI=2.15

Synthesis Example 10: Synthesis of Toughness Modifier TNM6

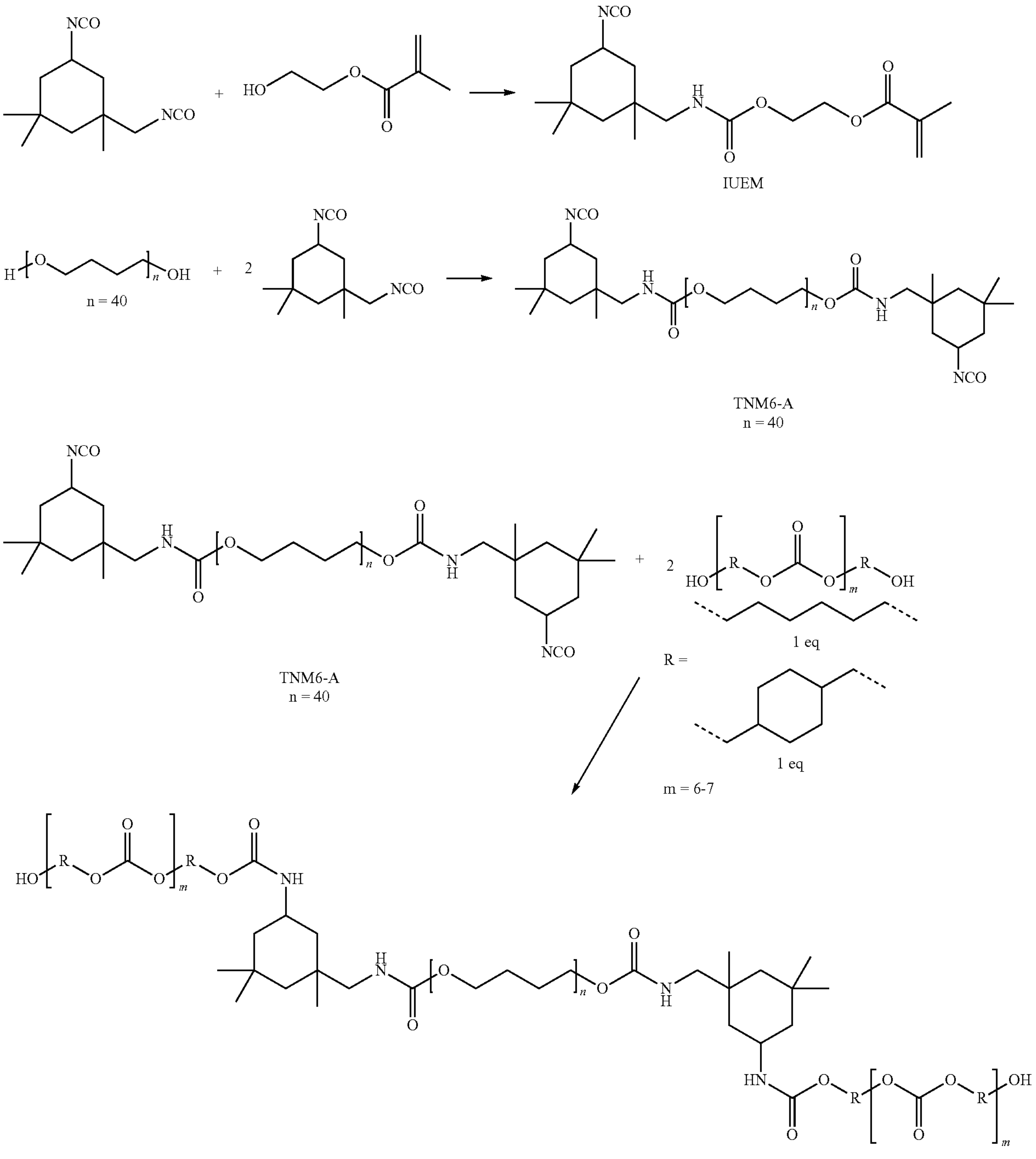

IUEM

TNM6-A n = 40

TNM6-A n = 40

TNM6-B

-continued

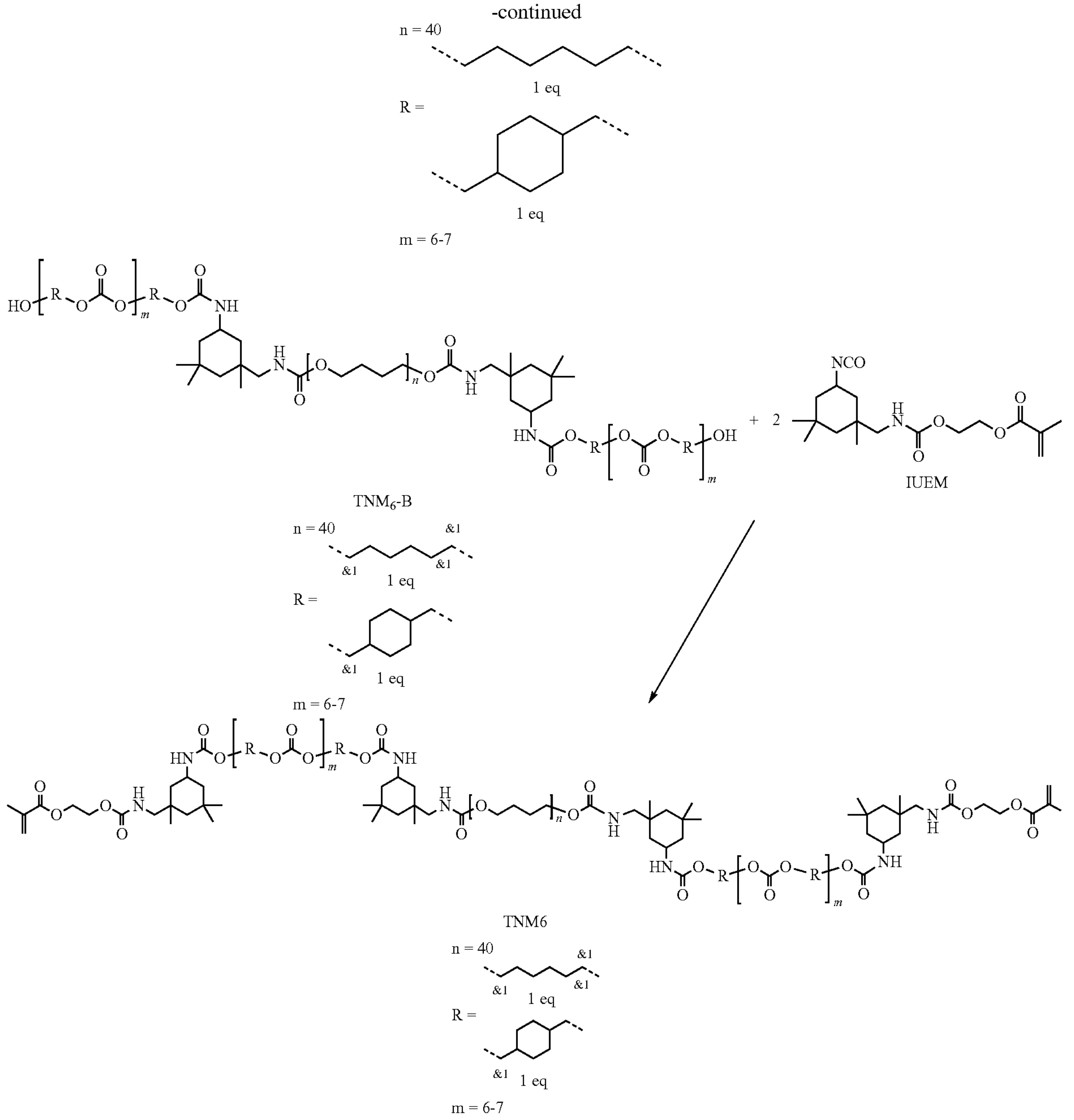

$TNM_6$-B

IUEM

TNM6

For this preparation, 2900 Da polytetrahydrofuran, isophorone diisocyanate, UBE Eternacoll UM-90 (1/1) mixed cyclohexane carbonate-hexamethylene carbonate diol and 2-hydroxyethylmethacrylate were used. First, the isocyanoisophorone-urethane ethylmethacrylate compound, IUEM, was synthesized by mixing 2.6 g of 2-hydroxyethyl methacrylate (M=130.14 g/mol, 0.02 mol) and 4.45 g of isophorone diisocyanate (M=222.3 g/mol, 0.02 mol) at 40° C. for 2 h. The reaction was monitored by using ATR-IR spectroscopy and $^1$H NMR.

The TNM6-A precursor was synthesized by reacting 29 g of polytetrahydrofuran ($M_{avg}$=2900 g/mol, 0.01 mol) with 4.45 g of isophorone diisocyanate (M=222.3 g/mol, 0.02 mol) at 90° C. under argon atmosphere. The reaction was monitored using ATR-IR spectroscopy and was completed after approximately 3 h.

After TNM6-A was formed, 18 g of UBE Eternacoll UM-90 (1/1) polycarbonate diol ($M_{avg}$=900 g/mol, 0.02 mol) in 40 ml of distilled chloroform were added to the mixture at 25° C., and then the mixture was heated up to 60° C. and 29 mg of dibutyltin dilaurate (500 ppm) was added as a catalyst. The reaction solution was stirred and the formation of TNM6-B was evaluated by the disappearance of the isocyanate peaks in the ATR-IR spectra (after approx. 3 h). When all the isocyanate had reacted with the polycarbonate diol, 7.05 g of IUEM (2 eq) were added to the mixture and reacted at 40° C. Completeness was determined by means of ATR-IR spectra. After evaporation of the chloroform, 29 mg BHT inhibitor (500 ppm) were added and the colorless viscous liquid product TNM6 was dried in vacuo. $^1$H NMR ($CDCl_3$, 200 MHz, δ, ppm): 6.09 (d, 2H, 2x>C═$CH_2$, cis), 5.55 (d, 2H, 2x>C═$CH_2$, trans), 4.78 (s, 4H, 4×CH—NH—), 4.52 (s, 4H, 4×$CH_2$—NH—), 4.27 (m, 8H, 2×—O—$CH_2$—$CH_2$—O—), 4.08-3.73 (m, 54H, O═CO—$CH_2$—), 3.36 (s, 156H, —$CH_2$—O—$CH_2$—), 3.19 (s, 4H, 4×OCO—NH—CH<), 2.86 (s, 8H, 4×OCO—NH—$CH_2$—), 1.90 (s, 6H, 2×$CH_2$═C—$CH_3$), 1.79-0.68 (m, 308H, >$CH_2$, —$CH_2$—, >CH—, >CH—$CH_3$). $IR_{neat}$ ($cm^{-1}$): 3329 ($\nu_{N-H}$), 2942 ($\nu_{C-H}$), 2855 ($\nu_{C-H}$), 2796 ($\nu_{C-H}$), 1743 ($\nu_{C=O}$), 1720 ($\nu_{C=O}$), 1639 ($\nu_{C=C}$), 1529 ($\delta_{NH}$), 1449 ($\delta_{CH3}$), 1366 ($\delta_{CH2}$), 1246 ($\nu_{C-O}$), 1104 ($\nu_{C-O}$), 1045 ($\delta_{>CH2}$), 955 (γC═C). GPC: $M_n$: 6,434 Da; PDI=2.79

Synthesis Example 11: Synthesis of Reactive Diluent RD1

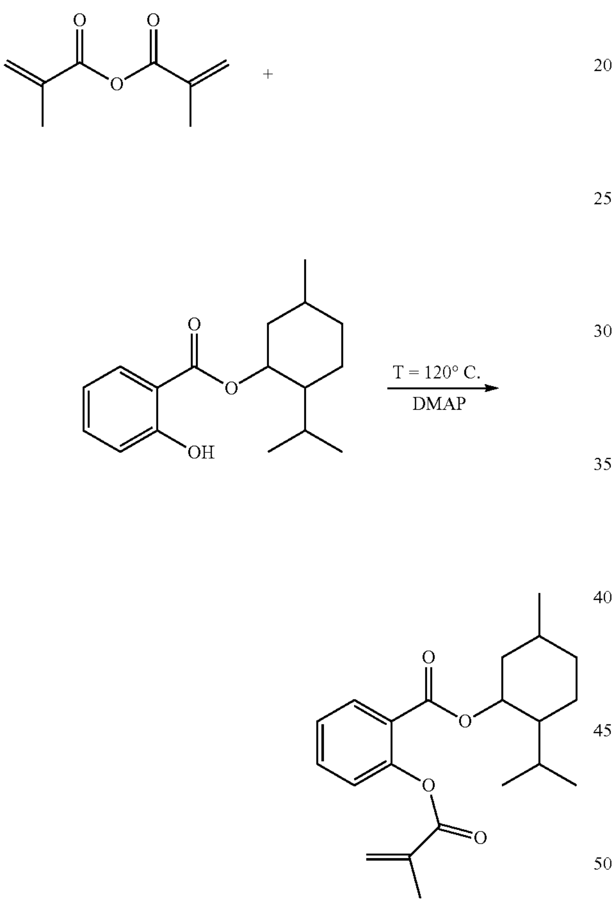

RD1

5.55 g of menthyl salicylate (20 mmol) were placed in a 50 mL round bottom flask together with 5.27 g methacrylic anhydride (34 mmol) and 0.12 g 4-dimethylaminopyridine (1 mmol, DMAP). The flask was purged with Ar, heated to 120° C. (oil bath temperature) and stirred for 24 h. The conversion was monitored by means of TLC. At completion, residual methacrylic anhydride and by-products were distilled off in vacuo. Then, the crude product was purified by column chromatography (PE:EE=6:1) to give 5.67 g (83%) of RD1, menthyl salicylate methacrylate, which was stabilized using 250 ppm 3,5-di-tert-butyl-4-hydroxytoluene (BHT). $^1H$ NMR ($CDCl_3$, 200 MHz, δ, ppm): 8.01 (d, 1H; Ar—H), 7.52 (t, 1H; Ar—H), 7.29 (t, 1H; Ar—H), 7.29 (d, 1H; Ar—H), 6.39 (d, 1H; ═$CH_2$), 5.78 (d, 1H; ═$CH_2$), 4.87 (q, 1H; COO—CH), 2.08 (s, 3H; $CH_2$═$CH_2$—$CH_3$), 1.93-1.00 (m, 9H) 0.84 (d, 6H; $(CH_2)_2$—CH—$(CH_3)_2$), 0.75 (d, 3H; $(CH_2)_2$—CH—$CH_3$). APT-NMR (CDCl3, 50.3 MHz, δ, ppm): 165.7 (C4, CO), 164.2 (C4, CO), 150.6 (C4), 135.7 (C4), 133.4 (C1), 131.7 (C1), 128.9 (C4), 127.4 (C2), 125.9 (C1), 123.8 (C1), 74.9 (C1), 47.1 (C1), 40.8 (C2), 34.3 (C2), 31.4 (C1), 26.1 (C1), 23.3 (C2), 22.0 (C3), 20.8 (C3), 18.4 (C3), 16.1 (C3).

Example 1: Preparation of Curable Compositions

Curable compositions according to the present disclosure were prepared by mixing the inventive Components A to C, optionally by heating them and optionally by admixing further components selected from another diluent and core-shell particles. The latter serve as additional toughness modifiers, i.e. for further increasing the toughness of the polymerizate obtained from the particular composition. More specifically, in compositions (1) to (15), the following components were mixed in the ranges given in Table 1 below.

TABLE 1

Compositions of curable compositions (1) to (15)

| Component | Compositional ranges (wt %) |
|---|---|
| Component A: (first) glass transition temperature modifier, TGM | 20-50 |
| Component B: (first) toughness modifier, TNM | 25-50 |
| Component C: (first) reactive diluent | 10-40 |
| Component A: second glass transition temperature modifier, TGM | 0-30 |
| Component B: second toughness modifier, TNM | 0-50 |
| Component C: second reactive diluent | 0-15 |
| Additional component: core-shell particles | 0-5 |

The compositions thus obtained were heated to a processing temperature of 90° C. or 110° C., respectively, and their shear viscosities at these temperatures were determined using a modular compact rheometer MCR 300 from Anton Paar.

Figure 4:
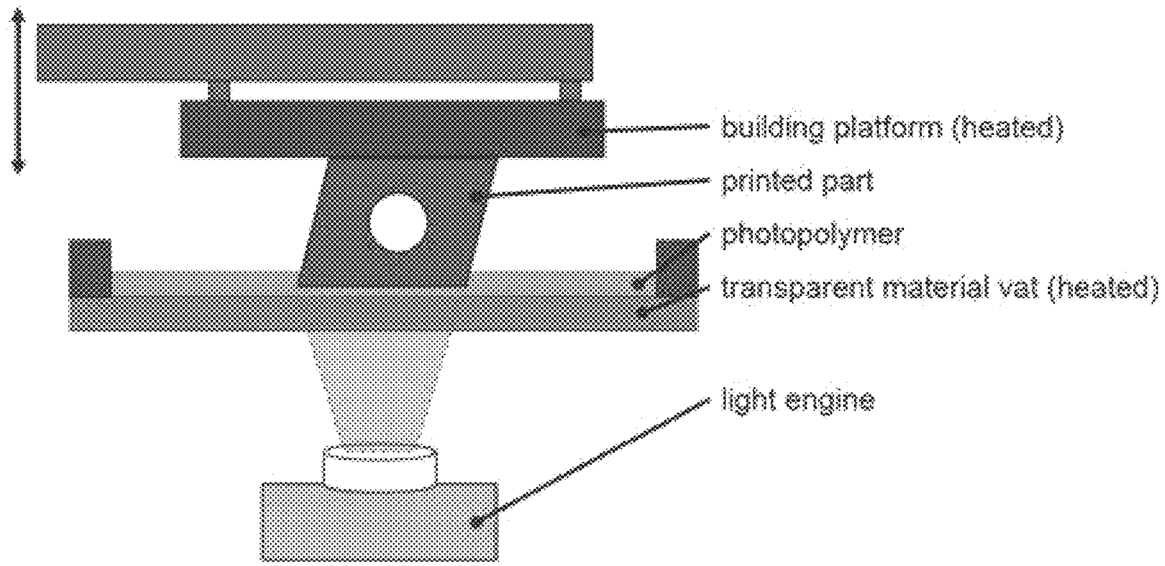
FIG. 4 shows a schematic configuration of a high temperature additive manufacturing device used for curing a curable compositions of the present disclosure by means of a 3D printing process.
Figure 5A:
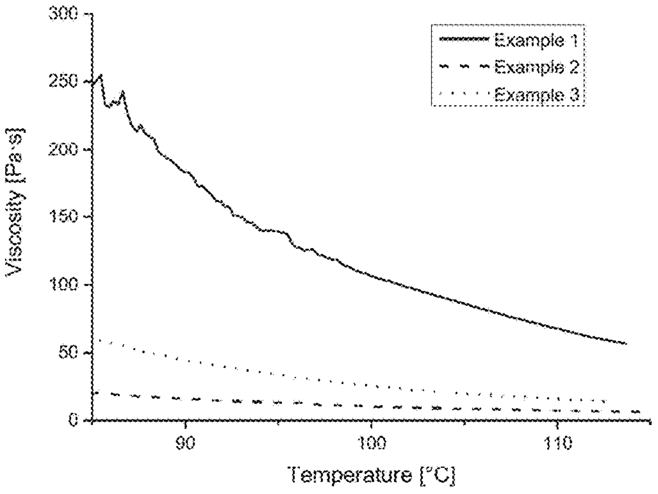
FIG. 5*a*, FIG. 5*b*, FIG. 5*c*, FIG. 5*d*, FIG. 5*e*, and FIG. 5*f* show the results obtained by measuring the viscosities (Pa·s) of curable compositions (1) to (10) at varying temperatures (° C.).
Figure 5B:
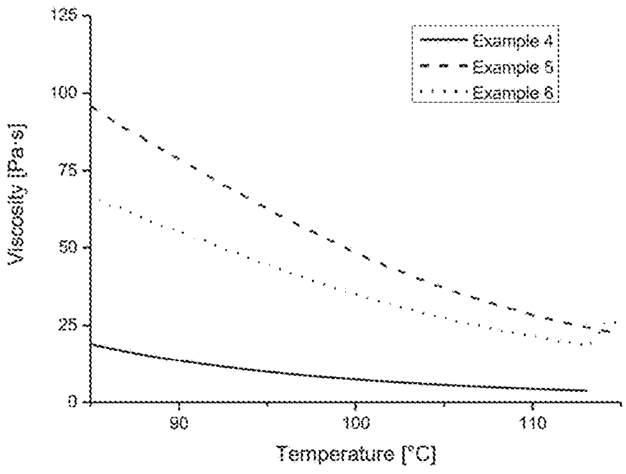
Figure 5C:
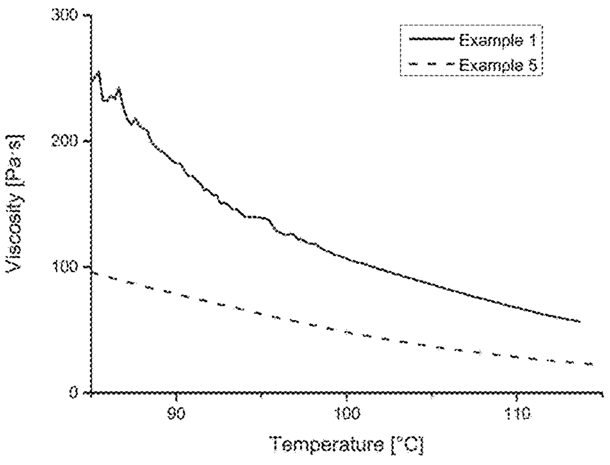
Figure 5D:
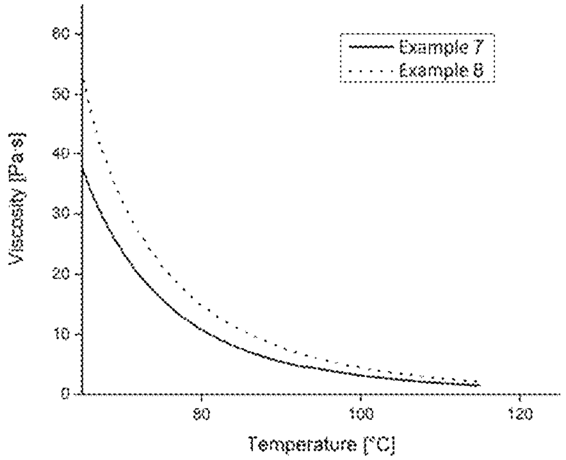
Figure 5E:
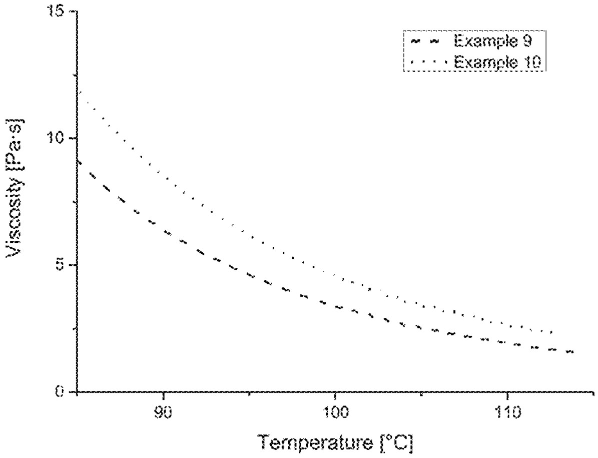
Figure 5F:
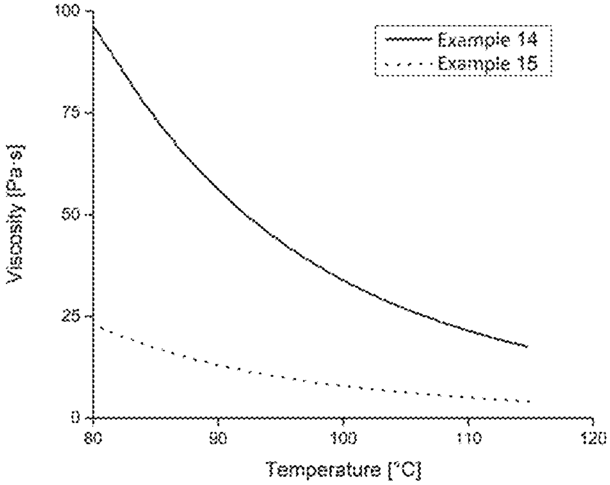
Figure 6A:
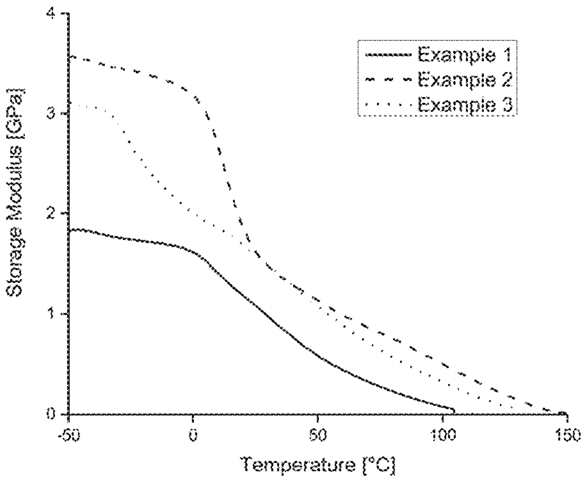
FIG. 6*a*, FIG. 6*b*, FIG. 6*c*, FIG. 6*d*, FIG. 6*e*, and FIG. 6*f* show the results obtained by measuring the storage moduli (GPa) of crosslinked polymers resulting from photopolymerizing curable compositions (1) to (10) at varying temperatures (° C.).
Figure 6B:
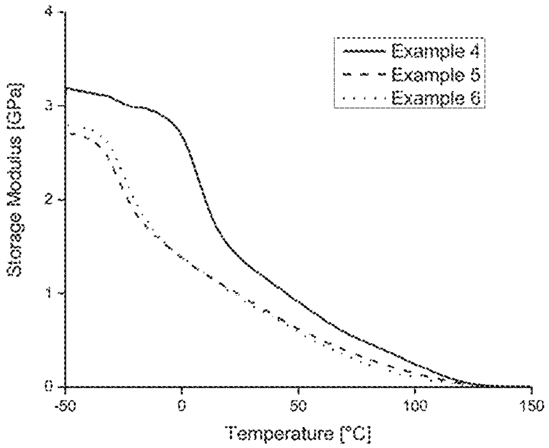
Figure 6C:
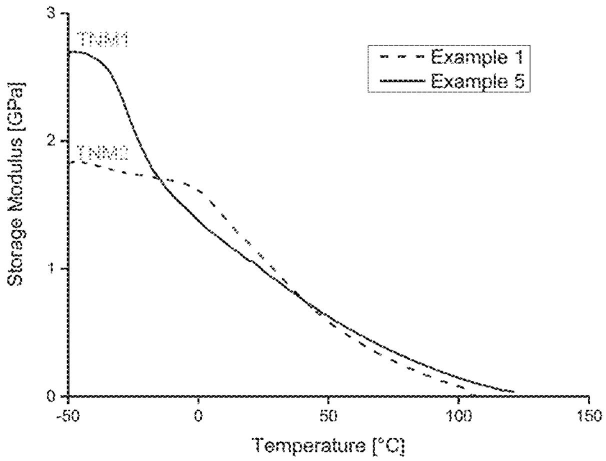
Figure 6D:
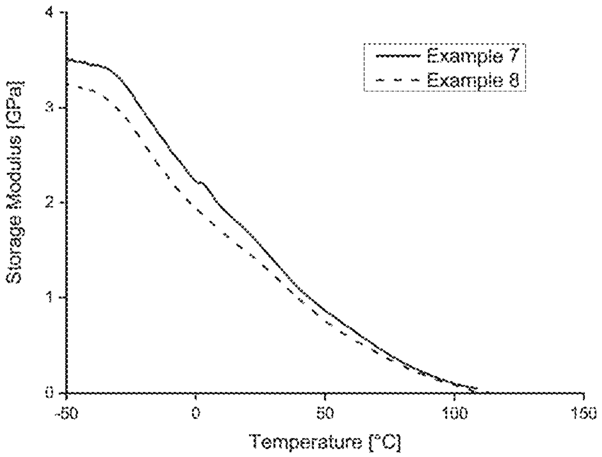
Figure 6E:
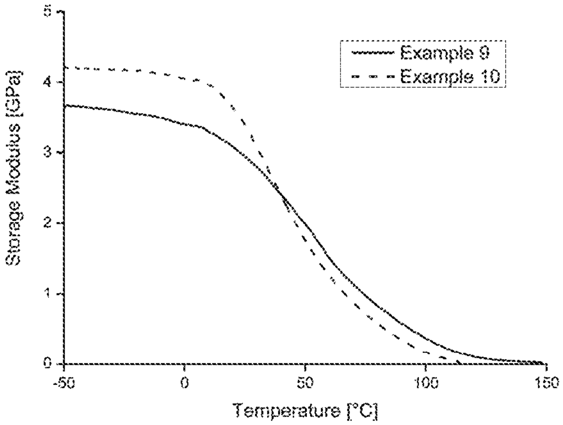
Figure 6F:
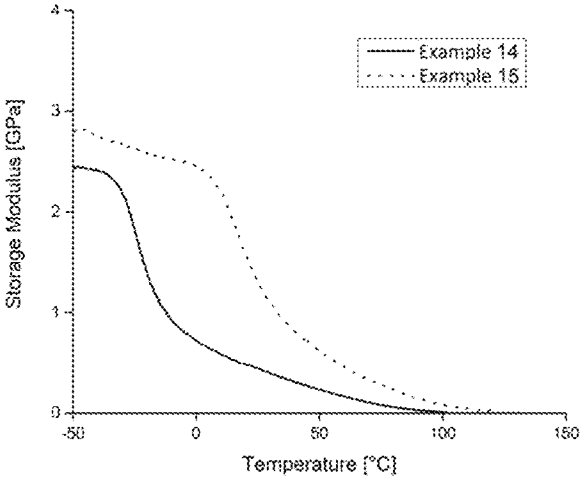
Figure 7A:
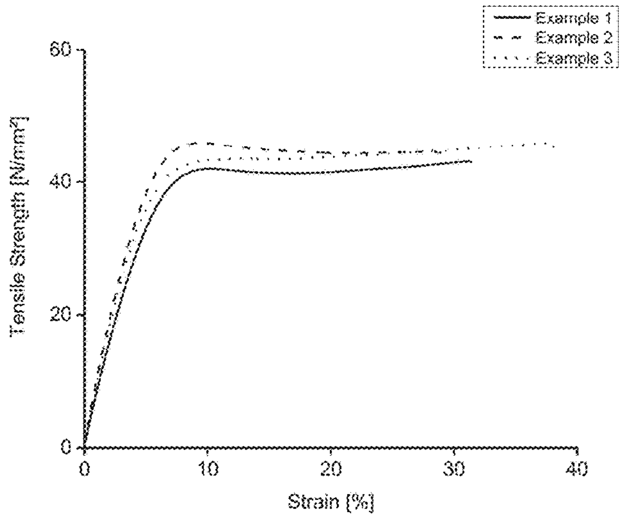
FIG. 7*a*, FIG. 7*b*, FIG. 7*c*, FIG. 7*d*, FIG. 7*e*, and FIG. 7*f* show the results obtained by measuring the tensile strengths ($N/mm^2$) of crosslinked polymers resulting from photopolymerizing curable compositions (1) to (10) at varying strains (%).
Figure 7B:
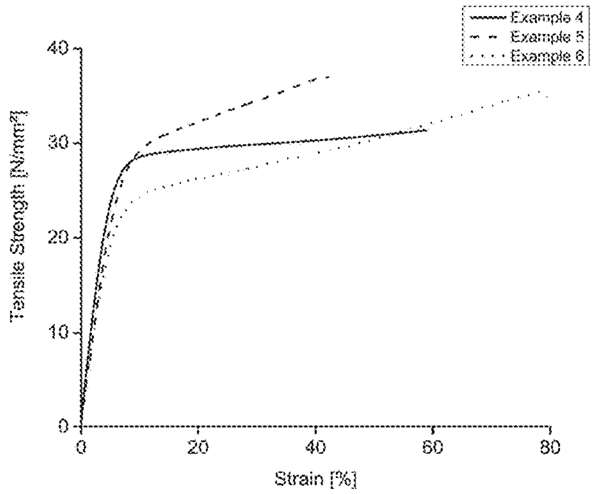
Figure 7C:
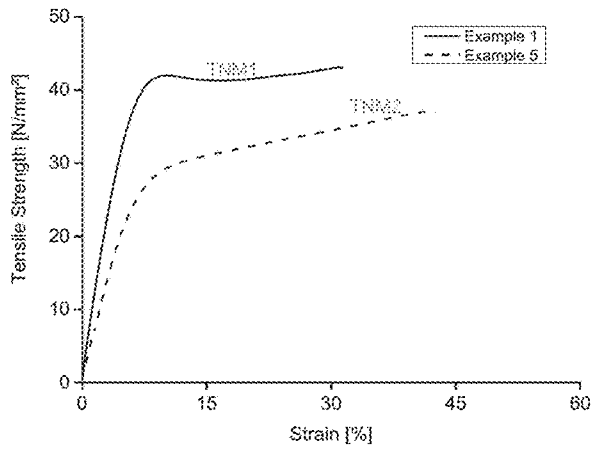
Figure 7D:
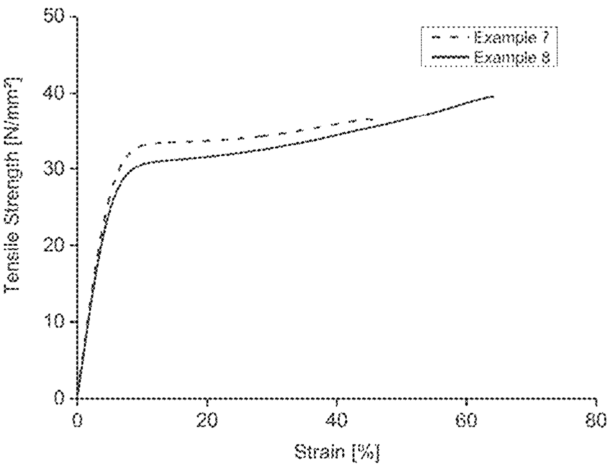
Figure 7E:
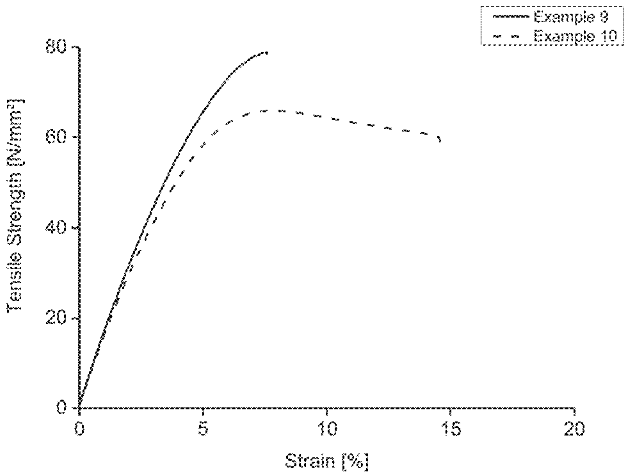
Figure 7F:
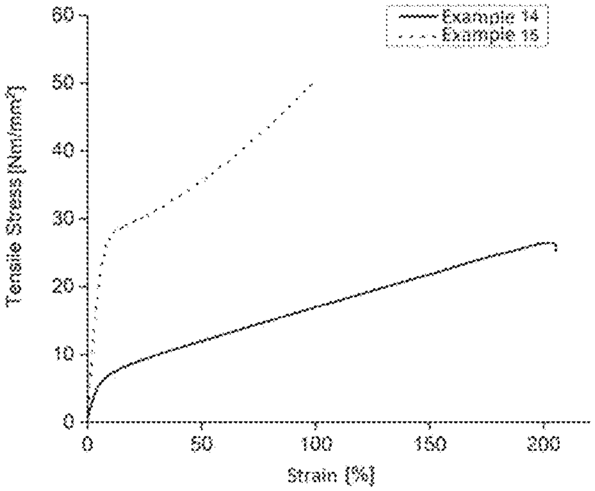

Subsequently, the compositions were each cured in a 3D printing process using a Hot Lithography apparatus prototype from Cubicure (Vienna, Austria), which was substantially configured as schematically shown in FIG. 4. To this end, a curable composition according to the first aspect of the present disclosure, as defined in the following examples, was filled into the transparent material vat of the apparatus shown in FIG. 4, which vat was heated at 90-110° C. The building platform was heated at 90-110° C., too, and lowered to establish holohedral contact with the upper surface of the curable composition. By irradiating the composition with 375 nm UV radiation using a diode laser from Soliton, having an output power of 70 mW, which was controlled to trace a predefined prototype design, and alternately raising the building platform, the composition was cured layer by layer by a photopolymerization process according to the second aspect of the disclosure, resulting in a crosslinked polymer according to the third aspect of the present disclosure.

Example 2: Preparation of Curable Compositions (1) to (3)

The following components were mixed in the proportions shown in Tables 2 to 4 to give curable compositions (1) to (3):

TABLE 2

| Composition of (1) | | |
|---|---|---|
| Curable composition 1 | Composition (wt %) | Component |
| Component A: glass transition modifier | 42.5 | TGM1 |
| Component B: toughness modifier | 50 | TNM1 |
| Component C: reactive diluent | 7.5 | RD2* |

*RD2: triethylene glycol dimethacrylate (TEGDMA), purchased from Sigma Aldrich

TABLE 3

| Composition of (2) | | |
|---|---|---|
| Curable composition 2 | Composition (wt %) | Component |
| Component A: glass transition modifier | 34 | TGM1 |
| Component B: toughness modifier | 30 | TNM1 |
| Component C: reactive diluent 1 | 30 | RD1 |
| Component C: reactive diluent 2 | 6 | RD2 |

TABLE 4

| Composition of (3) | | |
|---|---|---|
| Curable composition 3 | Composition (wt %) | Component |
| Component A: glass transition modifier | 39 | TGM1 |
| Component B: toughness modifier | 38 | TNM2 |
| Component C: reactive diluent 1 | 15 | RD1 |
| Component C: reactive diluent 2 | 7 | RD2 |

The following Table 5 lists the viscosities of curable compositions (1) to (3) and most relevant properties of the crosslinked polymers obtained therefrom using Hot Lithography as well as the desirable ranges for each property.

The respective property values were determined using the following methods:

- shear viscosity: rheometer MCR 301 from Anton Paar, rheological measurement in rotation mode (PP-25, 50 s−1, 50-115° C., 3° C./min);
- tensile properties: tensile testing machine RetroLine Z050 from Zwick Roell;
- thermo mechanical properties: DMA 2980 from TA Instruments, test method: 3-point bending (from −50° C. to 110° C., 3° C./min, 1 Hz, 10 μm amplitude, static force 0.5 N);
- stress-relaxation properties: RSA-G2 from TA Instruments, test method: 3-point bending, 2% strain);
- tensile strength at yield: according to ISO 527-2 5B;
- elongation at yield: according to ISO 527-2 5B;
- elongation at break: according to ISO 527-2 5B, optionally at a crosshead speed of 5 mm/min;
- tensile modulus: according to ISO 527-2 5B;
- $T_g$ (° C.): tan δ peak;
- storage modulus at 37° C. (MPa): supra;
- stress relaxation at 37° C. and 100% RH (%): remaining load after 2 h; and
- stress relaxation at 37° C. and 100% RH (MPa): remaining load after 2 h.

TABLE 5

| Results of Compositions (1) to (3) | | | | |
|---|---|---|---|---|
| Property | Desirable Range | (1) | (2) | (3) |
| Viscosity of formulation | 1 < x < 70 Pa · s at 90° C. at 110° C. | 182 Pa · s 68 Pa · s | 16.0 Pa · s 7.5 Pa · s | 45 Pa · s 16 Pa · s |
| | | Polymer 1 | Polymer 2 | Polymer 3 |
| Tensile Strength at Yield (MPa) | >25 MPa, preferably > 40 MPa | 43.1 | 46.0 | 43.3 |
| Elongation at Yield (%) | >5% | 6 | 6 | 7 |
| Elongation at Break (%) | >20%, preferably > 30% | 31.1 | 30 | 35.2 |
| Tensile Modulus (MPa) | >800 MPa, preferably > 1000 MPa | 867 | 1050 | 943 |
| $T_g$ (° C.) | >90° C., preferably > 100° C. | >120* | 147 | 134 |
| Storage Modulus (MPa) | >750 MPa, preferably > 1000 MPa | 830 | 1330 | 1350 |
| Stress Relaxation (% of initial load) | >20%, preferably > 35% | 35.6 | 40.4 | 37.3 |
| Stress Relaxation (MPa) | >2 MPa, preferably ≥ 3 MPa | 3.9 | 10.5 | 7.6 |

*approximated (sample broke at a temperature above 105° C.)

Table 5 shows that the 3D-printed photopolymers obtained from curable compositions (1) to (3) exhibited very good properties, almost all of which fell into the desirable ranges and the majority of which even fell into the preferable ranges. Particularly, each of the three polymers showed a high tensile strength >40 MPa, a high $T_g$>120° C., and a high elongation at break >30%. The toughness modifiers TNM1 and TNM2 provided the best strengthening effects of all tested toughness modifiers, resulting in high elongations at break while maintaining high tensile strengths and $T_g$ values. Due to the fairly high viscosities of TNM1 and TNM2 (Mw>13 kDa), reactive diluents (<10 wt %) were added to the formulations to obtain processable formulations. By comparing (1) and (2), it can be seen that higher amounts of reactive diluents yield better processable formulations (having viscosities <20 Pa·s at 90° C.), while maintaining the required mechanical properties.

Example 3: Preparation of Curable Compositions (4) to (6)

The following components were mixed in the proportions shown in Tables 6 to 8 to give curable compositions (4) to (6):

TABLE 6

Composition of (4)

| Curable composition 4 | Composition (wt %) | Component |
|---|---|---|
| Component A: glass transition modifier | 24.5 | TGM1 |
| Component B: toughness modifier | 30 | TNM1 |
| Component C: reactive diluent 1 | 40 | RD1 |
| Component C: reactive diluent 2 | 4.5 | RD2 |

TABLE 7

Composition of (5)

| Curable composition 5 | Composition (wt %) | Component |
|---|---|---|
| Component A: glass transition modifier | 42.5 | TGM1 |
| Component B: toughness modifier | 50 | TNM2 |
| Component C: reactive diluent | 7.5 | RD2 |

TABLE 8

Composition of (6)

| Curable composition 6 | Composition (wt %) | Component |
|---|---|---|
| Component A: glass transition modifier | 30.5 | TGM1 |
| Component B: toughness modifier | 50 | TNM2 |
| Component C: reactive diluent 1 | 15 | RD1 |
| Component C: reactive diluent 2 | 4.5 | RD2 |

The following Table 9 lists the viscosities of curable compositions (4) to (6) and most relevant properties of the crosslinked polymers obtained therefrom using Hot Lithography as well as the desirable ranges for each property.

TABLE 9

Results of Compositions (4) to (6)

| Property | Desirable Range | (4) | (5) | (6) |
|---|---|---|---|---|
| Viscosity of formulation | 1 < x < 70 Pa · s at 90° C. | 13.4 Pa · s | 78.6 Pa · s | 55.6 Pa · s |
| | at 110° C. | 4.3 Pa · s | 28.4 Pa · s | 21.4 Pa · s |
| | | Polymer 4 | Polymer 5 | Polymer 6 |
| Tensile Strength at Yield (MPa) | >25 MPa, preferably > 40 MPa | 26.4 | 35.5 | 36.3 |
| Elongation at Yield (%) | >5% | 6 | 7 | 6 |
| Elongation at Break (%) | >20%, peferably > 30% | 58.7 | 42.6 | 81.6 |
| Tensile Modulus (MPa) | >800 MPa, preferably > 1000 MPa | 601 | 519 | 481 |
| $T_g$ (° C.) | >90° C., preferably > 100° C. | 131 | 122 | 127 |
| Storage Modulus (MPa) | >750 MPa, preferably > 1000 MPa | 1140 | 805 | 780 |
| Stress Relaxation (% of initial load) | >20%, preferably > 35% | 22.3 | 24.1 | 24.7 |
| Stress Relaxation (MPa) | >2 MPa, preferably ≥ 3 MPa | 3.6 | 2.3 | 2.8 |

Table 9 shows that the photopolymers obtained from curable compositions (4) to (6) yielded desirable values for tensile strength, elongation at yield, storage modulus, and stress relaxation, lower values for tensile modulus, and very good results for elongation at break and $T_g$. The polymers obtained exhibited higher elongations at break when TNM2 was used instead of TNM1, which is likely due to the more flexible aliphatic structures compared to the more rigid cycloaliphatic moieties in TNM1 (cf. compositions (1) and (5)). Moreover, higher amounts of reactive diluents resulted in increased elongations at break, which can be seen from a comparison between compositions (2) and (4). Both strategies resulted in lower tensile strengths and moduli. However, high amounts of TNM2 (Compositions (5) and (6)) complicated the processing of the resins, possibly due to its higher viscosity.

Example 4: Preparation of Curable Compositions (7) and (8)

The following components were mixed in the proportions shown in Tables 10 and 11 to give curable compositions (7) and (8):

TABLE 10

| Composition of (7) | | |
|---|---|---|
| Curable composition 7 | Composition (wt %) | Component |
| Component A: glass transition modifier | 30 | TGM1 |
| Component B: toughness modifier | 40 | TNM2 |
| Component C: reactive diluent | 30 | RD1 |

TABLE 11

| Composition of (8) | | |
|---|---|---|
| Curable composition 8 | Composition (wt %) | Component |
| Component A: glass transition modifier | 30 | TGM1 |
| Component B: toughness modifier | 40 | TNM2 |
| Component C: reactive diluent | 30 | RD1 |
| Additional component: core-shell particles | +5 | Albidur EP XP* |

*Albidur EP XP powder (core-shell particle) is commercially available from TEGO ®.

The following Table 12 lists the viscosities of curable compositions (7) and (8) and most relevant properties of the crosslinked polymers obtained therefrom using Hot Lithography as well as the desirable ranges for each property.

TABLE 12

| Results of Compositions (7) and (8) | | | |
|---|---|---|---|
| Property | Desirable Range | (7) | (8) |
| Viscosity of formulation | 1 < x < 70 Pa · s at 90° C. at 110° C. | 5.4 Pa · s<br>1.9 Pa · s | 7.8 Pa · s<br>2.7 Pa · s |
| | | Polymer 7 | Polymer 8 |
| Tensile Strength at Yield (MPa) | >25 MPa, preferably > 40 MPa | 33.0 | 31.0 |
| Elongation at Yield (%) | >5% | 7 | 7 |
| Elongation at Break (%) | >20%, peferably > 30% | 47.1 | 65.2 |

TABLE 12-continued

| Results of Compositions (7) and (8) | | | |
|---|---|---|---|
| Property | Desirable Range | (7) | (8) |
| Tensile Modulus (MPa) | >800 MPa, preferably >1000 MPa | 608 | 567 |
| $T_g$ (° C.) | >90° C., preferably > 100° C. | 105 | 102 |
| Storage Modulus (MPa) | >750 MPa, preferably >1000 MPa | 1180 | 1070 |
| Stress Relaxation (% of initial load) | >20%, preferably > 35% | 14.2 | 12.3 |
| Stress Relaxation (MPa) | >2 MPa, preferably ≥ 3 MPa | 1.8 | 1.0 |

Table 12 shows that the presence of a relatively high proportion of reactive diluent RD1 and the addition of Albidur XP powder as an additional toughness modifier yielded desirable values for tensile strength, elongations at yield and at break. However, the storage modulus and the stress relaxation results were less desirable. The addition of Albidur EP XP powder in (8) resulted in an increased elongation at break of >65% compared to (7) without core-shell particles (47%), while maintaining similar values for all other mechanical properties

Example 5: Preparation of Curable Compositions (9) and (10)

The following components were mixed in the proportions shown in Tables 13 and 14 to give curable compositions (9) and (10):

TABLE 13

| Composition of (9) | | |
|---|---|---|
| Curable composition 9 | Composition (wt %) | Component |
| Component A: glass transition modifier | 42.5 | TGM1 |
| Component B: toughness modifier | 35 | TNM5 |
| Component C: reactive diluent | 22.5 | RD2 |

TABLE 14

| Composition of (10) | | |
|---|---|---|
| Curable composition 10 | Composition (wt %) | Component |
| Component A: glass transition modifier | 30 | TGM1 |
| Component B: toughness modifier | 40 | TNM5 |
| Component C: reactive diluent 1 | 13 | RD1 |
| Component C: reactive diluent 2 | 17 | RD2 |

The following Table 15 lists the viscosities of curable compositions (9) and (10) and most relevant properties of the crosslinked polymers obtained therefrom using Hot Lithography as well as the desirable ranges for each property.

TABLE 15

| Results of Compositions (9) and (10) | | | |
|---|---|---|---|
| Property | Desirable Range | (9) | (10) |
| Viscosity of formulation | 1 < x < 70 Pa · s at 90° C. at 110° C. | 6.3 Pa · s 1.9 Pa · s | 8.5 Pa · s 2.6 Pa · s |
| | | Polymer 9 | Polymer 10 |
| Tensile Strength at Yield (MPa) | >25 MPa, preferably > 40 MPa | 78.9 | 66.0 |
| Elongation at Yield (%) | >5% | —* | 7 |
| Elongation at Break (%) | >20%, peferably > 30% | 7.6 | 14.6 |
| Tensile Modulus (MPa) | >800 MPa, preferably >1000 MPa | 1740 | 1530 |
| $T_g$ (° C.) | >90° C., preferably > 100° C. | 125 | 113 |
| Storage Modulus (MPa) | >750 MPa, preferably >1000 MPa | 2540 | 2600 |
| Stress Relaxation (% of initial load) | >20%, preferably > 35% | 9.2 | 3.6 |
| Stress Relaxation (MPa) | >2 MPa, preferably ≥ 3 MPa | 7.5 | 3.0 |

*sample broke before reaching the yield point

Table 15 shows that the polymers obtained from compositions (9) and (10) yielded excellent results for most of the properties listed, except for elongation at break and stress relaxation. Without wishing to be bound by theory, the inventors suppose that this was because of the higher contents of rigid cycloaliphatic structures (originating from isophorone diisocyanate) of TNM5 compared to TNM1 and TNM2.

Example 6: Preparation of Curable Compositions (11) and (12)

The following components were mixed in the proportions shown in Tables 16 and 17 to give curable compositions (11) and (12):

TABLE 16

| Composition of (11) | | |
|---|---|---|
| Curable composition 11 | Composition (wt %) | Component |
| Component A: glass transition modifier | 23 | TGM1 |
| Component B: toughness modifier | 47 | TNM3 |
| Component C: reactive diluent | 30 | RD1 |

TABLE 17

| Composition of (12) | | |
|---|---|---|
| Curable composition 12 | Composition (wt %) | Component |
| Component A: glass transition modifier | 23 | TGM1 |
| Component B: toughness modifier | 47 | TNM4 |
| Component C: reactive diluent | 30 | RD1 |

The following Table 18 lists the viscosities of curable compositions (11) and (12) and most relevant properties of the crosslinked polymers obtained therefrom using Hot Lithography as well as the desirable ranges for each property.

TABLE 18

| Results of Compositions (11) and (12) | | | |
|---|---|---|---|
| Property | Desirable Range | (11) | (12) |
| Viscosity of formulation | 1 < x < 70 Pa · s at 90° C. at 110° C. | 9.2 Pa · s 2.1 Pa · s | 7.1 Pa · s 2.0 Pa · s |
| | | Polymer 11 | Polymer 12 |
| Tensile Strength at Yield (MPa) | >25 MPa, preferably >40 MPa | 28.3 | 24.1 |
| Elongation at Yield (%) | >5% | 8 | 7 |
| Elongation at Break (%) | >20%, peferably >30% | 77.9 | 80.5 |
| Tensile Modulus (MPa) | >800 MPa, preferably >1000 MPa | 541 | 389 |
| $T_g$ (° C.) | >90° C., preferably >100° C. | 107 | 111 |
| Storage Modulus (MPa) | >750 MPa, preferably >1000 MPa | 1110 | 1010 |
| Stress Relaxation (% of initial load) | >20%, preferably >35% | 9.7 | 12.8 |
| Stress Relaxation (MPa) | >2 MPa, preferably ≥3 MPa | 0.79 | 1.24 |

Table 18 shows that the compositions of (11) and (12) resulted in polymers exhibiting desirable values for tensile strength, elongation at yield and at break, $T_g$, and storage modulus, but less desirable values for tensile modulus and stress relaxation. It further shows tat exchanging toughness modifier TNM3 used in (11) for TNM4 in (12), thereby approximately doubling the chain length of the polycarbonate diol based on 2,2-dimethyl-1,3-propanediol, but maintaining the proportions of the Components A to C, resulted in polymer properties comparable to those of (11). As expected, the elongation at break outperforms those of (1) to (3). Without wishing to be bound by theory, the inventors suppose that the reason why the values for tensile strength, tensile modulus and $T_g$ did not reach the preferred ranges was that there are no rigid cycloaliphatic structures present in TNM3 and TNM4.

Example 7: Preparation of Curable Composition (13)

The following components were mixed in the proportions shown in Table 19 to give curable composition (13):

TABLE 19

| Composition of (13) | | |
|---|---|---|
| Curable composition 13 | Composition (wt %) | Component |
| Component A: glass transition modifier | 28 | TGM1 |
| Component B: toughness modifier | 67 | TNM6 |
| Component C: reactive diluent | 5 | RD1 |

The following Table 20 lists the viscosity of curable composition (13) and most relevant properties of the cross-linked polymer obtained therefrom using Hot Lithography as well as the desirable ranges for each property.

TABLE 20

| Results of Composition (13) | | |
|---|---|---|
| Property | Desirable Range | (13) |
| Viscosity of formulation | 1 < x < 70 Pa · s at 90° C.<br>at 110° C. | 37.0 Pa · s<br>12.2 Pa · s |
| | | Polymer 13 |
| Tensile Strength at Yield (MPa) | >25 MPa,<br>preferably >40 MPa | 18.0 |
| Elongation at Yield (%) | >5% | 9 |
| Elongation at Break (%) | >20%,<br>peferably >30% | 16.3 |
| Tensile Modulus (MPa) | >800 MPa,<br>preferably >1000 MPa | 246 |
| $T_g$ (° C.) | >90° C.,<br>preferably >100° C. | 146 |
| Storage Modulus (MPa) | >750 MPa,<br>preferably >1000 MPa | 495 |
| Stress Relaxation (% of initial load) | >20%,<br>preferably >35% | n.d. |
| Stress Relaxation (MPa) | >2 MPa,<br>preferably ≥3 MPa | n.d. |

n.d.: not determined

Table 20 shows that the photopolymer obtained from composition (13) had a very high glass transition temperature, $T_g$, and the highest elongation at yield of all polymers obtained. Otherwise, however, the measured values were less favorable. Without wishing to be bound by theory, the inventors suppose that this was because of both the relatively low molecular weight of <7 kDa of TNM6 and its unpreferably high proportion (67%) in the curable composition.

Example 8: Evaluation of Curable Compositions and Crosslinked Polymers Resulting Therefrom FIGS. 5 to 7 show the measurement results obtained by testing the curable compositions or the crosslinked polymers resulting therefrom, respectively, of (1) to (10) for their viscosities (Pa·s) and storage moduli (GPa) at varying temperatures (° C.) as well as their tensile strengths (N/mm$^2$) at varying strains (%). These diagrams show that all ten examples yielded curable compositions which were well processible at processing temperatures of 90° C. or 110° C. and which resulted in crosslinked polymers having preferable storage moduli at 37° C. (i.e. body temperature) equal to or higher than 0.8 GPa, i.e. 800 MPa, and preferable tensile strengths at yield equal to or higher than 25 N/mm$^2$, i.e. 25 MPa. The majority of the specimens even fell into the more preferable ranges of a storage modulus at 37° C. equal to or higher than 1 GPa, i.e. 1000 MPa, and a tensile strength at yield equal to or higher than 40 N/mm$^2$, i.e. 40 MPa.

On the following pages, the proportions of the Components A to C of curable compositions (1) to (13) are summarized in Table 21, and in Table 22, the properties of all the polymers obtained by 3D-printing of these curable compositions are summarized.

TABLE 21

| Summary of the compositions of curable compositions (1) to (13) | | | | | | | | | | | | | |
|---|---|---|---|---|---|---|---|---|---|---|---|---|---|
| Comp. | (1) | (2) | (3) | (4) | (5) | (6) | (7) | (8) | (9) | (10) | (11) | (12) | (13) |
| A | 42.5% TGM1 | 34% TGM1 | 39% TGM1 | 24.5% TGM1 | 42.5% TGM1 | 30.5% TGM1 | 30% TGM1 | 30% TGM1 | 42.5% TGM1 | 30% TGM1 | 23% TGM1 | 23% TGM1 | 28% TGM1 |
| B | 50% TNM1 | 30% TNM1 | 38% TNM1 | 30% TNM1 | 50% TNM2 | 50% TNM2 | 40% TNM2 | 40% TNM2 | 35% TNM5 | 40% TNM5 | 47% TNM3 | 47% TNM4 | 67% TNM6 |
| C | 7.5% RD2 | 30% RD1<br>6% RD2 | 15% RD1<br>7% RD2 | 40% RD1<br>4.5% RD2 | 7.5% RD2 | 15% RD1<br>4.5% RD2 | 30% RD1 | 30% RD1 | 22.5% RD2 | 13% RD1<br>17% RD2 | 30% RD1 | 30% RD1 | 5% RD1 |
| CSP | — | — | — | — | — | — | — | +5% | — | — | — | — | — |

CSP: core-shell particles
All percentages are given in wt %. based on 100 wt % of Components A to C.

All percentages are given in wt %, based on 100 wt % of Components A to C.

TABLE 22

| Summary of the properties of crosslinked polymers obtained from (1) to (13) | | | | | | | | | | | | | | |
|---|---|---|---|---|---|---|---|---|---|---|---|---|---|---|
| Prop. | Ranges | 1 | 2 | 3 | 4 | 5 | 6 | 7 | 8 | 9 | 10 | 11 | 12 | 13 |
| T.S.Y. (MPa) | >25<br>>40 | 43.1 | 46 | 43.3 | 26.4 | 35.5 | 36.3 | 33 | 31 | 78.9 | 66 | 28.3 | 24.1 | 18 |
| E.Y. (%) | >5<br>>6 | 6 | 6 | 7 | 6 | 7 | 6 | 7 | 7 | n.d. | 7 | 8 | 7 | 9 |
| E.B. (%) | >20<br>>30 | 31.1 | 30 | 35.2 | 58.7 | 42.6 | 81.6 | 47.1 | 65.2 | 7.6 | 14.6 | 77.9 | 80.5 | 16.3 |
| T.M. (MPa) | >800<br>>1000 | 867 | 1050 | 943 | 601 | 519 | 481 | 608 | 567 | 1740 | 1530 | 541 | 389 | 246 |
| $T_g$ (° C.) | >90<br>>100 | >120 | 147 | 134 | 131 | 122 | 127 | 105 | 102 | 125 | 113 | 107 | 111 | 146 |
| S.M. (MPa) | >750<br>>1000 | 830 | 1330 | 1350 | 1140 | 805 | 780 | 1180 | 1070 | 2540 | 2600 | 1110 | 1010 | 495 |

TABLE 22-continued

| Summary of the properties of crosslinked polymers obtained from (1) to (13) | | | | | | | | | | | | | | |
|---|---|---|---|---|---|---|---|---|---|---|---|---|---|---|
| Prop. | Ranges | 1 | 2 | 3 | 4 | 5 | 6 | 7 | 8 | 9 | 10 | 11 | 12 | 13 |
| S.R.1 (%) | >20 >35 | 35.6 | 40.4 | 37.3 | 22.3 | 24.1 | 24.7 | 14.2 | 12.3 | 9.2 | 3.6 | 9.7 | 12.8 | n.d. |
| S.R.2 (MPa) | >2 ≥3 | 3.9 | 10.5 | 7.6 | 3.6 | 2.3 | 2.8 | 1.8 | 1 | 7.5 | 3 | 0.79 | 1.24 | n.d. |

T.S.Y.: tensile strength at yield (MPa)
E.Y.: elongation at yield (%)
E.B.: elongation at break (%)
T.M.: tensile modulus (MPa)
$T_g$: glass transition temperature (° C.)
S.M.: storage modulus (MPa)
S.R.1: stress relaxation (% of initial load)
S.R.2: stress relaxation (MPa)
The highest values of all examples for the respective properties are underlined.

The highest values of all examples for the respective properties are underlined.

From the summaries in Tables 21 and 22, it can be seen that (1) to (3) yielded the best results, since all properties fell into the desired ranges, and almost all ((1) and (3)) or actually all ((2)) measured values even fell into the preferred ranges. Additionally, the best performing polymer (2) even showed the highest values among all examples for $T_g$ (147° C.) and stress relaxation (40.4% of the initial load and 10.2 MPa, respectively).

In view of the proportions of the Components A to C in the curable composition of (2), i.e. 34 wt % of Component A (TGM1), 30 wt % of Component B (TNM1), and 36 wt % in total of Component C, being the sum of 30 wt % of RD1 and 6 wt % of RD2, and (3), i.e. 39 wt % of Component A (TGM1), 38 wt % of Component B (TNM1), and 22 wt % in total of Component C, being the sum of 15 wt % of RD1 and 7 wt % of RD2, as shown in Table 21, a skilled person may deduce that, for obtaining optimal results, it is desirable to find a well-balanced ratio of all three components and that Component A provides for high $T_g$ and strength values at the expense of elongation at break. Component B provides for high elongation at break and toughness via strengthening effects, but it is difficult to process high amounts thereof in the curable composition, and Component C improves the processability of the formulations, particularly of those comprising high amounts of high molecular weight toughness modifiers, while maintaining high values for strength and $T_g$.

Additionally, comparing the results of (3), (8) and (10) to (12), where the toughness modifiers TNM1 to TNM5 were used in roughly comparable amounts, one may conclude that TNM1, TNM2 and TNM5, each comprising a linear $C_6$ (hexamethylene) and/or a cyclic $C_8$ (cyclohexanedimethylene) radical $R_4$ in the polycarbonate blocks, the longest chain of which comprises 6 carbon atoms are to be preferred over TNM3 and TNM4, each comprising a relatively short-chained radical $R_4$ (i.e. 2,2-dimethylpropylene the longest chain of which has only 3 carbon atoms). Moreover, TNM1 and TNM2 are to be preferred over the rather rigid TNM5, which yielded less desirable results for toughness and elongation at break. Therefrom, a skilled person may conclude that the rigid cycloaliphatic moieties preferably originate from the polycarbonate diol, rather than from the diisocyanate, since steric effects may disturb the expected strengthening effects of the urea groups.

Further, from the results of (13), one may deduce that polyether-modified toughness modifiers such as TNM6, or at least excessively high proportions of such modifiers having relatively low molecular weights in the curable composition, are less preferable with regard to the mechanical properties of the polymers, even though the glass transition temperature obtained in (13) reached the second highest value among all polymers produced (146° C.).

Nonetheless, each of the crosslinked polymers obtained according the present disclosure yielded at least two (12) or at least four ((10) and (11)) preferred values, which shows that the curable compositions according to the present disclosure are highly suitable for use in a high temperature lithography-based photopolymerization process for producing crosslinked polymers having desirable properties. Polymers of the present disclosure thus produced, especially when used as orthodontic appliances, are able to outmatch currently available materials in several respects, particularly in terms of their thermomechanical properties and manufacturing costs.

Example 9: Preparation of Curable Compositions (14) and (15)

The following components were mixed in the proportions shown in Tables 23 and 24 to give curable compositions (14) and (15):

TABLE 23

| Composition of (14) | | |
|---|---|---|
| Curable composition 14 | Composition (wt %) | Component |
| Component A: glass transition modifier | 30 | TGM4 |
| Component B: toughness modifier | 49 | TNM2 |
| Component C: reactive diluent 1 | 21 | RD1 |

TABLE 24

| Composition of (15) | | |
|---|---|---|
| Curable composition 15 | Composition (wt %) | Component |
| Component A: glass transition modifier | 30 | TGM4 |
| Component B: toughness modifier | 49 | TNM1 |
| Component C: reactive diluent | 21 | RD2 |

The following Table 25 lists the viscosities of curable compositions (14) and (15) and most relevant properties of the crosslinked polymers obtained therefrom using Hot Lithography as well as the desirable ranges for each property.

TABLE 25

| Results of Compositions 14 and 15 | | | |
|---|---|---|---|
| Property | Desirable Range | (14) | (15) |
| Viscosity of formulation | 1 < x < 70 Pa · s at 90° C. at 110° C. | 56.0 Pa · s 21.5 Pa · s | 13.0 Pa · s 5.0 Pa · s |
| | | Polymer 14 | Polymer 15 |
| Tensile Strength at Yield (MPa) | >25 MPa, preferably >40 MPa | 5.6 | 26.2 |
| Elongation at Yield (%) | >5% | 6.3 | 8.3 |
| Elongation at Break (%) | >20%, preferably >30% | 205 | 98 |
| Tensile Modulus (MPa) | >800 MPa, preferably >1000 MPa | 154 | 552 |
| $T_g$ (° C.) | >90° C., preferably >100° C. | 101 | 107 |
| Storage Modulus (MPa) | >750 MPa, preferably >1000 MPa | 334 | 886 |
| Stress Relaxation (% of initial load) | >20%, preferably >35% | 6.4 | 24.1 |
| Stress Relaxation (MPa) | >2 MPa, preferably ≥3 MPa | 0.07 | 2.68 |

Table 25 shows that the photopolymers obtained from (14) and (15) yielded good values for elongation at yield, elongation at break and $T_g$. The polymers obtained exhibited higher elongations at break when TGM4 was used instead of TGM1, (cf. (1) to (13)). However, the tensile strength, storage modulus and stress relaxation results of the TNM2 containing example were less desirable. Without wishing to be bound by theory, the inventors suppose that the reason for this performance is the lower rigidity of the system. By using TNM1, the formulation yielded desirable results also in the tensile strength at yield and the stress relaxation properties. Both examples showed low tensile modulus.

Example 10: Preparation of Curable Compositions (16) to (22)

The following components were mixed in the proportions shown in Tables 26 to give curable compositions (16) to (22):

TABLE 26

| Compositions (16) to (22) | | | | | | | |
|---|---|---|---|---|---|---|---|
| Comp. No. | Glass transition modifier[1] (wt %) | Toughness modifier[2] (wt %) | Reactive Diluent[3] (wt %) | Reactive Diluent[4] (wt %) | Additive[5] (wt %) | Additive[6] (wt %) | Photo-initiator[7] (wt %) |
| 16 | 15 | 31.5 | 40 | 13.5 | 1 | — | 0.4 |
| 17 | 15 | 31.5 | 40 | 13.5 | 1 | — | 1 |
| 18 | 15 | 31.5 | 40 | 13.5 | 0.5 | 0.5 | 0.4 |
| 19 | 15 | 31.5 | 40 | 13.5 | 0.5 | 0.5 | 1 |
| 20 | 15 | 31.5 | 40 | 13.5 | — | — | 1 |
| 21 | 15 | 31.4 | 40 | 13.5 | — | 1 | 1 |
| 22 | 15 | 31.5 | 40 | 13.5 | — | 3 | 1 |

[1]TGM1-RD1 (TGM1 with 30 wt % TEGDMA);

[2]TNM2;

[3]HSMA;

[4]triethylene glycol dimethacrylate;

[5]BYK ®-430;

[6]BYK ®-A535;

[7]TPO-L

BYK®-430 is a solution of a high molecular weight, urea-modified, medium-polarity polyamides. Other high molecular weight, urea-modified, medium-polarity polyamides are envisioned to work in a comparable manner. BYK®-A535 is a silicone-free solution that destroys foam polymers. Other defoamers are envisioned to work in a comparable manner. Speedcure TPO-L from Lambson (Ethyl(2,4,6-trimethylbenzoyl)phenyl phospinate) is a photoinitiator that absorbs at 380 nm. Other photoinitiators are envisioned, as are photoinitiators absorbing at other wavelengths. The following Table 27 provides relevant properties of the crosslinked polymers obtained from curable compositions (16) to (22) using Hot Lithography, as well as desirable ranges for each property.

The respective property values of Compositions 16 to 62 were determined using the following methods:

tensile strength at yield: according to ASTM D1708;
elongation at break: according to ASTM D1708, optionally at a crosshead speed of 1.7 mm/min;
tensile strength: according to ASTM D1708; and
Young's modulus: according to ASTM D1708.

TABLE 27

| Results of Compositions 16 to 22 | | | | | | | | |
|---|---|---|---|---|---|---|---|---|
| Property | Desirable Range | P16 | P17 | P18 | P19 | P20 | P21 | P22 |
| Tensile Strength at Yield (MPa) | >25 MPa, preferably >40 MPa | 35 | 34 | 35 | 35 | 37 | 35 | 33 |
| Elongation at Break (%) | >20%, preferably >30% | 47.1 | 34.6 | 44.7 | 38.4 | 35.2 | 34.7 | 20.9 |
| Tensile Strength (MPa) | >25 MPa, preferably >40 MPa | 40 | 36 | 40 | 40 | 42 | 40 | 35 |
| Young's Modulus (MPa) | >900 MPa, preferably >1100 MPa | 991 | 1110 | 988 | 1064 | 1195 | 1136 | 1088 |

Table 27 shows that each of compositions 16-22 had a tensile strength at yield within the desirable range. Likewise, compositions 16-21 had elongation at break values that are within the preferred range, though composition 22 had an elongation at break value that is at the low end of the desirable range. Without wishing to be bound by theory, it is hypothesized the addition of excess additive BYK®-A535 could have interfered with the formation of a fully cohesive structure. In comparison, composition 21 has a three-fold decrease in the amount of BYK®-A535 and had characteristics within the preferred range (elongation at break of 34.7%). The composition with the highest tensile strength at yield and maximum tensile strength was P20, which is the composition that did not have any added additives. However, compositions P16-P19 had improved values for elongation at break over P20. P16 and P17 differed in the amount of photoinitiator (0.4 wt % and 1 wt %, respectively), and Table 27 indicates a smaller amount of photoinitiator may improve elongation at break values. A comparison of P18 and P19 provides a similar indication.

Example 11: Preparation of Curable Compositions (23) to (33)

The following components were mixed in the proportions shown in Table 28 to give curable compositions (23) to (29):

TABLE 28

| Compositions (23) to (29) | | | | | | |
|---|---|---|---|---|---|---|
| Comp. No. | Crosslinker[1] (wt %) | Crosslinker[2] (wt %) | Crosslinker[3] (wt %) | Toughness modifier[4] (wt %) | Reactive Diluent[5] (wt %) | Additive[6] (wt %) |
| 23 | — | — | 45 | 45 | 10 | — |
| 24 | — | — | 25 | 45 | 30 | — |
| 25 | — | — | 15 | 45 | 40 | — |
| 26 | — | — | 14.2 | 43 | 38 | 4.8 |
| 27 | — | — | 12 | 45 | 38 | 5 |

TABLE 28-continued

| Compositions (23) to (29) | | | | | | |
|---|---|---|---|---|---|---|
| Comp. No. | Crosslinker[1] (wt %) | Crosslinker[2] (wt %) | Crosslinker[3] (wt %) | Toughness modifier[4] (wt %) | Reactive Diluent[5] (wt %) | Additive[6] (wt %) |
| 28 | 15 | — | — | 45 | 40 | — |
| 29 | — | 20 | 10 | 45 | 25 | — |

[1]TGM1-D4MA (TGM1 with 15 wt % D4MA);
[2]H1188;
[3]TGM1-RD1 (TGM1 with 30 wt % TEGDMA);
[4]TNM2-RD1 (TNM2 with 30 wt % RD1);
[5]HSMA;
[6]BDT1006

BDT1006 refers to Bomar™ BDT-1006, which is a hyperbranched dendritic acrylate oligomer having an average acrylate functionality of 6 groups per molecule. Other acrylate oligomers are envisioned as additives. Other branched dendritic oligomers having a plurality of functional groups are also envisioned as additives. To each of these compositions was added TPO-L as a photoinitiator (1 wt %). To P26 and P27 was added 0.25 and 0.2 wt % 2,2'-dihydroxy-4-methoxybenzophenone, respectively, as a UV-blocker. The following Table 29 provides relevant properties of the crosslinked polymers obtained from curable compositions (23) to (29) using Hot Lithography.

TABLE 29

| Results of Compositions 23 to 29 | | | | | | | | |
|---|---|---|---|---|---|---|---|---|
| Property | Desirable Range | P23 | P24 | P25 | P26 | P27 | P28 | P29 |
| Stress Relaxation of Initial Load (%) | >20%, preferably >35% | 11.07 | 11.15 | 23.33 | 16.75 | 20.00 | 15.92 | 20.24 |
| Elongation at Break (%) | >20%, preferably >30% | 20.5 | 15.5 | 18.6 | 19.0 | 14.1 | 15.8 | 12.9 |
| Tensile Strength (MPa) | >25 MPa, preferably >40 MPa | 50 | 40 | 34 | 37 | 33 | 35 | 40 |
| Young's Modulus (MPa) | >900 MPa, preferably >1100 MPa | 1350 | 1248 | 995 | 1171 | 917 | 1035 | 1260 |

These results showed that compositions P25, P27, and P29 had desirable stress relaxation of the initial load. P25 had the highest level of reactive diluent from the group of P23-P27. While P28 had a comparable level of reactive diluent to P25, the change of crosslinker from TGM1-RD1 to TGM1-D4MA resulted in decreased stress relaxation of initial load as well as elongation at break. Of these compositions, only P23 provided a desirable elongation at break value. Additional compositions were created to analyze changes to the stress relaxation of the initial load, with respect to alterations to glass transition modifiers and using a various toughness modifier. The following components were mixed in the proportions shown in Table 30 to give curable compositions (30) to (33):

TABLE 30

Compositions (30) to (33)

| Comp. No. | Crosslinker[1] (wt %) | Crosslinker[2] (wt %) | Toughness modifier[3] (wt %) | Reactive Diluent[4] (wt %) | Reactive Diluent[5] (wt %) | Additive[6] (wt %) |
|---|---|---|---|---|---|---|
| 30 | 10 | 20 | 45 | 25 | — | — |
| 31 | 14.3 | — | 43 | — | 38 | 4.8 |
| 32 | 27.9 | — | 34.6 | — | 33.5 | 4 |
| 33 | 17.9 | — | 39 | 38.1 | — | 5 |

[1]TGM1-D4MA (TGM1 with 15 wt % D4MA);
[2]H1188;
[3]TNM2_D3MA;
[4]HSMA;
[5]BSMA;
[6]SIU2400

SIU2400 is a functionalized silicone urethane acrylate having 10 functional groups, diluted with 10 wt % TPGDA (tripropylene glycol diacrylate). Prior to curing, to each of these compositions was added TPO-L as a photoinitiator (1 wt %). The following Table 31 provides relevant properties of the crosslinked polymers obtained from curable compositions (30) to (33) using Hot Lithography.

TABLE 31

Results of Compositions 30 to 33

| Property | Desirable Range | P30 | P31 | P32 | P33 |
|---|---|---|---|---|---|
| Stress Relaxation of Initial Load (%) | >20%, preferably >35% | 21.67 | 16.84 | 12.31 | 13.51 |
| Elongation at Break (%) | >20%, preferably >30% | 21.0 | 21.4 | 15.2 | 25.8 |
| Tensile Strength (MPa) | >25 MPa, preferably >40 MPa | 40 | 45 | 40 | 39 |
| Young's Modulus (MPa) | >900 MPa, preferably >1100 MPa | 997 | 1003 | 1109 | 879 |

Overall, these results show that various combinations of cross-linkers and toughness modifiers can provide desirable cured compositions having stress relaxation over 20% of the initial load. Of the combinations, P30 had both a desirable stress relaxation of initial load, and elongation at break. These data indicate the addition of multifunctional additives (compositions 26-27 and 31-33) may decrease the value of the stress relaxation of initial load.

Example 12: Preparation of Curable Compositions (34) to (35)

Compositions 26 and 27 were prepared as described above. The following components were mixed in the proportions shown in Table 32 to give curable compositions (34) to (35):

TABLE 32

Compositions (26-27) and (34-35)

| Comp. No. | Crosslinker[1] (wt %) | Toughness modifier[2] (wt %) | Reactive Diluent[3] (wt %) | Reactive Diluent[4] (wt %) | Additive[5] (wt %) | Additive[6] (wt %) |
|---|---|---|---|---|---|---|
| 26 | 14.2 | 43 | 38 | — | — | 4.8 |
| 34 | 14.2 | 43 | — | 38 | 4.8 | — |

TABLE 32-continued

| Compositions (26-27) and (34-35) | | | | | | |
|---|---|---|---|---|---|---|
| Comp. No. | Crosslinker[1] (wt %) | Toughness modifier[2] (wt %) | Reactive Diluent[3] (wt %) | Reactive Diluent[4] (wt %) | Additive[5] (wt %) | Additive[6] (wt %) |
| 27 | 12 | 45 | 38 | — | — | 5 |
| 35 | 15 | 45 | 40 | — | — | — |

[1]TGM1-RD1 (TGM1 with 15 wt % RD1);
[2]TNM2_RD1 (TNM2 with 30 wt % RD1);
[3]HSMA;
[4]BSMA;
[5]SIU2400;
[6]BDT1006

To each of these compositions was added TPO-L as a photoinitiator (1 wt %). To P26, P27, P34, and P35 was added 0.25, 0.2, 0.25, and 0.3 wt % 2,2'-dihydroxy-4-methoxybenzophenone, respectively, as a UV-blocker. The following Table 33 provides relevant properties of the cross-linked polymers obtained from curable compositions (26-27) and (34-35) using Hot Lithography.

TABLE 33

| Results of Compositions 26-27 and 34-35 | | | | |
|---|---|---|---|---|
| Property | P26 | P27 | P34 | P35 |
| Elongation at Break (%) (average) | 19.0 | 14.1 | 16.4 | 22.6 |
| Tensile Strength (MPa) (average) | 37 | 33 | 35 | 35 |
| Young's Modulus (MPa) | 1171 | 917 | 932 | 1056 |

These results provide a comparison of composition having no additive (composition P35) to similar compositions having BDT1006 added to them (P26 and P27). The additive-free P35 had a longer average elongation at break, but comparable average tensile strength and Young's Modulus values. Composition P34 uses a different diluent and multifunctional additive (SIU2400), and has average values that fall near those of P26 and P27. Accordingly, the addition of multifunctionalized additives may decrease average elongation at break.

Example 13: Preparation of Curable Compositions (36) to (44)

The following components were mixed in the proportions shown in Table 34 to give curable compositions (36) to (44):

TABLE 34

| Compositions (36) to (44) | | | | | | |
|---|---|---|---|---|---|---|
| Comp. No. | Crosslinker[1] (wt %) | Toughness modifier[2] (wt %) | Toughness modifier[3] (wt %) | Toughness modifier[4] (wt %) | Reactive Diluent[5] (wt %) | Additive[6] (wt %) |
| 36 | 15 | — | — | 45 | 40 | — |
| 37 | 25 | — | — | 35 | 40 | — |
| 38 | 35 | — | — | 35 | 30 | — |
| 39 | 25 | — | — | 45 | 30 | — |
| 40 | 20 | 45 | — | — | 35 | 30 |
| 41 | 40 | — | — | — | 30 | 30 |
| 42 | 25 | — | 35 | — | 30 | 10 |
| 43 | 15 | 45 | — | — | 40 | — |
| 44 | 14.3 | 43 | — | — | 38 | 4.8 |

[1]TGM1-D3MA (TGM1 with 15 wt % D3MA);
[2]TNM2_RD1, 16 kDa;
[3]TNM2_RD1, 25 kDa;
[4]UA5216, separated;
[5]HSMA;
[6]SIU2400

UA5216 refers to Miramer UA5216, an aliphatic difunctional acrylate. Other aliphatic difunctional acrylates are envisioned to have similar effects. To each of these compositions was added TPO-L as a photoinitiator (1 wt %). To P36 and P37 was added 0.2 and 0.19 wt % 2,2'-dihydroxy-4-methoxybenzophenone, respectively, as a UV-blocker. The following Table 35 provides relevant properties of the crosslinked polymers obtained from curable compositions (36) to (44) using Hot Lithography.

TABLE 35

| Results of Compositions 36 to 44 | | | | | | | | | |
|---|---|---|---|---|---|---|---|---|---|
| Property | P36 | P37 | P38 | P39 | P40 | P41 | P42 | P43 | P44 |
| Elongation at Break (%) (average) | 92.5 | 29.0 | 24.6 | 55.7 | 29.5 | 5.1 | 18.6 | 32.4 | 45.3 |
| Tensile Strength (MPa) (average) | 25 | 39 | 45 | 33 | 36 | 44 | 44 | 34 | 33 |
| Young's Modulus (MPa) | 370 | 734 | 737 | 474 | 544 | — | — | — | — |

These results provide data allowing for assorted comparisons. Numerous compositions had preferable levels of elongation at break, with P36 having a very high value of 92.5%, and P39, P43, and P44 all being over 30%. The decrease of toughness modifier and increase of crosslinker between P36 and P37 sharply decreased the average elongation at break while increasing average tensile strength and Young's Modulus. Similar effects were observed between the decrease of toughness modifier and increase of crosslinker between P39 and P38. A comparison of P42 and P37 provides information relating to importance the toughness modifier can play, with observable differences in average elongation at break, average tensile strength, and average Young's Modulus between P39 (using UA5216 as the toughness modifier) and P42 (using TNM2_RD2, 25 kDa as the toughness modifier).

Example 14: Preparation of Curable Compositions (45) to (51)

The following components were mixed in the proportions shown in Table 36 to give curable compositions (45) to (51):

TABLE 36

| Compositions (45) to (51) | | | | | | |
|---|---|---|---|---|---|---|
| Comp. No. | Crosslinker[1] (wt %) | Toughness modifier[2] (wt %) | Reactive Diluent[3] (wt %) | Reactive Diluent[4] (wt %) | Additive[5] (wt %) | Additive[6] (wt %) |
| 45 | 20 | 31.5 | 35 | 13.5 | — | — |
| 46 | 20 | 45 | 35 | — | — | 0.6 |
| 47 | 25 | 35 | 40 | — | — | 0.6 |
| 48 | 20 | 31.5 | 35 | 13.5 | — | 0.4 |
| 49 | 20 | 31.5 | 35 | 13.5 | — | 1 |
| 50 | 25 | 24.5 | 40 | 10.5 | — | 1 |
| 51 | 14.3 | 30 | 38 | 12.9 | 4.8 | — |

[1]TGM1-RD1 (MUA + 30);
[2]TNM2_RD1 (2098-5B);
[3]HSMA;
[4]triethylene glycol dimethacrylate;
[5]SIU2400;
[6]TPO-L The photoinitiator TPO-L was added following the initial mixture of proportions from the other columns in Table 36. The following Table 37 provides relevant properties of the crosslinked polymers obtained from curable compositions (45) to (51) using Hot Lithography.

TABLE 37

Results of Compositions 45 to 51

| Property | P45 | P46 | P47 | P48 | P49 | P50 | P51 |
|---|---|---|---|---|---|---|---|
| Elongation at Break (%) (average) | 24.9 | 113.9 | 59.5 | 40.7 | 36.9 | 20.5 | 9.9 |
| Tensile Strength (MPa) (average) | 41 | 42 | 44 | 46 | 44 | 50 | 55 |
| Young's Modulus (MPa) | 1214 | 572 | 1007 | 1059 | 1134 | 1540 | 1900 |
| Average Yield Strength (MPa) | 41 | 23 | 35 | 40 | 39 | 51 | 60 |

Table 37 shows that compositions P47-PS1 each had a desirable tensile strength at yield (over 25 MPa), while compositions P50 and P51 had tensile strengths at yield in the preferred range (over 40 MPa). Conversely, P50 and P51 had the lowest average elongation at break values of the table, while P45-P49 each had elongation at break values in the desired range (greater than 20%), and P46-P49 were also in the preferred range (greater than 30%). P46 had the highest elongation at break value and the lowest average yield strength, while P51 had the highest average yield strength and the lowest average elongation at break of the tabled compositions.

While P45 did not include any photoinitiator, P48 used 0.4 wt % while P49 used 1 wt %. A comparison of P45 to P48 and P49 shows that the addition of at least some photoinitiator increases the average elongation at break, increases the tensile strength, and slightly decreases the Young's Modulus.

Example 15: Preparation of Curable Compositions (52) to (56) with Defoamers

Composition 23 was prepared as discussed previously. The following components were mixed in the proportions shown in Table 38 to give curable compositions (52) to (56), with various defoamers:

TABLE 38

Compositions (52) to (56)

| Comp. No. | Crosslinker[1] (wt %) | Toughness modifier[2] (wt %) | Reactive Diluent[3] (wt %) | Defoamer |
|---|---|---|---|---|
| 23 | 45 | 45 | 10 | — |
| 52 | 45 | 45 | 10 | BYK ®7420ET |
| 53 | 45 | 45 | 10 | BYK ®7411ES |
| 54 | 45 | 45 | 10 | BYK ®7410ET |
| 55 | 45 | 45 | 10 | TEGO ® RAD2100 |
| 56 | 45 | 45 | 10 | TEGO ® WET510 |

[1]TGM1-RD1 (TGM1 with 30 wt % TEGDMA);
[2]TNM2_RD1 (16 kDa);
[3]HSMA

Following formation of the initial mixture comprising the cross-linker, the toughness modifier, and the reactive diluent, 1 wt % of the defoamer was added to each of the corresponding samples 52-56. To each of these compositions was added TPO-L as a photoinitiator (1 wt %). To P52-P56 was added 0.1 wt % 2,2'-dihydroxy-4-methoxybenzophenone as a UV-blocker. To P23 was added 0.2 wt % 2,2'-dihydroxy-4-methoxybenzophenone as a UV-blocker. The following Table 39 provides relevant properties of the cross-linked polymers obtained from curable compositions (23) and (52) to (56) using Hot Lithography.

TABLE 39

Results of Compositions 23 and 52 to 56

| Property | P23 | P52 | P53 | P54 | P55 | P56 |
|---|---|---|---|---|---|---|
| Elongation at Break (%) (average) | 20.5 | 25.5 | 25.6 | 23.3 | 27.4 | 22.8 |
| Tensile Strength (MPa) (average) | 50 | 49 | 49 | 49 | 51 | 45 |
| Young's Modulus (MPa) | 1350 | 1136 | 1136 | 1156 | 1128 | 1145 |

Table 39 indicates the addition of a foaming agent to the composition can increase the average elongation at break value, to varying degrees. Changes in tensile strength values were moderate in most cases, though the defoaming agent TEGO® WET510 moderately decreased the tensile strength of composition P56. The addition of defoaming agents to the compositions appears to moderately decrease the value of the Young's Modulus.

Example 16: Preparation of Curable Compositions (57) to (59)

The following components were mixed in the proportions shown in Table 40 to give curable compositions (57) to (59):

TABLE 40

Compositions (57) to (59)

| Comp. No. | Crosslinker[1] (wt %) | Crosslinker[2] (wt %) | Toughness modifier[3] (wt %) | Reactive Diluent[4] (wt %) | Reactive Diluent[5] (wt %) |
|---|---|---|---|---|---|
| 57 | — | 30 | 45 | 25 | — |
| 58 | — | 30 | 45 | — | 25 |
| 59 | 30 | — | 45 | — | 25 |

[1]LPU624;
[2]TGM1-D3MA (TGM1 with 15 wt % D3MA);
[3]TNM2_RD1 (16 kDa);
[4]HSMA;
[5]BSMA Following formation of the initial mixture comprising the cross-linker, the toughness modifier, and the reactive diluent, TPO-L was added as a photoinitiator (1 wt %) to each sample. To P57-P58 was added 0.15 wt % 2,2'-dihydroxy-4-methoxybenzophenone as a UV-blocker. To P59 was added 0.225 wt % 2,2'-dihydroxy-4-methoxybenzophenone as a UV-blocker. The following Table 41 provides relevant properties of the crosslinked polymers obtained from curable compositions (57) to (59) using Hot Lithography.

TABLE 41

Results of Compositions 57 to 59

| Property | P57 | P58 | P59 |
|---|---|---|---|
| Elongation at Break (%) (average) | 33.4 | 13.7 | 24.8 |
| Tensile Strength (MPa) (average) | 43 | 32 | 38 |
| Young's Modulus (MPa) | 1388 | 1289 | 1529 |

These results provide data allowing for assorted comparisons of compositions. P57 uses HSMA as diluent, while P58 uses BSMA as diluent. The shift from HSMA to BSMA caused a minor decrease in the Young's Modulus. However, substitution of LPU624 as cross-linker in P59 led to a moderate increase in Young's Modulus, when compared with P58.

Example 17: Preparation of Curable Compositions (60) to (61)

The following components were mixed in the proportions shown in Table 42 to give curable compositions (60) to (61):

TABLE 42

Compositions (60) to (61)

| Comp. No. | Toughness modifier[1] (wt %) | Reactive Diluent[2] (wt %) | Additive[3] (wt %) |
|---|---|---|---|
| 60 | 30 | 70 | 0.6 |
| 61 | 30 | 70 | 3 |

[1]TNM2_RD1 (TMX);
[2]HSMA;
[3]TPO-L

Following formation of the initial mixtures comprising the toughness modifier and the reactive diluent, TPO-L was added as a photoinitiator to each sample, as provided by Table 42. To P60-P61 was added 0.15 wt % 2,2'-dihydroxy-4-methoxybenzophenone as a UV-blocker. The following Table 43 provides relevant properties of the crosslinked polymers obtained from curable compositions (60) to (61) using Hot Lithography.

TABLE 43

Results of Compositions 60 to 61

| Property | P60 | P61 |
|---|---|---|
| Elongation at Break (%) (average) | 50.6 | 19.9 |
| Tensile Strength (MPa) (average) | 25 | 26 |
| Young's Modulus (MPa) | 815 | 1168 |
| Average Yield Strength (MPa) | 15 | 16 |

These results provide data assessing the effect the amount of photoinitiator can have on a composition. Both P60 and P61 were generated using equivalent amounts of TNM2_RD1 as a toughness modifier, and HSMA as a reactive diluent. However, P61 had 5-fold the amount of TPO-L photoinitiator. As a result, P61 had a substantially decreased elongation at break value, and a substantially increased Young's Modulus. This result provides further verification from Example 10 (comparison of P16 to P17 and P18 to P19) that higher levels of a photoinitiator additive can decrease the average elongation at break. The changes in tensile strength and average yield strength were moderate.

Example 18: Printing Using Compositions Disclosed Above

Structures were printed using compositions, which were generated as specified above. The printing study assessed the percent laser power (375 nm UV radiation from a diode laser from Soliton, having an output power of 2×70 mW) used to cure compositions, the scan speed assessed, the number of repetitions that were stacked, the temperature of the curing, the hatching, as well as the resin height. These values are provided below in Table 44:

TABLE 44

Printing Results of Select Compositions

| Comp. No. | Laser Power (%) | Scan Speed (m/s) | Repetition (#) | Temperature (° C.) | Hatching | Resin Height (mm) |
|---|---|---|---|---|---|---|
| 23 | 60 | 2 | 1 | 100 | xy | 0.4 |
| 24 | 100 | 2 | 1 | 90 | xy | — |
| 25 | 100 | 2 | 1 | 90 | xy | 0.4 |
| 26 | 100 | 8 | — | 90 | x | 0.3 |
| 27 | 100 | 2 | 1 | 100 | xy | 0.4 |
| 28 | 50 | 2 | 1 | 90 | xy | 0.4 |
| 29 | 60 | 2 | 1 | 100 | xy | 0.4 |
| 30 | 60 | 2 | 1 | 100 | xy | 0.4 |
| 35 | 100 | 4 | 10 | 90 | x | 0.3 |
| 36 | 100 | 0.5 | 1 | 100 | xy | — |
| 45 | 100 | 8 | 10 | 70 | x | — |
| 47 | 100 | 8 | 10 | 90 | x | — |

TABLE 44-continued

Printing Results of Select Compositions

| Comp. No. | Laser Power (%) | Scan Speed (m/s) | Repetition (#) | Temperature (° C.) | Hatching | Resin Height (mm) |
|---|---|---|---|---|---|---|
| 57 | 100 | 0.5 | 1 | 100 | xy | — |
| 58 | 100 | 0.5 | 1 | 100 | xy | — |
| 59 | 100 | 0.5 | 1 | 100 | xy | — |
| 60 | 100 | 8 | 12 | 80 | x | — |
| 61 | 100 | 8 | 12 | 80 | x | — |

These data show that many variations of the disclosed compositions could be used in a printable format. A comparison of compound P25 to P26 shows the benefits of adding a multifunctionalized agent. Composition P26 is similar to P25, but to it was added BDT1006. As a result, the composition P26 could be printed at a faster rate, though the resin height did appear to drop slightly. Table 44 shows that various blends of crosslinkers, toughness modifiers, reactive diluents, and additives as described herein can be applied toward 3D printable materials and structures.

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments, exemplary embodiments and optional features, modification and variation of the concepts herein disclosed may be resorted to by those skilled in the art, and that such modifications and variations are considered to be within the scope of this invention as defined by the appended claims. The specific embodiments provided herein are examples of useful embodiments of the present invention and it will be apparent to one skilled in the art that the present invention may be carried out using a large number of variations of the devices, device components, methods steps set forth in the present description. As will be obvious to one of skill in the art, methods and devices useful for the present methods can include a large number of optional composition and processing elements and steps.

When a group of substituents is disclosed herein, it is understood that all individual members of that group and all subgroups, including any isomers, enantiomers, and diastereomers of the group members, are disclosed separately. When a Markush group or other grouping is used herein, all individual members of the group and all combinations and subcombinations possible of the group are intended to be individually included in the disclosure. When a compound is described herein such that a particular isomer, enantiomer or diastereomer of the compound is not specified, for example, in a formula or in a chemical name, that description is intended to include each isomers and enantiomer of the compound described individual or in any combination. Additionally, unless otherwise specified, all isotopic variants of compounds disclosed herein are intended to be encompassed by the disclosure. Specific names of compounds are intended to be exemplary, as it is known that one of ordinary skill in the art can name the same compounds differently.

It must be noted that as used herein and in the appended claims, the singular forms “a”, “an”, and “the” include plural reference unless the context clearly dictates otherwise. Thus, for example, reference to “a cell” includes a plurality of such cells and equivalents thereof known to those skilled in the art, and so forth. As well, the terms “a” (or “an”), “one or more” and “at least one” can be used interchangeably herein. It is also to be noted that the terms “comprising”, “including”, and “having” can be used interchangeably.

Unless defined otherwise, all technical and scientific terms used herein have the same meanings as commonly understood by one of ordinary skill in the art to which this invention belongs. Although any methods and materials similar or equivalent to those described herein can be used in the practice or testing of the present invention, the preferred methods and materials are now described. Nothing herein is to be construed as an admission that the invention is not entitled to antedate such disclosure by virtue of prior invention.

Every formulation or combination of components described or exemplified herein can be used to practice the invention, unless otherwise stated.

Whenever a range is given in the specification, for example, a temperature range, a time range, or a composition or concentration range, all intermediate ranges and subranges, as well as all individual values included in the ranges given are intended to be included in the disclosure. As used herein, ranges specifically include the values provided as endpoint values of the range. For example, a range of 1 to 100 specifically includes the end point values of 1 and 100. It will be understood that any subranges or individual values in a range or subrange that are included in the description herein can be excluded from the claims herein.

As used herein, “comprising” is synonymous with “including,” “containing,” or “characterized by,” and is inclusive or open-ended and does not exclude additional, unrecited elements or method steps. As used herein, “consisting of” excludes any element, step, or ingredient not specified in the claim element. As used herein, “consisting essentially of” does not exclude materials or steps that do not materially affect the basic and novel characteristics of the claim. In each instance herein any of the terms “comprising”, “consisting essentially of” and “consisting of” may be replaced with either of the other two terms. The invention illustratively described herein suitably may be practiced in the absence of any element or elements, limitation or limitations which is not specifically disclosed herein.

One of ordinary skill in the art will appreciate that starting materials, biological materials, reagents, synthetic methods, purification methods, analytical methods, assay methods, and biological methods other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

Statements Regarding Chemical Compounds and Nomenclature

As used herein, the term "group" may refer to a functional group of a chemical compound. Groups of the present compounds refer to an atom or a collection of atoms that are a part of the compound. Groups of the present invention may be attached to other atoms of the compound via one or more covalent bonds. Groups may also be characterized with respect to their valence state. The present invention includes groups characterized as monovalent, divalent, trivalent, etc. valence states.

As used herein, the term "substituted" refers to a compound wherein a hydrogen is replaced by another functional group.

Alkyl groups include straight-chain, branched and cyclic alkyl groups. Alkyl groups include those having from 1 to 30 carbon atoms. Alkyl groups include small alkyl groups having 1 to 3 carbon atoms. Alkyl groups include medium length alkyl groups having from 4-10 carbon atoms. Alkyl groups include long alkyl groups having more than 10 carbon atoms, particularly those having 10-30 carbon atoms. The term cycloalkyl specifically refers to an alky group having a ring structure such as ring structure comprising 3-30 carbon atoms, optionally 3-20 carbon atoms and optionally 3-10 carbon atoms, including an alkyl group having one or more rings. Cycloalkyl groups include those having a 3-, 4-, 5-, 6-, 7-, 8-, 9- or 10-member carbon ring(s) and particularly those having a 3-, 4-, 5-, 6-, 7- or 8-member ring(s). The carbon rings in cycloalkyl groups can also carry alkyl groups. Cycloalkyl groups can include bicyclic and tricyclic alkyl groups. Alkyl groups are optionally substituted. Substituted alkyl groups include among others those which are substituted with aryl groups, which in turn can be optionally substituted. Specific alkyl groups include methyl, ethyl, n-propyl, iso-propyl, cyclopropyl, n-butyl, s-butyl, t-butyl, cyclobutyl, n-pentyl, branched-pentyl, cyclopentyl, n-hexyl, branched hexyl, and cyclohexyl groups, all of which are optionally substituted. Substituted alkyl groups include fully halogenated or semihalogenated alkyl groups, such as alkyl groups having one or more hydrogens replaced with one or more fluorine atoms, chlorine atoms, bromine atoms and/or iodine atoms. Substituted alkyl groups include fully fluorinated or semifluorinated alkyl groups, such as alkyl groups having one or more hydrogens replaced with one or more fluorine atoms. An alkoxy group is an alkyl group that has been modified by linkage to oxygen and can be represented by the formula R—O and can also be referred to as an alkyl ether group. Examples of alkoxy groups include, but are not limited to, methoxy, ethoxy, propoxy, butoxy and heptoxy. Alkoxy groups include substituted alkoxy groups wherein the alky portion of the groups is substituted as provided herein in connection with the description of alkyl groups. As used herein MeO—refers to $CH_3O$—.

Alkenyl groups include straight-chain, branched and cyclic alkenyl groups. Alkenyl groups include those having 1, 2 or more double bonds and those in which two or more of the double bonds are conjugated double bonds. Alkenyl groups include those having from 2 to 20 carbon atoms. Alkenyl groups include small alkenyl groups having 2 to 3 carbon atoms. Alkenyl groups include medium length alkenyl groups having from 4-10 carbon atoms. Alkenyl groups include long alkenyl groups having more than 10 carbon atoms, particularly those having 10-20 carbon atoms. Cycloalkenyl groups include those in which a double bond is in the ring or in an alkenyl group attached to a ring. The term cycloalkenyl specifically refers to an alkenyl group having a ring structure, including an alkenyl group having a 3-, 4-, 5-, 6-, 7-, 8-, 9- or 10-member carbon ring(s) and particularly those having a 3-, 4-, 5-, 6-, 7- or 8-member ring(s). The carbon rings in cycloalkenyl groups can also carry alkyl groups. Cycloalkenyl groups can include bicyclic and tricyclic alkenyl groups. Alkenyl groups are optionally substituted. Substituted alkenyl groups include among others those that are substituted with alkyl or aryl groups, which groups in turn can be optionally substituted. Specific alkenyl groups include ethenyl, prop-1-enyl, prop-2-enyl, cycloprop-1-enyl, but-1-enyl, but-2-enyl, cyclobut-1-enyl, cyclobut-2-enyl, pent-1-enyl, pent-2-enyl, branched pentenyl, cyclopent-1-enyl, hex-1-enyl, branched hexenyl, cyclohexenyl, all of which are optionally substituted. Substituted alkenyl groups include fully halogenated or semihalogenated alkenyl groups, such as alkenyl groups having one or more hydrogens replaced with one or more fluorine atoms, chlorine atoms, bromine atoms and/or iodine atoms. Substituted alkenyl groups include fully fluorinated or semifluorinated alkenyl groups, such as alkenyl groups having one or more hydrogen atoms replaced with one or more fluorine atoms.

Aryl groups include groups having one or more 5-, 6-, 7- or 8-member aromatic rings, including heterocyclic aromatic rings. The term heteroaryl specifically refers to aryl groups having at least one 5-, 6-, 7- or 8-member heterocyclic aromatic rings. Aryl groups can contain one or more fused aromatic rings, including one or more fused heteroaromatic rings, and/or a combination of one or more aromatic rings and one or more nonaromatic rings that may be fused or linked via covalent bonds. Heterocyclic aromatic rings can include one or more N, O, or S atoms in the ring. Heterocyclic aromatic rings can include those with one, two or three N atoms, those with one or two O atoms, and those with one or two S atoms, or combinations of one or two or three N, O or S atoms. Aryl groups are optionally substituted. Substituted aryl groups include among others those that are substituted with alkyl or alkenyl groups, which groups in turn can be optionally substituted. Specific aryl groups include phenyl, biphenyl groups, pyrrolidinyl, imidazolidinyl, tetrahydrofuryl, tetrahydrothienyl, furyl, thienyl, pyridyl, quinolyl, isoquinolyl, pyridazinyl, pyrazinyl, indolyl, imidazolyl, oxazolyl, thiazolyl, pyrazolyl, pyridinyl, benzoxadiazolyl, benzothiadiazolyl, and naphthyl groups, all of which are optionally substituted. Substituted aryl groups include fully halogenated or semihalogenated aryl groups, such as aryl groups having one or more hydrogens replaced with one or more fluorine atoms, chlorine atoms, bromine atoms and/or iodine atoms. Substituted aryl groups include fully fluorinated or semifluorinated aryl groups, such as aryl groups having one or more hydrogens replaced with one or more fluorine atoms. Aryl groups include, but are not limited to, aromatic group-containing or heterocylic aromatic group-containing groups corresponding to any one of the following: benzene, naphthalene, naphthoquinone, diphenylmethane, fluorene, anthracene, anthraquinone, phenanthrene, tetracene, tetracenedione, pyridine, quinoline, isoquinoline, indoles, isoindole, pyrrole, imidazole, oxazole, thiazole, pyrazole, pyrazine, pyrimidine, purine, benzimidazole, furans, benzofuran, dibenzofuran, carbazole, acridine, acridone, phenanthridine, thiophene, benzothiophene, dibenzothiophene, xanthene, xanthone, flavone, coumarin, azulene or anthracycline. As used herein, a group corresponding to the groups listed above expressly includes an aromatic or heterocyclic aromatic group, including monovalent, divalent and polyvalent groups, of the aromatic and heterocyclic aromatic groups listed herein provided in a covalently bonded configuration in the compounds of the invention at any suitable point of attachment. In embodiments, aryl groups contain between 5 and 30 carbon atoms. In embodiments, aryl groups contain one aromatic or heteroaromatic six-member ring and one or more additional five- or six-member aromatic or heteroaromatic ring. In embodiments, aryl groups contain between five and eighteen carbon atoms in the rings. Aryl groups optionally have one or more aromatic rings or heterocyclic aromatic rings having one or more electron donating groups, electron withdrawing groups and/or targeting ligands provided as substituents.

Arylalkyl groups are alkyl groups substituted with one or more aryl groups wherein the alkyl groups optionally carry additional substituents and the aryl groups are optionally substituted. Specific alkylaryl groups are phenyl-substituted alkyl groups, e.g., phenylmethyl groups. Alkylaryl groups are alternatively described as aryl groups substituted with one or more alkyl groups wherein the alkyl groups optionally carry additional substituents and the aryl groups are optionally substituted. Specific alkylaryl groups are alkyl-substituted phenyl groups such as methylphenyl. Substituted arylalkyl groups include fully halogenated or semihalogenated arylalkyl groups, such as arylalkyl groups having one or more alkyl and/or aryl groups having one or more hydrogens replaced with one or more fluorine atoms, chlorine atoms, bromine atoms and/or iodine atoms.

As used herein, the terms "alkylene" and "alkylene group" are used synonymously and refer to a divalent group derived from an alkyl group as defined herein. The invention includes compounds having one or more alkylene groups. Alkylene groups in some compounds function as attaching and/or spacer groups. Compounds of the invention may have substituted and/or unsubstituted $C_1$-$C_{20}$ alkylene, $C_1$-$C_{10}$ alkylene and $C_1$-$C_5$ alkylene groups.

As used herein, the terms "cycloalkylene" and "cycloalkylene group" are used synonymously and refer to a divalent group derived from a cycloalkyl group as defined herein. The invention includes compounds having one or more cycloalkylene groups. Cycloalkyl groups in some compounds function as attaching and/or spacer groups. Compounds of the invention may have substituted and/or unsubstituted $C_3$-$C_{20}$ cycloalkylene, $C_3$-$C_{10}$ cycloalkylene and $C_3$-$C_5$ cycloalkylene groups.

As used herein, the terms "arylene" and "arylene group" are used synonymously and refer to a divalent group derived from an aryl group as defined herein. The invention includes compounds having one or more arylene groups. In some embodiments, an arylene is a divalent group derived from an aryl group by removal of hydrogen atoms from two intra-ring carbon atoms of an aromatic ring of the aryl group. Arylene groups in some compounds function as attaching and/or spacer groups. Arylene groups in some compounds function as chromophore, fluorophore, aromatic antenna, dye and/or imaging groups. Compounds of the invention include substituted and/or unsubstituted $C_3$-$C_{30}$ arylene, $C_3$-$C_{20}$ arylene, $C_3$-$C_{10}$ arylene and $C_1$-$C_5$ arylene groups.

As used herein, the terms "heteroarylene" and "heteroarylene group" are used synonymously and refer to a divalent group derived from a heteroaryl group as defined herein. The invention includes compounds having one or more heteroarylene groups. In some embodiments, a heteroarylene is a divalent group derived from a heteroaryl group by removal of hydrogen atoms from two intra-ring carbon atoms or intra-ring nitrogen atoms of a heteroaromatic or aromatic ring of the heteroaryl group. Heteroarylene groups in some compounds function as attaching and/or spacer groups. Heteroarylene groups in some compounds function as chromophore, aromatic antenna, fluorophore, dye and/or imaging groups. Compounds of the invention include substituted and/or unsubstituted $C_3$-$C_{30}$ heteroarylene, $C_3$-$C_{20}$ heteroarylene, $C_1$-$C_{10}$ heteroarylene and $C_3$-$C_5$ heteroarylene groups.

As used herein, the terms "alkenylene" and "alkenylene group" are used synonymously and refer to a divalent group derived from an alkenyl group as defined herein. The invention includes compounds having one or more alkenylene groups. Alkenylene groups in some compounds function as attaching and/or spacer groups. Compounds of the invention include substituted and/or unsubstituted $C_2$-$C_{20}$ alkenylene, $C_2$-$C_{10}$ alkenylene and $C_2$-$C_5$ alkenylene groups.

As used herein, the terms "cylcoalkenylene" and "cylcoalkenylene group" are used synonymously and refer to a divalent group derived from a cylcoalkenyl group as defined herein. The invention includes compounds having one or more cylcoalkenylene groups. Cycloalkenylene groups in some compounds function as attaching and/or spacer groups. Compounds of the invention include substituted and/or unsubstituted $C_3$-$C_{20}$ cylcoalkenylene, $C_3$-$C_{10}$ cylcoalkenylene and $C_3$-$C_5$ cylcoalkenylene groups.

As used herein, the terms "alkynylene" and "alkynylene group" are used synonymously and refer to a divalent group derived from an alkynyl group as defined herein. The invention includes compounds having one or more alkynylene groups. Alkynylene groups in some compounds function as attaching and/or spacer groups. Compounds of the invention include substituted and/or unsubstituted $C_2$-$C_{20}$ alkynylene, $C_2$-$C_{10}$ alkynylene and $C_2$-$C_5$ alkynylene groups.

As used herein, the term "halo" refers to a halogen group such as a fluoro (—F), chloro (—Cl), bromo (—Br) or iodo (—I)

The term "heterocyclic" refers to ring structures containing at least one other kind of atom, in addition to carbon, in the ring. Examples of such heteroatoms include nitrogen, oxygen and sulfur. Heterocyclic rings include heterocyclic alicyclic rings and heterocyclic aromatic rings. Examples of heterocyclic rings include, but are not limited to, pyrrolidinyl, piperidyl, imidazolidinyl, tetrahydrofuryl, tetrahydrothienyl, furyl, thienyl, pyridyl, quinolyl, isoquinolyl, pyridazinyl, pyrazinyl, indolyl, imidazolyl, oxazolyl, thiazolyl, pyrazolyl, pyridinyl, benzoxadiazolyl, benzothiadiazolyl, triazolyl and tetrazolyl groups. Atoms of heterocyclic rings can be bonded to a wide range of other atoms and functional groups, for example, provided as substituents.

The term "carbocyclic" refers to ring structures containing only carbon atoms in the ring. Carbon atoms of carbocyclic rings can be bonded to a wide range of other atoms and functional groups, for example, provided as substituents.

The term "alicyclic ring" refers to a ring, or plurality of fused rings, that is not an aromatic ring. Alicyclic rings include both carbocyclic and heterocyclic rings.

The term “aromatic ring” refers to a ring, or a plurality of fused rings, that includes at least one aromatic ring group. The term aromatic ring includes aromatic rings comprising carbon, hydrogen and heteroatoms. Aromatic ring includes carbocyclic and heterocyclic aromatic rings. Aromatic rings are components of aryl groups.

The term “fused ring” or “fused ring structure” refers to a plurality of alicyclic and/or aromatic rings provided in a fused ring configuration, such as fused rings that share at least two intra ring carbon atoms and/or heteroatoms.

As used herein, the term “alkoxyalkyl” refers to a substituent of the formula alkyl-O-alkyl.

As used herein, the term “polyhydroxyalkyl” refers to a substituent having from 2 to 12 carbon atoms and from 2 to 5 hydroxyl groups, such as the 2,3-dihydroxypropyl, 2,3,4-trihydroxybutyl or 2,3,4,5-tetrahydroxypentyl residue.

As used herein, the term “polyalkoxyalkyl” refers to a substituent of the formula alkyl-(alkoxy)n-alkoxy wherein n is an integer from 1 to 10, preferably 1 to 4, and more preferably for some embodiments 1 to 3.

As to any of the groups described herein that contain one or more substituents, it is understood that such groups do not contain any substitution or substitution patterns which are sterically impractical and/or synthetically non-feasible. In addition, the compounds of this invention include all stereochemical isomers arising from the substitution of these compounds. Optional substitution of alkyl groups includes substitution with one or more alkenyl groups, aryl groups or both, wherein the alkenyl groups or aryl groups are optionally substituted. Optional substitution of alkenyl groups includes substitution with one or more alkyl groups, aryl groups, or both, wherein the alkyl groups or aryl groups are optionally substituted. Optional substitution of aryl groups includes substitution of the aryl ring with one or more alkyl groups, alkenyl groups, or both, wherein the alkyl groups or alkenyl groups are optionally substituted.

Optional substituents for any alkyl, alkenyl and aryl group includes substitution with one or more of the following substituents, among others:

halogen, including fluorine, chlorine, bromine or iodine;

pseudohalides, including —CN, —OCN (cyanate), —NCO (isocyanate), —SCN (thiocyanate) and —NCS (isothiocyanate);

—COOR, where R is a hydrogen or an alkyl group or an aryl group and more specifically where R is a methyl, ethyl, propyl, butyl, or phenyl group all of which groups are optionally substituted;

—COR, where R is a hydrogen or an alkyl group or an aryl group and more specifically where R is a methyl, ethyl, propyl, butyl, or phenyl group all of which groups are optionally substituted;

—$CON(R)_2$, where each R, independently of each other R, is a hydrogen or an alkyl group or an aryl group and more specifically where R is a methyl, ethyl, propyl, butyl, or phenyl group all of which groups are optionally substituted; and where R and R can form a ring which can contain one or more double bonds and can contain one or more additional carbon atoms;

—$OCON(R)_2$, where each R, independently of each other R, is a hydrogen or an alkyl group or an aryl group and more specifically where R is a methyl, ethyl, propyl, butyl, or phenyl group all of which groups are optionally substituted; and where R and R can form a ring which can contain one or more double bonds and can contain one or more additional carbon atoms;

—$N(R)_2$, where each R, independently of each other R, is a hydrogen, or an alkyl group, or an acyl group or an aryl group and more specifically where R is a methyl, ethyl, propyl, butyl, phenyl or acetyl group, all of which are optionally substituted; and where R and R can form a ring that can contain one or more double bonds and can contain one or more additional carbon atoms;

—SR, where R is hydrogen or an alkyl group or an aryl group and more specifically where R is hydrogen, methyl, ethyl, propyl, butyl, or a phenyl group, which are optionally substituted;

—$SO_2R$, or —SOR, where R is an alkyl group or an aryl group and more specifically where R is a methyl, ethyl, propyl, butyl, or phenyl group, all of which are optionally substituted;

—OCOOR, where R is an alkyl group or an aryl group;

—$SO_2N(R)_2$, where each R, independently of each other R, is a hydrogen, or an alkyl group, or an aryl group all of which are optionally substituted and wherein R and R can form a ring that can contain one or more double bonds and can contain one or more additional carbon atoms; and —OR, where R is H, an alkyl group, an aryl group, or an acyl group all of which are optionally substituted. In a particular example R can be an acyl yielding —OCOR", wherein R" is a hydrogen or an alkyl group or an aryl group and more specifically where R" is methyl, ethyl, propyl, butyl, or phenyl groups all of which groups are optionally substituted.

Specific substituted alkyl groups include haloalkyl groups, particularly trihalomethyl groups and specifically trifluoromethyl groups. Specific substituted aryl groups include mono-, di-, tri, tetra- and pentahalo-substituted phenyl groups; mono-, di, tri-, tetra-, penta-, hexa-, and hepta-halo-substituted naphthalene groups; 3- or 4-halo-substituted phenyl groups, 3- or 4-alkyl-substituted phenyl groups, 3- or 4-alkoxy-substituted phenyl groups, 3- or 4-RCO-substituted phenyl, 5- or 6-halo-substituted naphthalene groups. More specifically, substituted aryl groups include acetylphenyl groups, particularly 4-acetylphenyl groups; fluorophenyl groups, particularly 3-fluorophenyl and 4-fluorophenyl groups; chlorophenyl groups, particularly 3-chlorophenyl and 4-chlorophenyl groups; methylphenyl groups, particularly 4-methylphenyl groups; and methoxyphenyl groups, particularly 4-methoxyphenyl groups.

As to any of the above groups that contain one or more substituents, it is understood that such groups do not contain any substitution or substitution patterns which are sterically impractical and/or synthetically non-feasible. In addition, the compounds of this invention include all stereochemical isomers arising from the substitution of these compounds.

What is claimed is:

1. A curable composition, comprising:

a toughness modifier, the toughness modifier comprising a first polymerizable oligomer having a number average molecular weight of greater than 5 kDa, wherein the first polymerizable oligomer comprises an aliphatic urethane (meth)acrylate including at least two polymerizable groups;

a crosslinker, the crosslinker comprising a second polymerizable oligomer having a number average molecular weight of 0.4 to 5 kDa and a higher glass transition temperature than the toughness modifier, wherein the second polymerizable oligomer comprises an aliphatic methacrylate including one or more cycloaliphatic rings; and a reactive diluent, the reactive diluent comprising a polymerizable compound having a molecular weight of 0.1 to 1.0 kDa, wherein the polymerizable compound comprises a (meth)acrylate or di(meth)acrylate compound, wherein the curable composition is incorporated into a crosslinked polymer, wherein the crosslinked polymer forms an orthodontic appliance, and wherein the curable composition comprises 5 to 50 wt %, based on the total weight of the composition, of the crosslinker, 20 to 50 wt %, based on the total weight of the composition, of the toughness modifier and 5 to 50 wt %, based on the total weight of the composition, of the reactive diluent, wherein the content of the toughness modifier is such that the crosslinked polymer has an elongation at break greater than or equal to 5% when measured according to ISO 527-2 5B, optionally at a crosshead speed of 5 mm/min, the content of the crosslinker is such that the crosslinked polymer has a glass transition temperature greater than 90° C., and the content of the reactive diluent is such that a viscosity of the composition is 1 to 70 Pa·s at 110° C.

2. The curable composition of claim 1, wherein the toughness modifier comprises a (poly)carbonate-(poly)urethane dimethacrylate oligomer.

3. The curable composition of claim 2, wherein the toughness modifier is a compound of formula (II), (III), (IV) or (V):

(II)

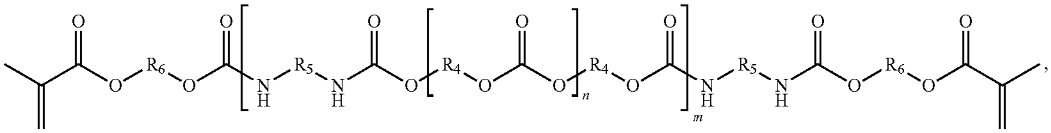
, (III)

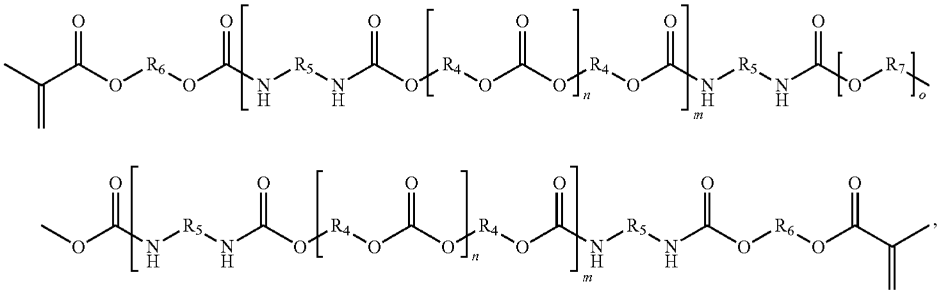
, (IV)

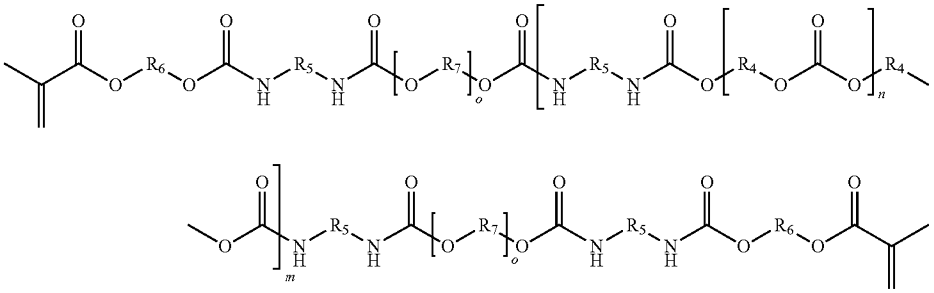
or (V)

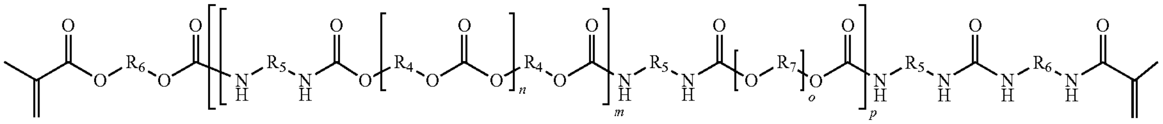

wherein:

$R_4$ and $R_5$ each independently represent a divalent, unbranched or branched or cyclic aliphatic $C_5$-$C_{15}$ residue;

each $R_6$ independently represents a divalent, unbranched or branched $C_2$-$C_4$ alkyl residue;

each $R_7$ independently represents a divalent, unbranched or branched $C_2$-$C_6$ alkyl residue;

each n is independently an integer from 1 to 10;

each m is independently an integer from 1 to 20;

each o is independently an integer from 5 to 50; and p is an integer from 1 to 40.

4. The curable composition of claim 3, wherein the toughness modifier has one of the following structures:

TNM1

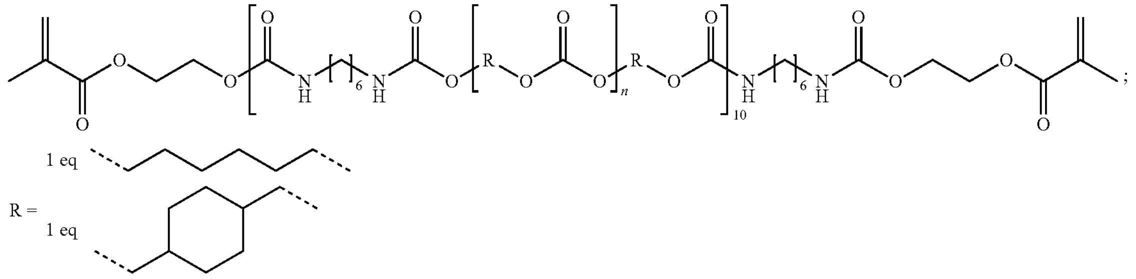

n = 6-7

TNM2

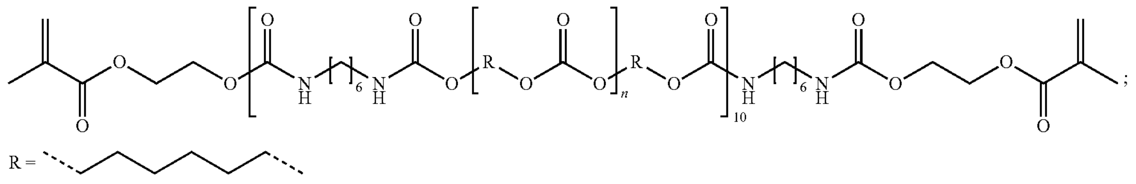

n = 7-8

TNM3

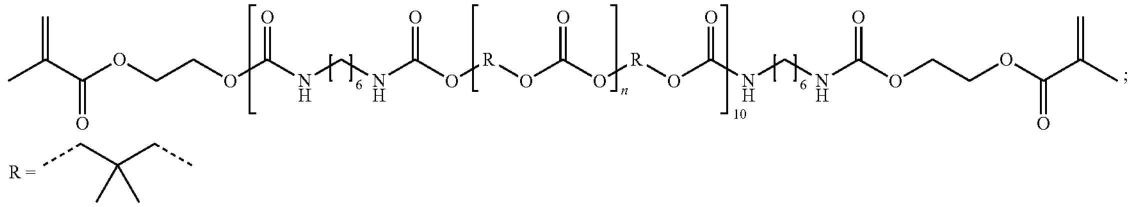

n = 7-9

TNM4

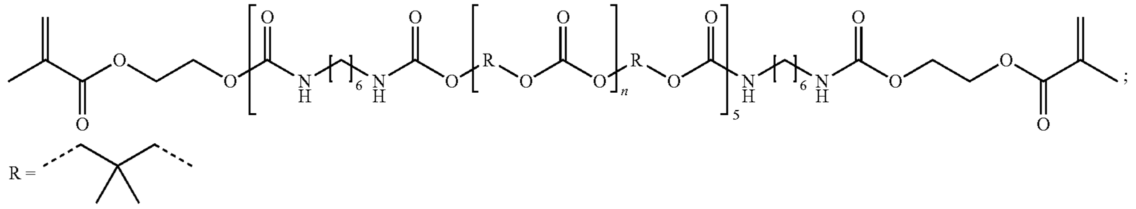

n = 15-17

TNM5

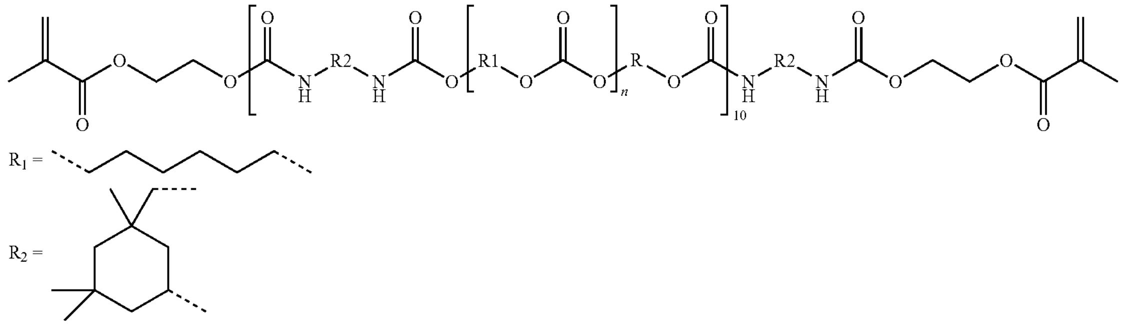

or n = 7-8

-continued

TNM6

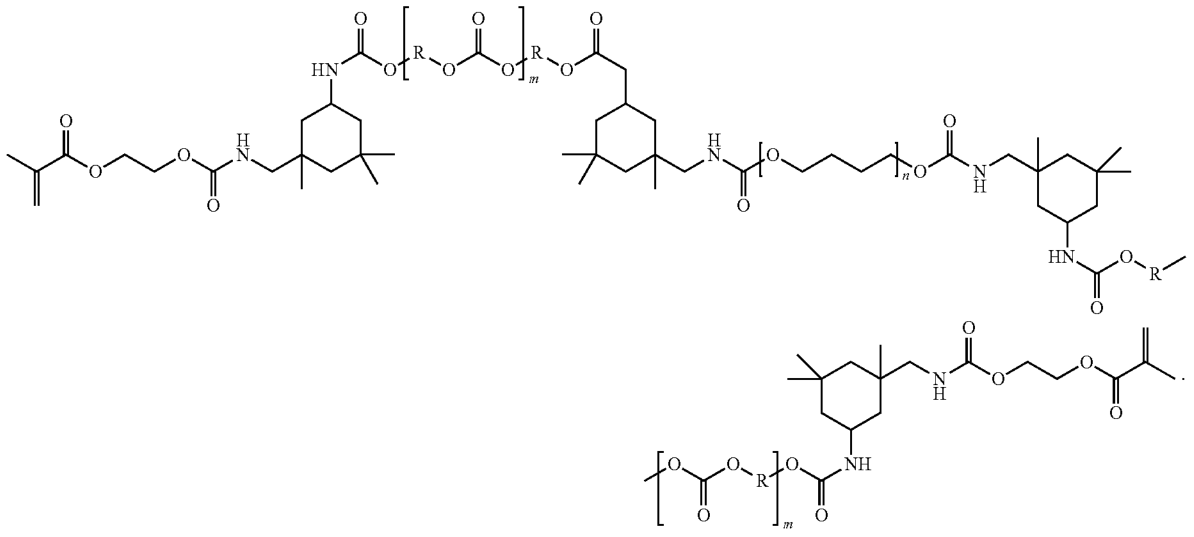

n = 40

R =

1 eq

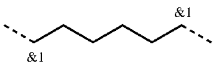

1 eq

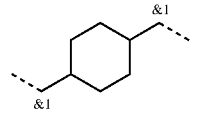

m = 6-7

5. The curable composition of claim 1, wherein a glass transition temperature (Tg) of the toughness modifier is less than 0° C.

6. The curable composition of claim 1, wherein the reactive diluent comprises dimethacrylates of polyglycols, hydroxybenzoic acid ester (meth) acrylates, or a mixture thereof.

7. The curable composition of claim 1, wherein the reactive diluent is a compound of formula (VII):

(VII)

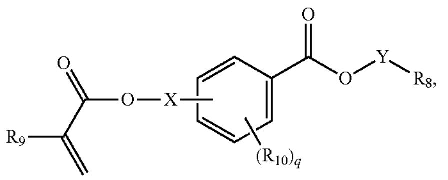

wherein:

$R_8$ represents optionally substituted $C_3$-$C_{10}$ cycloalkyl, optionally substituted 3- to 10-membered heterocycloalkyl, or optionally substituted $C_6$-$C_{10}$ aryl;

$R_9$ represents H or $C_1$-$C_6$ alkyl;

each $R_{10}$ independently represents halo, $C_1$-$C_3$ alkyl, $C_1$-$C_3$ alkoxy, $Si(R_{11})_3$, $P(O)(OR_{12})_2$, or $N(R_{13})_2$;

each $R_{11}$ independently represents $C_1$-$C_6$ alkyl or $C_1$-$C_6$ alkoxy;

each $R_{12}$ independently represents $C_1$-$C_6$ alkyl or $C_6$-$C_{10}$ aryl;

each $R_{13}$ independently represents H or $C_1$-$C_6$ alkyl;

X is absent, $C_1$-$C_3$ alkylene, 1- to 3-membered heteroalkylene, or $(CH_2CH_2O)_r$;

Y is absent or $C_1$-$C_6$ alkylene;

q is an integer from 0 to 4; and r is an integer from 1 to 4.

8. The curable composition of claim 7, wherein $R_8$ is unsubstituted or substituted with one or more substituents selected from the group consisting of $C_1$-$C_6$ alkyl, $C_1C_6$ alkoxy, $C_3$-$C_7$ cycloalkyl, $C_6$-$C_{10}$ aryl, $C_1$-$C_6$-alkoxy-$C_6$-$C_{10}$-aryl, O(CO)—$(C_1C_6)$alkyl, —COO—$(C_1$-$C_6)$alkyl, —O, F, Cl, and Br.

9. The curable composition of claim 7, wherein the reactive diluent comprises a compound having the following formula:

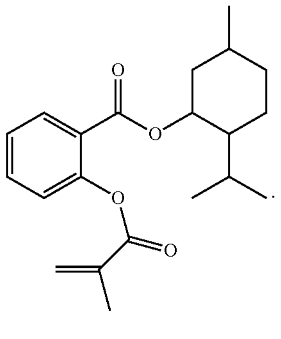 [SMILES: C=C(C)C(=O)Oc1ccccc1C(=O)OC1CC(C)CCC1C(C)C]

10. The curable composition of claim 1, wherein the reactive diluent is selected from TEGDMA (triethylene glycol dimethacrylate), D4MA (1,12-dodecanediol dimethacrylate), HSMA (3,3,5-trimethylcyclohexyl 2-(methacryloxy)benzoate), and BSMA (benzyl salicylate methacrylate).

11. The curable composition of claim 1, wherein the crosslinker has the following structure:

H1188

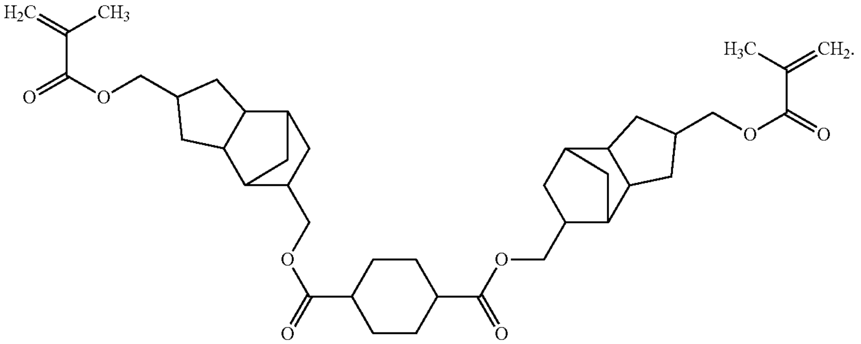

12. The curable composition of claim 1, wherein the crosslinker has the following formula (I):

(I)

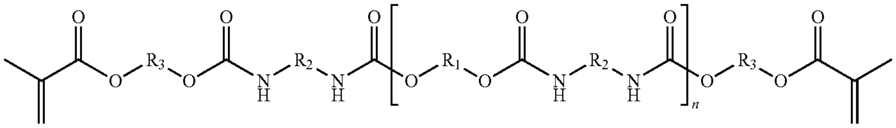

wherein:

$R_1$ and $R_2$ each independently represent a divalent unbranched, branched or cyclic aliphatic $C_5$-$C_{15}$ residue, with the proviso that at least one of $R_1$ and $R_2$ is or comprises a $C_5$-$C_6$ cycloaliphatic structure;

each $R_3$ independently represents a divalent unbranched or branched $C_2$-$C_4$ alkyl residue; and n is an integer from 1 to 5.

13. The curable composition of claim 12, wherein the crosslinker has one of the following structures:

TGM1

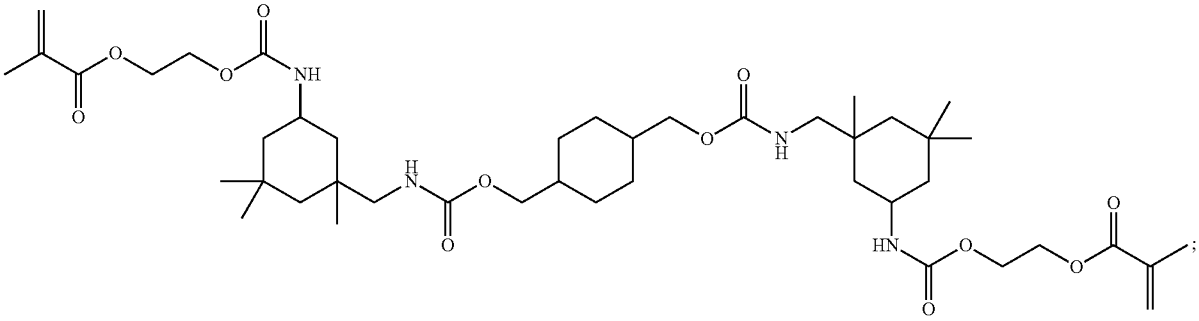

;

TGM2

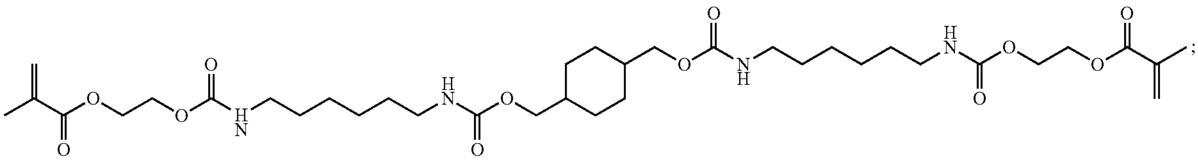

;

TGM3

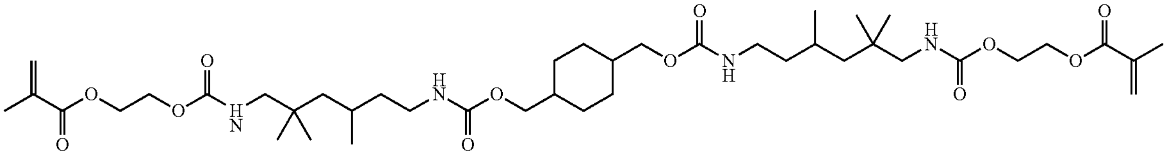

or

-continued

TGM4

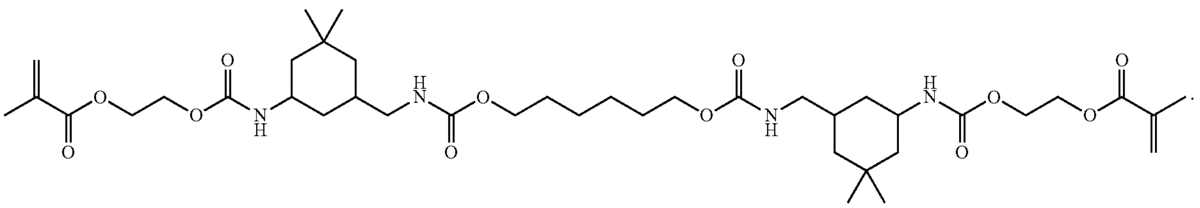

14. The curable composition of claim 1, further comprising a photoinitiator.

15. The curable composition of claim 1, further comprising one or more further components selected from the group consisting of solvents, fillers, antioxidants, pigments, colorants, surface modifiers, core-shell particles, and mixtures thereof.

16. The curable composition of claim 1, wherein the crosslinked polymer is characterized by one or more of:

a glass transition temperature of greater than or equal to 100;

a tensile modulus greater than or equal to 100 MPa;

a tensile strength at yield greater than or equal to 5 MPa;

an elongation at yield greater than or equal to 4%;

a storage modulus greater than or equal to 300 MPa; and a stress relaxation greater than or equal to 0.01 MPa.

17. The curable composition of claim 1, wherein the orthodontic appliance is an aligner, an expander, or a spacer.

18. The curable composition of claim 1, wherein the orthodontic appliance comprises a plurality of tooth receiving cavities configured to reposition teeth from a first configuration toward a second configuration.

19. The curable composition of claim 1, wherein the orthodontic appliance is one of a plurality of orthodontic appliances configured to reposition the teeth from an initial configuration toward a target configuration.

20. The curable composition of claim 1, wherein the orthodontic appliance is one of a plurality of orthodontic appliances configured to reposition the teeth from an initial configuration toward a target configuration according to a treatment plan.

* * * * *